US009195973B1

(12) United States Patent
Trandal et al.

(10) Patent No.: US 9,195,973 B1
(45) Date of Patent: Nov. 24, 2015

(54) METHODS AND SYSTEMS FOR PROCESSING TELEPHONIC COMMUNICATIONS AND PRODUCT DATA

(76) Inventors: David S. Trandal, Santa Barbara, CA (US); David J. Brahm, The Woodlands, TX (US)

( * ) Notice: Subject to any disclaimer, the term of this patent is extended or adjusted under 35 U.S.C. 154(b) by 85 days.

(21) Appl. No.: 13/621,048

(22) Filed: Sep. 15, 2012

Related U.S. Application Data

(63) Continuation of application No. 12/486,621, filed on Jun. 17, 2009, now Pat. No. 8,295,452.

(51) Int. Cl.
*G06Q 10/00* (2012.01)

(52) U.S. Cl.
CPC ...................................... *G06Q 10/20* (2013.01)

(58) Field of Classification Search
CPC ....... G06Q 10/06; G06Q 10/10; G06Q 10/20; G06Q 10/087; G06Q 30/02; G06Q 30/06; G06Q 30/012; G06Q 30/016; H04M 3/36; H04M 3/51; H04M 3/493; H04M 11/00; H04M 11/06; H04M 11/062; H04L 12/1831; H04L 29/06353; H04Q 3/72
USPC .................................................. 705/302–305
See application file for complete search history.

(56) References Cited

U.S. PATENT DOCUMENTS

| | | | |
|---|---|---|---|
| 5,393,565 A | 2/1995 | Suzuki et al. | |
| 5,642,279 A | 6/1997 | Bloomberg et al. | |
| 5,978,774 A | 11/1999 | Rogers et al. | |
| 6,018,719 A | 1/2000 | Rogers et al. | |
| 6,564,261 B1 | 5/2003 | Gudjonsson et al. | |
| 6,691,064 B2* | 2/2004 | Vroman | 702/183 |
| 6,757,663 B1 | 6/2004 | Rogers et al. | |
| 6,912,507 B1 | 6/2005 | Phillips et al. | 705/26 |
| 6,950,646 B2 | 9/2005 | Pradhan et al. | |
| 6,965,866 B2 | 11/2005 | Klein | |
| 6,968,175 B2 | 11/2005 | Raivisto et al. | |
| 7,194,429 B2 | 3/2007 | Takae et al. | |
| 7,200,573 B2 | 4/2007 | Miller et al. | |
| 7,212,976 B2* | 5/2007 | Scheer | 705/7.34 |
| 7,231,416 B1 | 6/2007 | Busuioc | |
| 7,249,708 B2 | 7/2007 | Mconnell et al. | 235/383 |
| 7,272,076 B2 | 9/2007 | Burkes et al. | |
| 7,302,270 B1 | 11/2007 | Day | |
| 7,379,899 B1 | 5/2008 | Junger | |
| 7,454,366 B2 | 11/2008 | Kato | |
| 7,469,217 B2* | 12/2008 | Kidd et al. | 705/26.5 |
| 7,511,619 B2* | 3/2009 | Allen | 340/572.1 |
| 7,552,087 B2 | 6/2009 | Schultz | |
| 7,571,263 B2 | 8/2009 | Campello et al. | |
| 7,606,948 B2 | 10/2009 | Campello et al. | |

(Continued)

*Primary Examiner* — Simon Sing

(57) ABSTRACT

The present invention relates to telecommunications processing and managing product data using voice and data networks. A purchase is recorded in a telephonic processing system. A warranty duration is determined for the purchased item. A warranty start and end date is established for the item purchase. Claims instructions are sent to a user including a first phone address. A call from a caller directed to the first phone address is received at a telephonic processing system coupled to at least one network, wherein the call is associated with call signaling information. An outbound call is generated from the telephonic processing system to a second phone address wherein the second phone address is determined at least in part from the signaling information associated with the received call. The received call is connected to the first outbound call. Call detail attributes associated with the connected calls are recorded.

20 Claims, 40 Drawing Sheets

(56) References Cited

U.S. PATENT DOCUMENTS

| Patent/Publication No. | Date | Inventor(s) |
|---|---|---|
| 7,797,164 B2 | 9/2010 | Junger et al. |
| 7,814,142 B2 * | 10/2010 | Mamou et al. ................ 709/203 |
| 7,899,823 B1 | 3/2011 | Trandal et al. |
| 8,095,403 B2 * | 1/2012 | Price ............................... 705/29 |
| 8,150,720 B2 * | 4/2012 | Singh et al. .................. 705/7.25 |
| 8,219,558 B1 | 7/2012 | Trandal et al. |
| 8,686,318 B2 * | 4/2014 | Albrecht et al. ......... 219/137.71 |
| 2001/0027401 A1 | 10/2001 | Klein |
| 2001/0037248 A1 | 11/2001 | Klein |
| 2001/0042022 A1 | 11/2001 | Kirkpatrick et al. |
| 2001/0053980 A1 | 12/2001 | Suliman et al. |
| 2002/0026395 A1 | 2/2002 | Peterson |
| 2002/0040325 A1 | 4/2002 | Takae et al. |
| 2002/0069118 A1 | 6/2002 | Zylstra |
| 2002/0116163 A1 | 8/2002 | Loveland |
| 2002/0116254 A1 | 8/2002 | Stein et al. |
| 2002/0120535 A1 | 8/2002 | Yu |
| 2002/0128851 A1 | 9/2002 | Chefalas et al. |
| 2002/0128915 A1 | 9/2002 | Haseltine |
| 2002/0133425 A1 | 9/2002 | Pederson et al. |
| 2002/0165741 A1 | 11/2002 | Becker et al. |
| 2002/0169671 A1 | 11/2002 | Junger |
| 2002/0169687 A1 | 11/2002 | Perkowski |
| 2002/0198729 A1 | 12/2002 | Burkes et al. |
| 2003/0004737 A1 | 1/2003 | Conquest et al. |
| 2003/0018578 A1 | 1/2003 | Schultz |
| 2003/0126034 A1 | 7/2003 | Cheney et al. |
| 2003/0130989 A1 | 7/2003 | Kaufman |
| 2003/0158792 A1 | 8/2003 | Perkowski |
| 2003/0167210 A1 | 9/2003 | Miller et al. |
| 2003/0225625 A1 | 12/2003 | Chew et al. |
| 2004/0006514 A1 | 1/2004 | Rogers et al. |
| 2004/0030574 A1 * | 2/2004 | DiCostanzo et al. ............. 705/1 |
| 2004/0039494 A1 | 2/2004 | Kaufman |
| 2004/0044586 A1 | 3/2004 | Gullo et al. |
| 2004/0046033 A1 | 3/2004 | Kolodziej et al. |
| 2004/0078290 A1 | 4/2004 | Mester |
| 2004/0088263 A1 | 5/2004 | Miller et al. |
| 2004/0102993 A1 | 5/2004 | Yoshida et al. |
| 2004/0143502 A1 | 7/2004 | McClung, III |
| 2004/0153368 A1 | 8/2004 | Freishtat et al. |
| 2004/0153378 A1 | 8/2004 | Perkowski |
| 2004/0199413 A1 | 10/2004 | Hauser et al. |
| 2004/0267642 A1 | 12/2004 | Stenz et al. |
| 2005/0102187 A1 | 5/2005 | Perkowski |
| 2005/0144028 A1 | 6/2005 | Donahue et al. |
| 2005/0216373 A1 | 9/2005 | Weiss et al. |
| 2006/0069730 A1 | 3/2006 | Azuma |
| 2006/0095289 A1 | 5/2006 | Bunning |
| 2006/0111924 A1 | 5/2006 | Hollich et al. |
| 2006/0122854 A1 | 6/2006 | Campello et al. |
| 2006/0136776 A1 | 6/2006 | Campello et al. |
| 2006/0184379 A1 | 8/2006 | Tan et al. |
| 2007/0050230 A1 | 3/2007 | Umagat |
| 2007/0061223 A1 | 3/2007 | Rodriguez et al. |
| 2007/0112656 A1 | 5/2007 | Howe et al. |
| 2007/0174196 A1 | 7/2007 | Becker et al. |
| 2007/0185787 A1 | 8/2007 | Shernaman et al. |
| 2007/0255575 A1 | 11/2007 | Buchheit |
| 2007/0287488 A1 | 12/2007 | Faber et al. |
| 2007/0294096 A1 | 12/2007 | Randall et al. |
| 2008/0032688 A1 | 2/2008 | Chew et al. |
| 2008/0066080 A1 | 3/2008 | Campbell |
| 2008/0089506 A1 | 4/2008 | Pounds et al. |
| 2008/0194260 A1 | 8/2008 | Altberg et al. |
| 2008/0208639 A1 | 8/2008 | Pattison |
| 2008/0215961 A1 | 9/2008 | Altberg et al. |
| 2008/0221914 A1 | 9/2008 | Frankel et al. |
| 2008/0235148 A1 | 9/2008 | Liu |
| 2009/0276178 A1 | 11/2009 | Goodnow et al. |
| 2009/0285483 A1 | 11/2009 | Guven et al. |
| 2009/0287498 A2 | 11/2009 | Choi |
| 2009/0299887 A1 | 12/2009 | Shiran et al. |
| 2010/0145754 A1 | 6/2010 | Rahman |
| 2010/0153281 A1 | 6/2010 | Tan et al. |
| 2010/0306080 A1 | 12/2010 | Trandal et al. |
| 2011/0060647 A1 | 3/2011 | Weaver et al. |
| 2011/0060648 A1 | 3/2011 | Weaver et al. |

* cited by examiner

Fig. 9 http://www.eZReturns.com/WelcomePage.html —— 17100    17200 e⇄Returns ™    User Profile | Contact Us | Help |    Search Keyword

Welcome, Bob Smith
Today is Tuesday, 12/15/09

| Item | Order Date | Sold By | Return | Mfgr | Return | Ext Warranty | Return | CC Ext Warranty | Return | Post Review |
|---|---|---|---|---|---|---|---|---|---|---|
| 50" HDTV | 10/6/08 | Acmezon | 11/5/08 | Panvision | 10/6/09 | (Learn More) | N/A | VISA | 10/6/10 | ☐ |
|  |  |  |  |  |  | 17661 |  | 17681 | 17691 |  |
| 17641 |  |  |  |  |  |  |  |  |  |  |

Archive

| DVR Record | 5/29/08 | Acmezon | 6/28/08 | Zenith | 8/27/08 | (None) | N/A | Master Card | 11/25/08 |

*Purchase Acmezon Products*    *Join Account*    *Download Widget*    *Logout*

| Item | Order Date | Sold By | Return | Mfgr | Return | Ext Warranty | Return | CC Ext Warranty | Return | Post Review |
|---|---|---|---|---|---|---|---|---|---|---|
| MP3 Player | 8/12/09 | Acmezon | 9/11/09 | Zounds | 2/8/10 | (Learn More) | N/A | VISA | 8/7/10 | ☐ |
| Gifts | | | | | | | | | | |
| 50" HDTV | 10/6/08 | Acmezon | 11/5/08 | Panvision | 10/6/09 | (Learn More) | N/A | VISA | 10/6/10 | |
| Archive | | | | | | | | | | |
| DVR Record | 5/29/08 | Acmezon | 6/28/08 | Zenith | 8/27/08 | (None) | N/A | Master Card | 11/25/08 | |

Fig. 22

METHODS AND SYSTEMS FOR PROCESSING TELEPHONIC COMMUNICATIONS AND PRODUCT DATA

PRIORITY CLAIM

This application is a continuation of U.S. application Ser. No. 12/486,621, filed Jun. 17, 2009, now U.S. Pat. No. 8,295,452 entitled "Methods and Systems for Processing Telephonic Communications and Product Data" which is incorporated herein by reference in its entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

FIELD OF THE INVENTION

The present invention relates to telecommunications processing and managing product data using voice and data networks.

BACKGROUND OF THE INVENTION

Many consumers are unaware of the warranty and insurance services that they paid for when they purchased an item. Others are aware of these benefits but are unwilling to expend the effort to retain the purchase records and to complete the appropriate forms to take advantage of these benefits when the item is lost or malfunctions. In yet other cases, consumers are aware they have warranty coverage but are unsure whether they need to contact the retail merchant, the manufacturer, their insurance agent and/or their credit card company. As a result, consumers waste millions of dollars annually by purchasing new items or repairing their existing items at their own expense.

Some products require regular routine maintenance for continued proper operation. This often does not occur in a timely fashion because owners simply forget to follow up. This problem is further exacerbated by the fact that scheduled service activities often involve replacing a compatible consumable item (e.g. replacing a water or air filter). Acquiring and replacing the correct part requires retaining product literature for ordering and installation instructions, which again is a challenge for many consumers. In a similar manner, accessing user's manuals and trouble-shooting guides for infrequently used items is often hampered by the owner's imperfect filing system.

All of these challenges point out the need for a convenient system for organizing, communicating, and managing product information.

SUMMARY OF THE INVENTION

Example embodiments listed simplify product purchase tracking and product warranty repair/replacement/refunds during claims processing. In addition, the described embodiments create more reliable, complete, and secure record keeping and provider communications processes for the consumer with minimum effort on their part.

In addition, embodiments of the present invention provide methods and systems to enable a service provider to offer warranty claims management facilitation services that includes searching, organizing, and storing purchase records/transactions and analysis of warranty and service contract tradeoffs to assist consumer purchase decisions. In addition, internal and external databases are queried to link or further enhance the data/objects organized and stored related to consumer purchases. In addition, certain methods and systems described herein determine whether a user is within a warranty period and who/how to contact to process a warranty claim. In addition, certain methods and systems described herein facilitate the communication process between consumers, retailers, product manufacturers and extended warranty providers. In addition, certain methods and systems described herein provide alert notification services related to warranty periods.

One embodiment is a method of facilitating warranty management comprising: storing information associated with user purchases in an online warranty management system; determining warranty periods; making available to a users, the warranty periods and status for purchases; and facilitating claims processing by providing claims instructions to users and/or claims information to warranty providers. Optionally, wherein warranty periods include a merchant return period, a manufacturer's warranty period, and/or an extended warranty period. Optionally, the above embodiment further comprises receiving at the warranty management system a first call directed to a phone address included in the claims instructions; generating a second call from the warranty management system to a phone address determined from the signaling information associated with the first call; and, bridging the first and second call. Optionally, the above embodiment further comprises monitoring the first call for a command; generating a third call based on receiving the command; and connecting the first call and third call. Optionally, the above embodiment further comprises receiving at the warranty management system coupled to data and/or voice networks, a request from the user to receive a call wherein the request originated in response to the claims instructions; generating a first call from the warranty management system to a phone address determined from the user's request; generating from the warranty management system a second call to a user; and, bridging the first and second calls together. Optionally, the above embodiment further comprises: monitoring the first call for a command; generating a third call based on the received command; and connecting the first call and the third call. Optionally, the above embodiment further comprises: receiving defect information from the user; and, transmitting the defect information, user data, and the purchase information to the warranty provider. Optionally, the above embodiment further comprises: shipping to the user return purchased item packaging material, wherein the packaging material includes a pre-addressed shipping label. Optionally, the above embodiment further comprises: registering the purchased item with the manufacturer and/or extended warranty provider. Optionally, the above embodiment further comprises: allowing the user to post and/or review product reliability and/or warranty feedback to a forum. Optionally, the above embodiment further comprises: promoting extended warranty services to users. Optionally, the above embodiment further comprises: notifying users when a warranty period is about to expire. Optionally, wherein the notification methods include a Short Message Service, a Multi-Media Message service, a widget state change, an email message, an instant message note, and/or an audio message delivered in a telephone call. Optionally, the above embodiment further comprises: allowing users to merge other user's purchases into their customer account.

Another embodiment is a method of facilitating warranty management comprising: storing information associated with a gift purchases for users in a warranty management system; determining associated warranty periods for the gift purchases; making available to a user the warranty periods and status for the gift purchase; and facilitating claims processing by transmitting claims instructions to the gift recipients (giftees) and/or claims information to warranty providers. Optionally, the above embodiment further comprises receiving at the warranty management system a first call directed to a phone address included in the claims instruction; generating a second call from the warranty management system to a phone address determined from the signaling information associated with the first call; and, bridging the first and second call. Optionally, the above embodiment further comprises receiving at the warranty management system coupled to data and voice networks, a request from the giftee to receive a call wherein the request originated in response to the claims instructions; generating a first call from the warranty management system to a phone address determined from the giftee's request; generating from the warranty management system a second call to the giftee; and, bridging the first and second calls together.

Another embodiment is a method of facilitating communications and product information management associated with scheduled maintenance comprising notifying the user when scheduled service is due for selected purchased items. Optionally, the above embodiment further comprises providing a user interface whereby the user can authorize the purchase of one or more items associated with the associated maintenance tasks either on an automatic recurring basis or on a case by case basis.

BRIEF DESCRIPTION OF THE DRAWINGS

Example embodiments will now be described with reference to the drawings summarized below. These drawings and the associated descriptions are provided to illustrate example embodiments of the invention, and not to limit the scope of the invention.

FIG. 9 illustrates an example TPM user interface used to display a summary of warranty status for purchased products.

FIG. 17 illustrates an example TPM user interface used to display a summary of warranty status for purchased products.

FIG. 22 illustrates another example TPM user interface used to display a summary of warranty status for purchased products, in this case including items purchased as gifts for other people.

DETAILED DESCRIPTION OF THE PRESENT INVENTION

Figure 1:
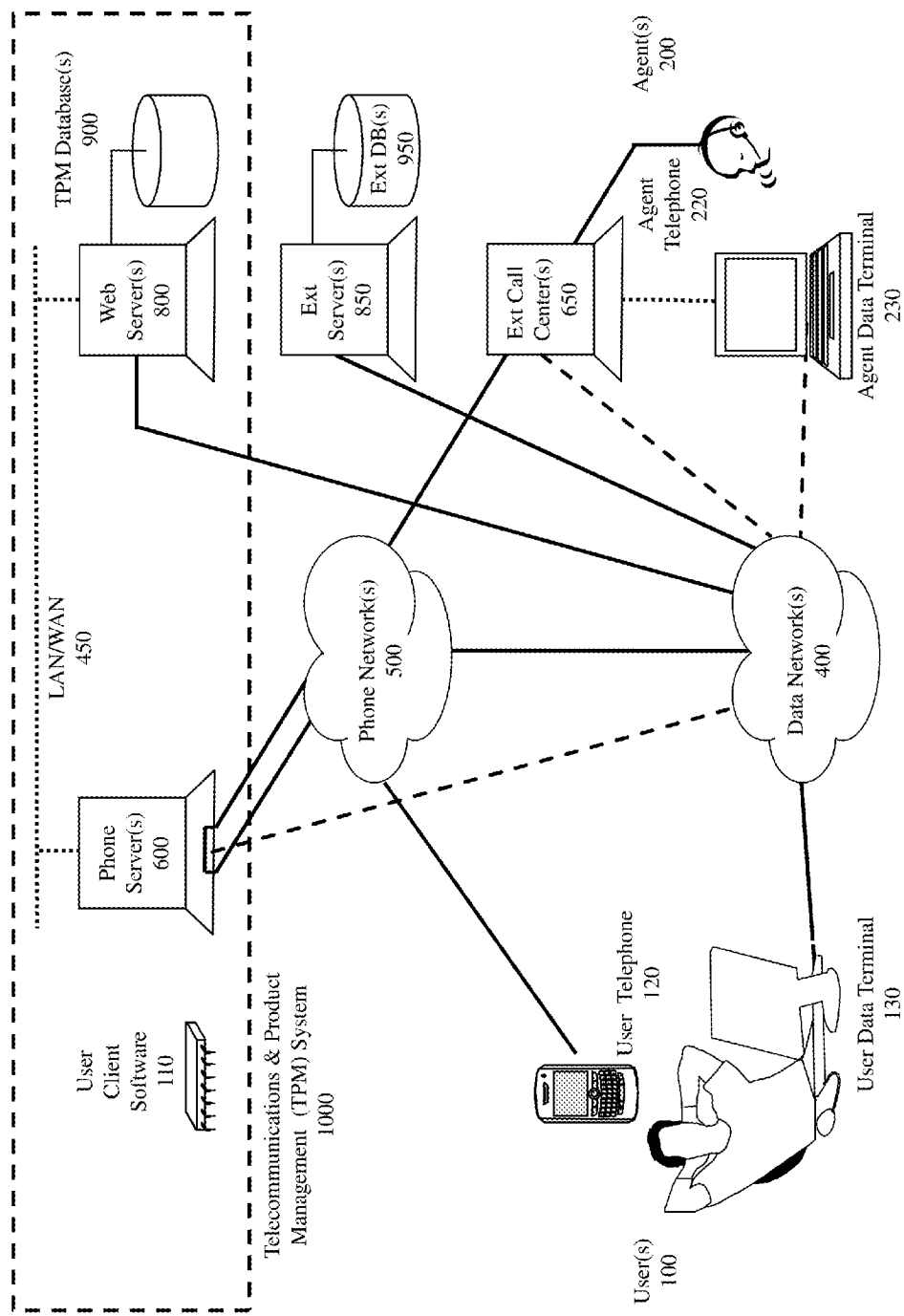
FIG. 1 illustrates an example network operating environment for a Telecommunications & Product Management (TPM) system.

The methods and systems of the present invention simplify and enhance product warranty tracking and insurance claims processing.

GLOSSARY

Merchant Return Policy—a merchant policy or obligation that a product sold can be returned for reimbursement, repaired or replaced within a stated period of time in the event that the product is defective or not functioning as expected by a reasonable buyer. In some cases, merchants have a no questions asked satisfaction guarantee policy which entitles the consumer to return the item if they are not satisfied with the product for any reason.

Manufacturer's Warranty—a manufacturer's warranty is an obligation that a product sold is as factually stated or legally implied by the seller. The manufacturer's warranty provides for a specific remedy such as reimbursement, repair or replacement in the event the product fails to meet the warranty conditions. A breach of warranty occurs when the promise is broken, i.e., a product is defective or not functioning as should be expected by a reasonable buyer.

Extended Warranty—a retailer, a manufacturer, or a third party may offer an "extended" warranty which lengthens the manufacturer's standard warranty period of a product. Extended warranties, in many cases, have different terms and conditions from the original manufacturer's warranty. For example, extended warranties may exclude parts that normally wear out.

Credit Card Extended Warranty—some credit card companies/banks provide additional warranty coverage on products purchased using their credit card At the credit card company's/bank's discretion, they replace, repair or reimburse the consumer for eligible items of personal property purchased entirely with an eligible credit card up to a maximum dollar amount per claim and a per cardholder maximum. The typical coverage extension is equal to an additional period that matches the manufacturer's original standard warranty up to one year.

Web Site or Web—a term used throughout the following description to refer to a user-accessible network site that implements the basic World Wide Web standards for the coding and transmission of hypertext documents. These standards currently include Hypertext Markup Language (HTML) and Hypertext Transfer Protocol (HTTP). It should be understood that the term "site" is not intended to imply a single geographic location, as a Web or other network site can, for example, include multiple geographically distributed computer systems that are appropriately linked together. Furthermore, while the following descriptions relates to an embodiment utilizing the Internet and related protocols, other networks and other protocols may be used as well.

Widget/Gadget—some or all of the information and functionality provided by the user interfaces discussed can be provided by a widget or a gadget. A widget can be in the form of portable code that can be installed and executed within a Web page (e.g. an HTML-based web page) by an end user without requiring additional compilation. By way of illustration, a widget can be in the form of a window (with or without a border) with a particular appearance and behavior, a text box, a media player, etc. A widget can optionally accept and process user inputs. A gadget is equivalent to a widget that works in a Google framework. Other types of applications can be used as well to provide the functionality of a widget or gadget.

Unless otherwise indicated, the functions described herein may be performed by executable code and instructions stored in computer readable medium and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a Personal Computer (PC) system or data device, other computer or electronic systems can be used as well, such as, without limitation, an interactive television, a network-enabled personal digital assistant (PDA), a network game console, a networked entertainment device, a smart phone (e.g., with an operating system and on which a user can install applications) and so on.

In addition, while certain user inputs or gestures are described as being provided via phone key-presses, data entry via a keyboard, or by clicking a computer mouse or button, optionally, user inputs can be provided using other techniques, such as by voice or otherwise. The example screen layouts, appearance, and terminology as depicted and described herein, are intended to be illustrative and exemplary, and in no way limit the scope of the invention as claimed.

The terms, "for example", "e.g.", "optionally", as used herein, are intended to be used to introduce non-limiting examples. While certain references are made to certain example system components or services, other components and services can be used as well and/or the example components can be combined into fewer components and/or divided into further components.

The functionality, operation, and implementation for an example warranty management service will now be described in further detail.

FIG. 1 illustrates an example TPM system 1000 that can be used in accordance with the present invention. As illustrated, the TPM system serves a plurality of users 100 with mobile/fixed phones 120 connected to a phone network 500 and/or data network 400. As further illustrated, the TPM system also interacts with the plurality of users 100 via computer/data terminals 130 connected to a data network 400 (e.g. the Internet or corporate LAN/WAN). The data/computer terminals 130 can be a personal computer having a monitor, keyboard, memory, a disk drive, and a data communication interface. In addition, the computer terminal 130 can be an interactive television, a networked-enabled personal digital assistant (PDA) or the like. The TPM Servers 600 and 800 are interconnected either through Data Network 400 (e.g. the public Internet—as depicted by the dashed line connections in FIG. 1) and/or via a private Local Area Network (LAN) or private Wide Area Network (WAN) 450—as shown by the dotted line connections in FIG. 1.

User client software 110 can be downloaded and executed on the user telephone 120 and/or the user data terminal 130. This software (e.g., widgets/gadgets) facilitates navigation to and through the TPM system 1000 services as well as providing a summary presentation of account status.

In this example, the TPM system 1000 contains centralized databases and/or general-purpose storage areas 900 optionally including, but not limited to, some or all of the following: a customer database, a dictionary or library of manufacturers and associated product items and warranty policies, merchant return policies, merchant Stock Keeping Units (SKU) identifiers, a dictionary of keyword search terms matching item and merchant names, a glossary of product terms or labels, etc. The storage subsystem 900 of the TPM system optionally records feedback re. warranty experiences or blogs by end users (e.g., call hold times, warranty processing challenges, etc.). The TPM system 1000 also includes a merchant return policy. This information can be made available to a user upon request. In addition, if an item breaks or malfunctions during the merchant return window, the TPM system optionally may recommend that the user return the item directly to a local retail store, even if the item was purchased online. The user interfaces for access to the stored/archived information are optionally device specific. By way of example, the user interface for a computer may be provided via a widget/gadget, a more traditional web portal, and/or an executable client. For a mobile handset, the interaction is optionally tailored to the available display space and interaction mechanism, where the functionality is similar although optionally reduced in scope. For example, for a smart phone handset, certain logos, menus, images, and the like can be reduced in relative size or eliminated altogether.

In this example, the TPM system contains a phone server subsystem 600 with call processing capabilities. These servers optionally provide interactive voice response, voice messaging, voice recognition, text-to-speech services, and voice message transcription to natural-language text. The phone server subsystem can receive inbound calls, including calls to toll-free phone numbers. The phone server subsystem can also generate outbound calls. Outbound calls can be originated to a user in response to a web hosted CLICK-TO-CALL control. Outbound calls call also be originated to call centers 650 (manufacturers, credit card providers, extended warranty providers, service providers, etc.). Multiple agents using agent telephones 220 and/or agent data terminals 230 will typically be supported by a call center using a common pilot number that is serviced by a group of telephone trunks that connect the call center 650 to the phone network 500. Inbound and outbound calls can optionally be bridged together to connect users 100 with agents 200. Calls can be recorded and/or monitored by the TPM system 1000. Optionally, the phone server subsystem 600 can output dtmf tones and voice commands to traverse Interactive Voice Response menus. For example, service providers may post phone numbers which bridge through the TPM system. The TPM system can simplify the caller experience by transitioning through a manufacturer's automatic call distribution system by outputting the appropriate sequence of dtmf tones (e.g., key-press 1 for warranty returns, and then enters 1 again for Electronics, etc.). Information related to the call is optionally stored in one or more databases and/or other computer media. Call information stored includes for example: call signaling information (caller ID, called party ID, privacy indicator, reason for call, etc.), duration of the call, keywords spoken by the caller or called party, recording of the call, dtmf tones (including those entered by a user), etc.

The TPM system 1000 optionally includes a Customer Relationship Management (CRM) service. The CRM engine can mine certain information with respect to a user's usage of the TPM system. For example, the TPM system can promote certain products and/or services based on products purchased and/or the length of time the product has been owned by a user. If an item is nearing the end of the manufacturer's standard warranty, an extended warranty and/or service/repair shop may be promoted. In addition, the CRM subsystem can provide other helpful hints on how best to use the system and/or notification of service recalls or administrative updates (e.g., notify a user that their password has not been changed in 6 months).

In this example, the TPM servers 600 and 800 are optionally centralized at a single location. Alternatively, they can be geographically distributed in a number of different locations. The TPM system 1000 can be a standalone system (e.g., a TPM system shared by a number of service providers) or the TPM system can be a suite of services functioning as a virtual system integrated into a service provider's internal systems (e.g., those systems employed to provide users online information and ecommerce services). Optionally, the TPM system 1000 is connected to a data communication network 400 and a phone network 500. The TPM system interconnects with the phone network 500 using standard telecommunication interfaces (e.g., ISDN or SS7) and via data communication networks using a secure router subsystem and an SMS server subsystem which optionally serves as a mail relay to transmit and receive SMS and MMS messages via a Short Message Service Center (e.g., an SMSC operated by a network carrier).

The TPM server 800 controls user access to stored database objects including purchase records. Users can sort and search information by merchant, by item type, by date, and by item price.

Types of information that can be stored by a TPM service provider are listed below. The list includes nonlimiting examples illustrative of objects that facilitate warranty management but is not meant to be an exhaustive list:

Purchase Transaction Logs—information regarding an online or offline purchase transaction, such as, by way of example, some or all of the following: time and date of purchase, merchant item SKU or UPC code, merchant item description, merchant item purchase price, purchase subtotal, sales tax, total purchase price, payment method, and credit card number.

Purchased Item Records—each purchased item that the TPM system 1000 is tracking and managing will have a database record for the item manufacturer, the item model number (where available), and the generic name of the item. Additionally, each managed item will also include, for example, warranty start and stop dates for the merchant return period, the manufacturer's warranty period, and the extended warranty period (where applicable).

Product Literature—online product specifications including user manuals, owner's manuals, and troubleshooting guides.

Product Manufacturers—information regarding standard warranty policies, available service locations/procedures, and contact information.

Extended Warranty Providers—information regarding warranty policies, available service locations/procedures, and contact information.

Credit Card Providers—information regarding covered services including extended warranty policies, available service locations/procedures, and contact information.

Product Compatibility—information regarding product compatibility with associated product accessories (e.g., a cell phone charger for a cell phone; a television remote control for a television)

Some or all of the information described above is obtained directly from a user purchase. Some of the information is obtained or derived from TPM public and private external databases. Source data for the external databases are optionally provided by manufacturers, warranty providers, trade associations, retailers, etc.

The captured/stored data is optionally organized and cached in the system's database and is made readily accessible for user presentation of various pieces of information of interest (e.g., retail merchant return policy, manufacturer's warranty period, extended warranty options, troubleshooting guides, owner's manual, etc.).

The TPM system includes a database and/or an interface to a database managed by a retail merchant that allows the TPM system to determine the make and model of a given item. The make and model information enables the TPM system 1000 to query one or more internal and/or external databases to determine the manufacturer's warranty terms (e.g., the TPM service provider optionally populates the relevant terms and conditions of thousands of suppliers/manufacturers and hundreds of items). The TPM system 1000 can optionally query one or more internal and/or external databases to access and make available to users product literature including owner's manuals, user guides, trouble shooting manuals, accessory guides, etc. Optionally, the TPM system 1000 is a platform for manufacturer's to host their product literature. The manufacturer's push or make their documentation accessible to users of the TPM system by authenticating into the TPM system and electronically transferring the product literature to the TPM system. The TPM provider optionally provides a structured system environment for the cataloging and literature placement. Optionally, the TPM provider audits product literature available to users on the TPM system. Inappropriate product literature, or literature not up to the TPM provider's standards, can be deleted and/or sent back to the manufacturer for rework/revision. Optionally any product literature hosted on the TPM system is indexed and searchable via keywords and/or categories (e.g. trouble shooting, accessories, product configuration).

The TPM system optionally host information associated with product maintenance and part replacement. Maintenance periods are optionally calendarized by the TPM system and made accessible to users. The system is configurable to allow notifications (e.g., text, email, phone) to be delivered to the user when a maintenance action is required (e.g., change a filter). Optionally, the TPM provider enables the user to purchase a replacement part in the context of the notification (e.g., a link to purchase in a notification email or a control in a widget display). As discussed above, optionally the TPM provider receives information from product manufacturers, reformats the maintenance information (e.g., in a standardized presentation), and/or configures the maintenance notifications. Optionally, an electronic interface is provided to the TPM system to enable product manufacturers to access the system directly for maintenance information presentation and/or notification configuration with authentication and audit controls as discussed above.

The TPM system can also determine from the purchase transaction whether an extended warranty or service contract was purchased. As described above, the TPM system 1000 can query one or more databases to determine the terms and conditions of the extended warranty. Optionally, instead of or in addition to an automated query, the user is requested to enter (e.g., via a web form) any associated extended warranty details which occur outside of the TPM system.

The TPM system includes a subsystem used for determining whether a credit card includes an extended warranty and the terms and conditions of that policy. Some credit card companies optionally provide their card holders with additional protection policies (e.g., extended warranties). Optionally, protection policies are only available on premium cards or those cards with annual fees. Optionally, a data network interface between the TPM system 1000 and the major providers of credit cards is used to query their database 950 with the user's credit card information to determine if they have protection policies. Optionally, the TPM provides the user instructions on how to determine if their credit card(s) includes protection services. The terms and conditions are then manually entered by the user into the TPM system.

The TPM system 1000 includes a notification feature. This service enables the TPM system to display alerts/notification messages (e.g., in a Widget application on a data terminal 130 or mobile device 120), transmit notification/alert messages to a user's mobile device 120, transmit notification/alert messages to a user's email address, transmit notifications/alert messages to an instant message application, etc. For example, the TPM system may transmit an alert of warranty expiration over a wireless data connection via a Short Message Service (SMS) or Multi-Media Messaging Service (MMS). SMS and MMS are wireless messaging services that enable the transmission of messages between mobile subscribers (and their phones) and external systems such as electronic mail services. In another example, the phone server 600 may place an outbound call and play an audio message alerting the user to important claims period events (e.g., warranty expiration,).

The TPM system 1000 is optionally electronically interfaced to data processing systems 850 owned and operated on behalf of selected Merchants, Manufacturers, Credit Card Companies, and warranty repair Service Providers (see FIG. 1). This provides improved quality and reduced cycle times for most claims processing. Electronic access can be via a secure interface to their external servers and databases as described above, or via hosting this information directly in the TPM system database 900.

The TPM system 1000 optionally enables users to join two or more accounts. The purpose of account joining is to provide the user with a single or unified presentation of all items the members of the household (or associates) have purchased. For example, if a husband and wife separately purchased several items from a merchant supported by the TPM system, joined accounts allows the husband (and/or wife) to review and manage the warranty status of all purchased items. Optionally, the user must request permission to access warranty records for items purchased by the other member and that member must explicitly authorize or grant access rights to their purchased items. Optionally, a set of criteria can be established by the online merchant to allow joint warranty status viewing without permission. Example criteria include the purchase of merchant items using a common credit card, common ship to address, common billing address, common contact phone number or email address, and/or same last name. If associate authorization is required, a number of confirmation processes can be employed. For example, an email can optionally be sent to the associate which contains a link that must be selected by the user. Optionally, the link when selected presents a web page which requires the user to enter their user ID and/or password for authentication before the account joining is concluded. Optionally, the authorization steps cause the TPM system 1000 to place an outbound call to the associate. The associate is then asked to approve the joining action, including a step of first speaking or key-pressing their login credentials. Optionally, the TPM system 1000 receives an inbound call from the associate to a specified number. The TPM system 1000 optionally requires the associate to originate a call from a number associated with the associate's merchant account. That is, the TPM system compares the calling party ID and/or charge number to partially determine the identity of the caller. Optionally, the associate is prompted after the call is answered to key-press or speak their login credentials.

Figure 2:
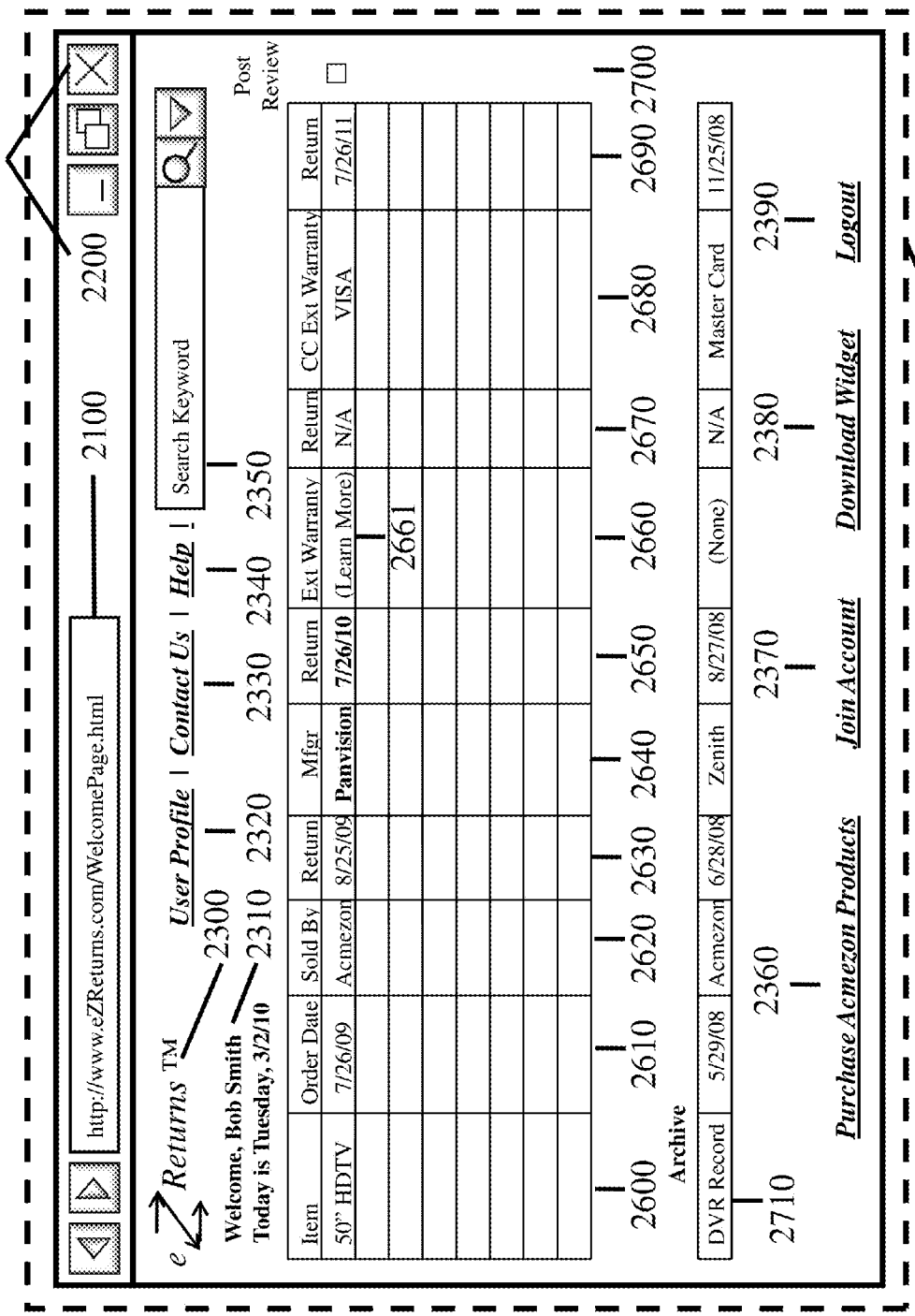
FIG. 2 illustrates an example TPM user interface used to display a summary of warranty status for purchased products.

FIG. 2 illustrates an example TPM system user interface 2000 presented via a browser (or other interface application) to a user. The browser can be, by way of example, executing on a computer terminal 130, such as a PC, a Wireless Application Protocol (WAP) or browser-enabled phone 120, a PDA or the like. The web page can optionally be accessed by selecting a control on a widget/gadget application program 8100 (see FIG. 8), by supplying the appropriate Uniform Resource Locator (URL) to the browser 2100, by selecting a link in response to a search query, or the like (the latter two access methods optionally may require the user to first login by submitting a user id and/or password). The example user interface provides a top-level or home page display of all purchased items that are in an active warranty state. An active state is when a purchased item is covered under a retail return period, manufacturer's warranty, or extended warranty. In addition, the web page user interface optionally allows the user to access other features of the online merchant web site including: purchase merchant products, join accounts, download merchant widget, etc. The example user interface includes an area of common controls replicated on most of the example web-based pages described below. These common controls include branding 2300 (e.g., eZReturns™), links 2320-2340 to other TPM system services (e.g., user profile, help, and contact information), and a search capability 2350 to assist the user in finding purchases and/or warranty information associated with a user account. Optionally, the web page display includes a welcome message to the user 2310 including the user's name.

Optionally the body of the display includes a tabular list of the user's purchases and related warranty return information 2600-2700. For example, the display includes in a first column 2600 the (name of) items a user has purchased. Optionally, displayed items in the field 2600 have an associated web control link that, when selected by a user, opens a new web browser and displays a new web page which includes details about the purchased item including for example: name of the I\item, manufacturer, brief description of the item, and a link to a user manual. The display optionally includes a second column identifying the date 2610 the items listed in the first column were purchased by the user. The display optionally includes a third column identifying the merchant 2620 the item in the first column was purchased from. The display optionally includes a fourth column identifying the last date 2630 that the purchased item can be returned to the merchant. Optionally, entries in the return field 2630 have a web control link that when selected by a user opens a new web browser and displays a new web page which includes details about returning the item to the merchant. Optionally, if the return field 2630 is selected when the return period has expired, a warning message is displayed to the user. The display optionally includes a fifth column identifying the manufacturer 2640 of the purchased item. Optionally, entries in the manufacturer column 2640 have a web control that when selected by a user opens a new web browser and displays a new web page which includes details about the manufacturer's warranty. Optionally, if the manufacturer field 2640 entry is selected when the manufacturer's warranty period has expired, a warning message is displayed to the user.

The display optionally includes a sixth column identifying the last day of the manufacturer's warranty 2650 of the purchased item in the first column. Optionally, entries in the manufacturer's warranty field 2650 have a web control that when selected by a user opens a new web browser and displays the same information as that displayed when the manufacturer field 2640 is selected. The display optionally includes a seventh column identifying the extended warranty provider 2660 of the purchased item. Optionally, if an extended warranty has not been purchased by the user, the display includes a reference to a "learn more" link 2660 which provides the user with additional information on extended warranties. Optionally, entries in the extended warranty provider field 2660 include a web control that when selected by a user opens a new web browser and displays a new web page which includes details about filing an extended warranty claim. Optionally, if the extended warranty field 2660 is selected when the extended warranty period has expired, a warning message is displayed to the user. Optionally, if an extended warranty has not been purchased by the user, additional detail is provided in the new web page to the user about the features and costs of an extended warranty for the purchased item 2600. Optionally, the new web page allows the user to enter details regarding an extended warranty purchased by the user from a different merchant or warranty provider. The display optionally includes an eighth column identifying the last date 2670 of the extended warranty. Optionally, entries in the extended warranty field 2670 have a web control that when selected by a user opens a new web browser and displays the same information as that displayed when the extended warranty provider field 2660 is selected. Optionally, the extended warranty field 2670 displays N/A (Not Applicable) if an extended warranty has not been purchased for the item. The display optionally includes a ninth column identifying the credit card extended warranty provider 2680 of the item in the first column. Optionally, if the purchase was made without a credit card or with a credit card without an extended warranty feature, the display includes a reference to a "learn more" link 2680 (see 2661 for an example "learn more" display). Optionally, entries in the credit card extended warranty provider field 2680 have a web control that when selected by a user opens a new web browser and displays a new web page which includes details about filing a credit card extended warranty claim. Optionally, if a credit card extended warranty is not applicable (as determined by the TPM system), additional detail is provided in the new web page to the user about the advantages of a credit card extended warranty for the purchased item, 2600, and how they might acquire a credit card with this feature (e.g. if offered by the merchant of if the merchant is promoting a third party credit card). Optionally, the new web page allows the user to enter details regarding a credit card extended warranty (e.g. if the credit card terms and conditions are not in the TPM system database). The display optionally includes a tenth column identifying the last date 2690 of the credit card extended warranty. Optionally, entries in the credit card extended warranty field 2690 have an associated web control that when selected by a user opens a new web browser and displays the same information as that displayed when the credit card extended warranty provider field 2680 is selected. The display optionally includes a post review control 2700. If the user selects the Post Review control 2700 check list entry, a new web browser opens and a new web page is displayed allowing the user to post review comments on the product, product reliability, and/or product return process (as described below in FIGS. 14 and 15).

Optionally the browser user interface also includes an archive display of items purchased 2710 by a user that are no longer in an active warranty state. The browser user interface also includes a web control 2360 which allows a user to access the merchant's inventory of items for purchase, a web control 2370 which optionally opens a new browser interface to enable a user to access one or more web pages in order for a user to join one or more accounts (account joining is described above), a web control 2380 which allows a user to download a widget/gadget, and a web control 2390 which enables a user to logout of the authenticated warranty tracking area.

Figure 3:
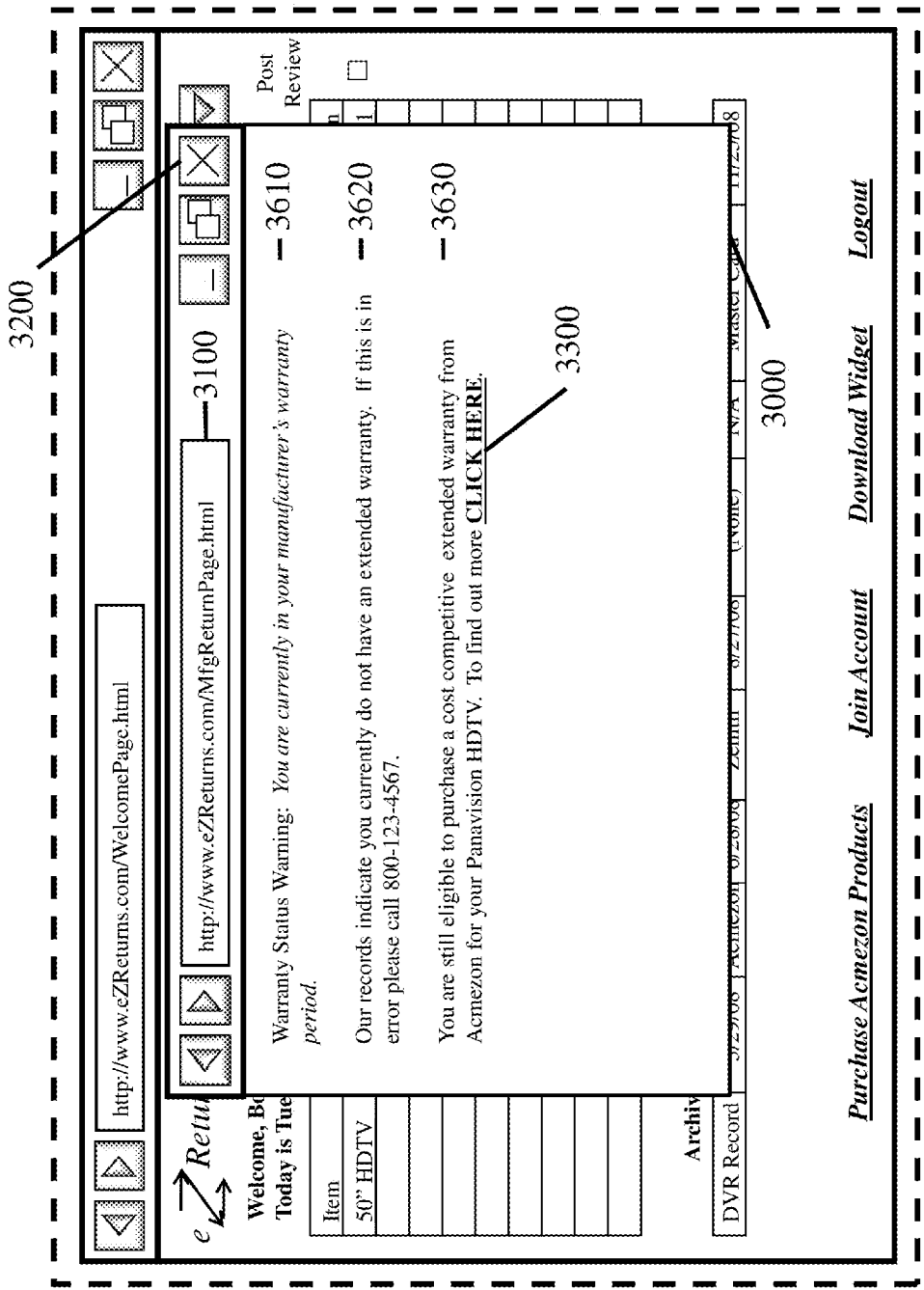
FIG. 3 illustrates an example TPM user interface used to display a warning message for a selected warranty period of a purchased item.

FIG. 3 illustrates an example TPM system user interface 3000 presented via a browser (or other interface application) to a user who selected the extended warranty control 2661 during a time period outside the extended warranty period, see FIG. 2. Optionally, the new web page display warns the user they are not in the extended warranty period 3610 and provides the user with contact information if they believe this is in error 3620. In addition, a web control (link) 3300 for additional information on the advantages and costs of an extended warranty is provided to the user 3630.

Figure 4:
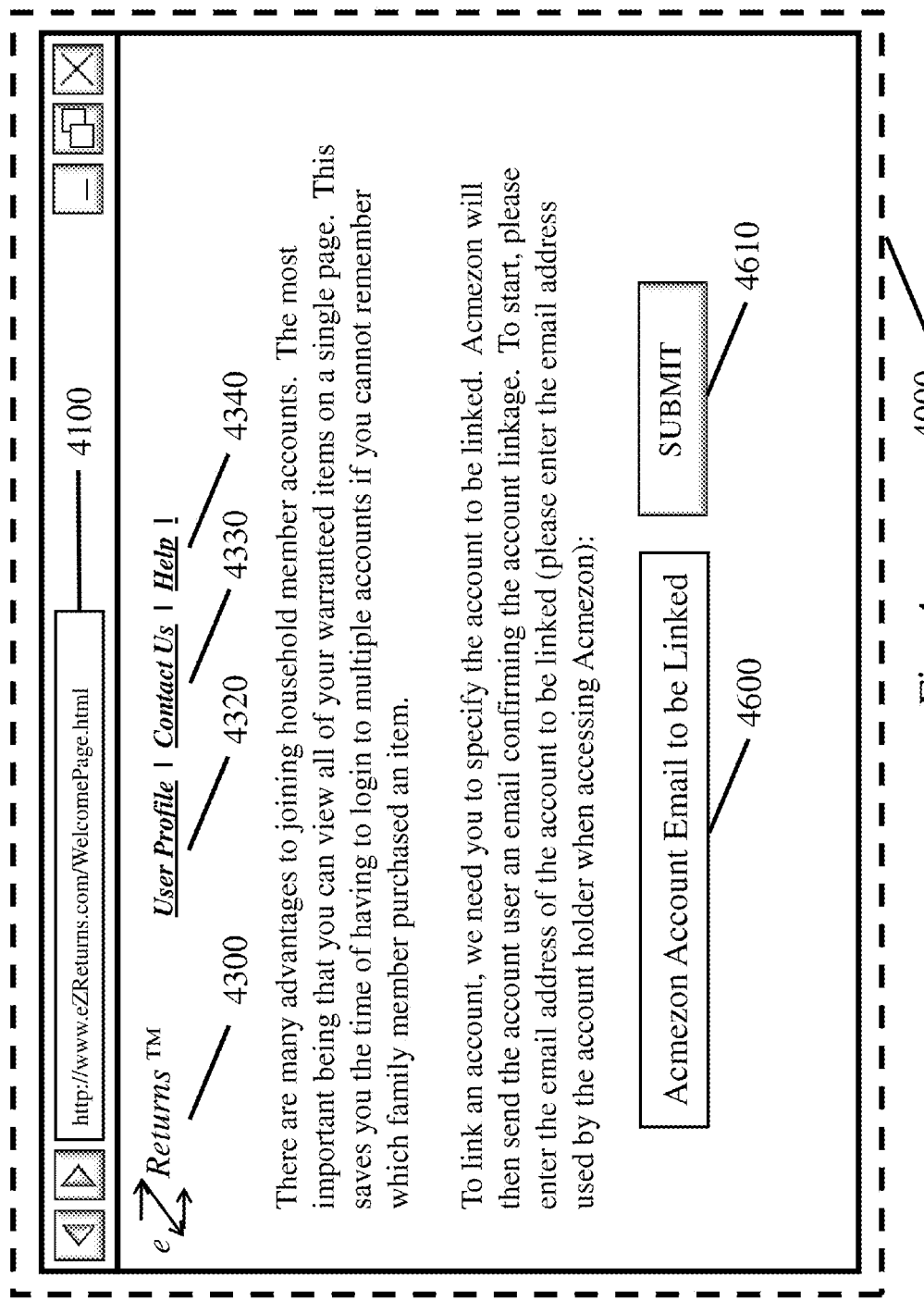
FIG. 4 illustrates an example TPM user interface display of an example first step in joining/linking member accounts.

FIG. 4 illustrates an example TPM system user interface 4000 presented via a browser (or other interface application) to a user who selected the JOIN account control 2370, see FIG. 2. The web page includes branding 4300 and a collection of common service provider browser controls 4320-4340 such as user profile (review and edit), contact the merchant, and help. The web page provides the user with instructions on the advantages of joining one or more accounts for warranty tracking purposes. In addition, the web page describes the account linking process and invites the user to enter the email address of the user to be joined to the account (associate account) in the email account field 4600. The submit control 4610 causes the user entered email address to be sent over the data network 400 to the TPM server 800. The server 800 looks up the entered email address in the account database 900. If a match is found, a confirmation is displayed to the user, see FIG. 5. The owner of the pending joined account is then sent an email which contains a link which the owner must select to authorize the account linking. If an email match is not found in the account database 900, an error message is displayed to the user.

Figure 5:
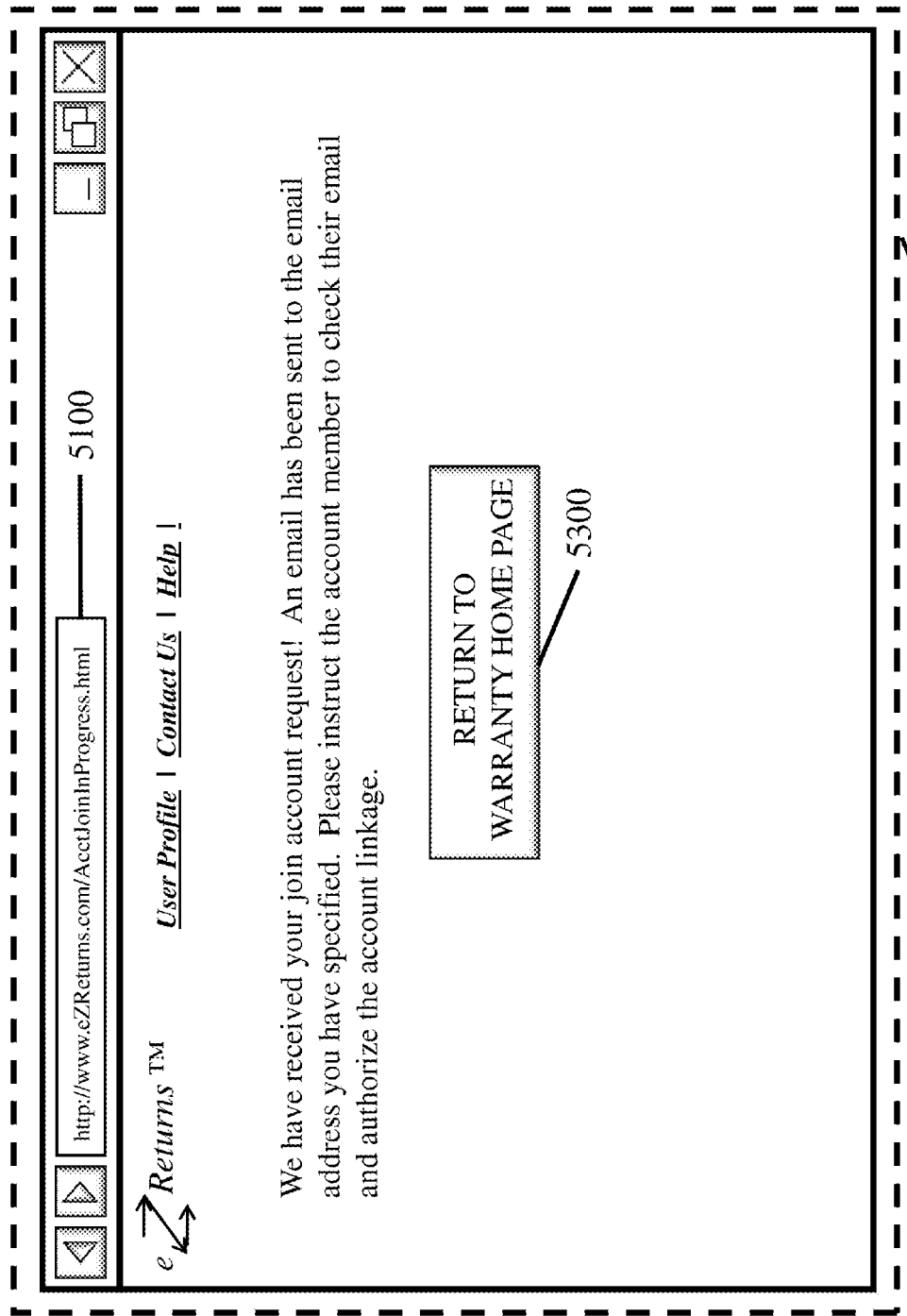
FIG. 5 illustrates an example TPM user interface display of an account/joining confirmation message.

FIG. 5 illustrates an example TPM system user interface 5000 presented via a browser (or other interface application) to a user who selected the submit control 4610 after entering a valid associate account email address, see FIG. 4. The web page confirms the email address entered by the user matches a member. Optionally, the web page includes a return to warranty home page control 5300, along with branding and a collection of common service provider browser controls.

Figure 6:
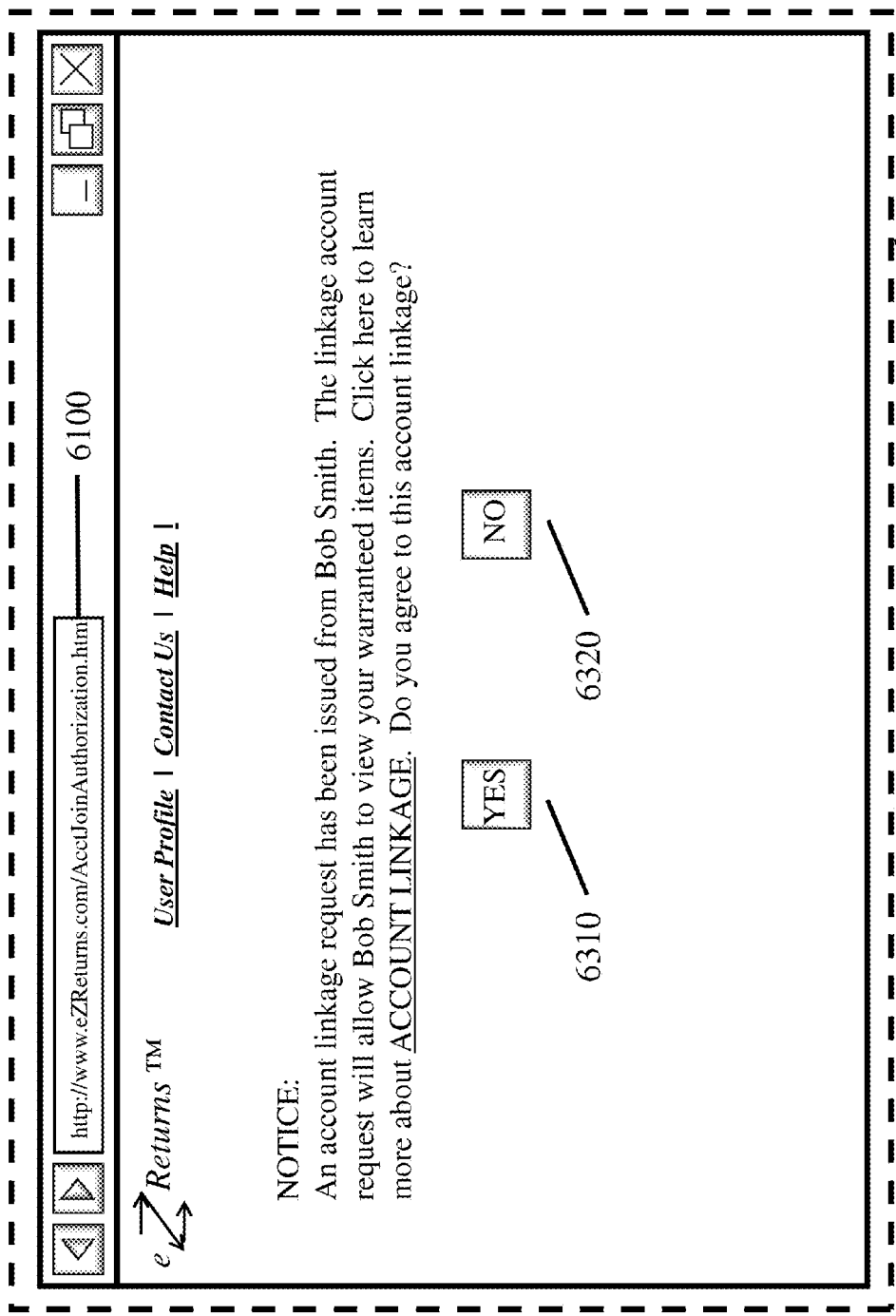
FIG. 6 illustrates an example TPM user interface display of an example step in joining/linking member accounts.

FIG. 6 illustrates an example TPM system user interface 6000 presented via a browser (or other interface application) to an associate account user who selected a link in a join account email and logged in with their password and user identification. The web page informs the user of the request by another user to join his/her account. The user can optionally select the yes control 6310 or the no control 6320. If the no control is selected by the associate account user, the TPM system will not join the associate account with the user account. If the yes control is selected by the associate account user, the TPM system will join the user and associate account but only for the first user. Optionally, if the associate account is interested in joining the user's account, the user would have to follow the join account steps described above.

Figure 7:
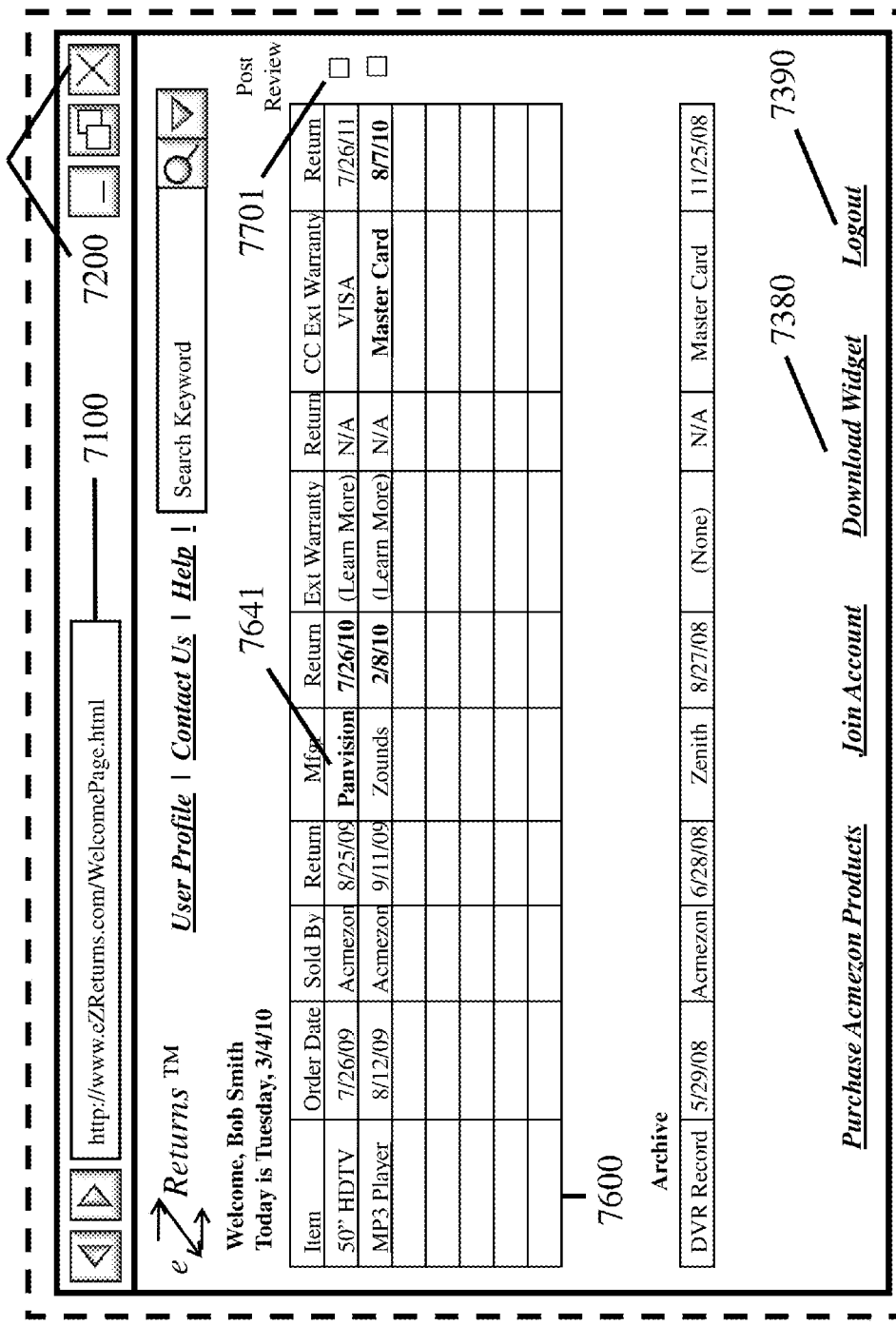
FIG. 7 illustrates an example TPM user interface used to display a summary of warranty status for purchased products.

FIG. 7 illustrates an example TPM system user interface 7000 presented via a browser (or other interface application) to a user whose account has been joined with another user. The web page displayed to the user of the joined account is similar to that described in FIG. 2. The primary difference between FIG. 7 and FIG. 2 is that the FIG. 7 display includes all items purchased by the user and the associate account user. Optionally, if the user selects items field 7600, the associated description displayed to the user (e.g., in a new web browser) includes which user (primary or associate) purchased the selected item.

In an example embodiment, a widget application 8100 (see, for example, FIG. 8) connects to and communicates with a TPM system 1000 via the Internet, an Intranet, or other data network 400. The widget application, executing on a user's computer terminal or other host, can be used to, for example, login and authenticate into a TPM web site, navigate directly to different sections of a TPM web site, alert the user of important events, and display selected information under server control 800. In normal operational display mode 8100, the widget optionally displays the name/branding of the TPM service provider 8300. Optionally, if the user double clicks on the branding control 8300, the user's browser is activated (if not already active), the user is auto-logged into their TPM service provider account, and the TPM service provider warranty home page (see FIG. 2 for an example warranty home page) is displayed.

The example widget also has an alert display 8500 which notifies the user of important information or events (e.g., pending or recently expired warranties). For example, the alert icon might flash yellow when a warranty period is within a week from its expiration date. When a warranty period is less than forty-eight hours from expiration, the alert icon might flash red. Optionally, a user gesture such as double clicking on the alert icon causes the activation of the user's browser (if not already active), the user to be auto-logged into their TPM service provider account, and the TPM service provider warranty home web page to be displayed (see FIG. 2 for an example warranty home page). Optionally, the warranty home page displays the content of the alert messages which can be optionally individually deleted. Optionally, the alert message is a notification of a text message or email message sent to the user. Optionally, there is no specific message associated with an alert. Additionally, an active alert notification (e.g., flashing icon) can be acknowledged (transitioned to a non-flashing alerting state) by a single user gesture (e.g., mouse click or double click as described above) on the alert icon 8500. Optionally, the widget's active alert can be acknowledged by a user logging into their TPM system account and deleting any listed alerts. The widget's alert can also optionally display the number and/or type of alert messages for review by the user.

The widget optionally contains account information access controls. Selecting (e.g., single or double clicking) the account control 8610 activates the user's browser (if not already active), auto-logs the customer into their account and displays their account information (e.g., name, payment information, password, email address for updates and notifications, mobile phone number for notifications and/or security authentication, etc.). The widget also optionally contains a control 8620 for accessing those items that the TPM system is warranty coverage tracking. Selecting the "My Warranties" control 8620 activates the user's browser (if not already active), auto-logs the customer into their account and displays a top-level view of their items tracked for warranty coverage (see FIG. 2 for an example). The widget also optionally contains a control 8630 for accessing the merchant's web site shopping area.

Figure 9:
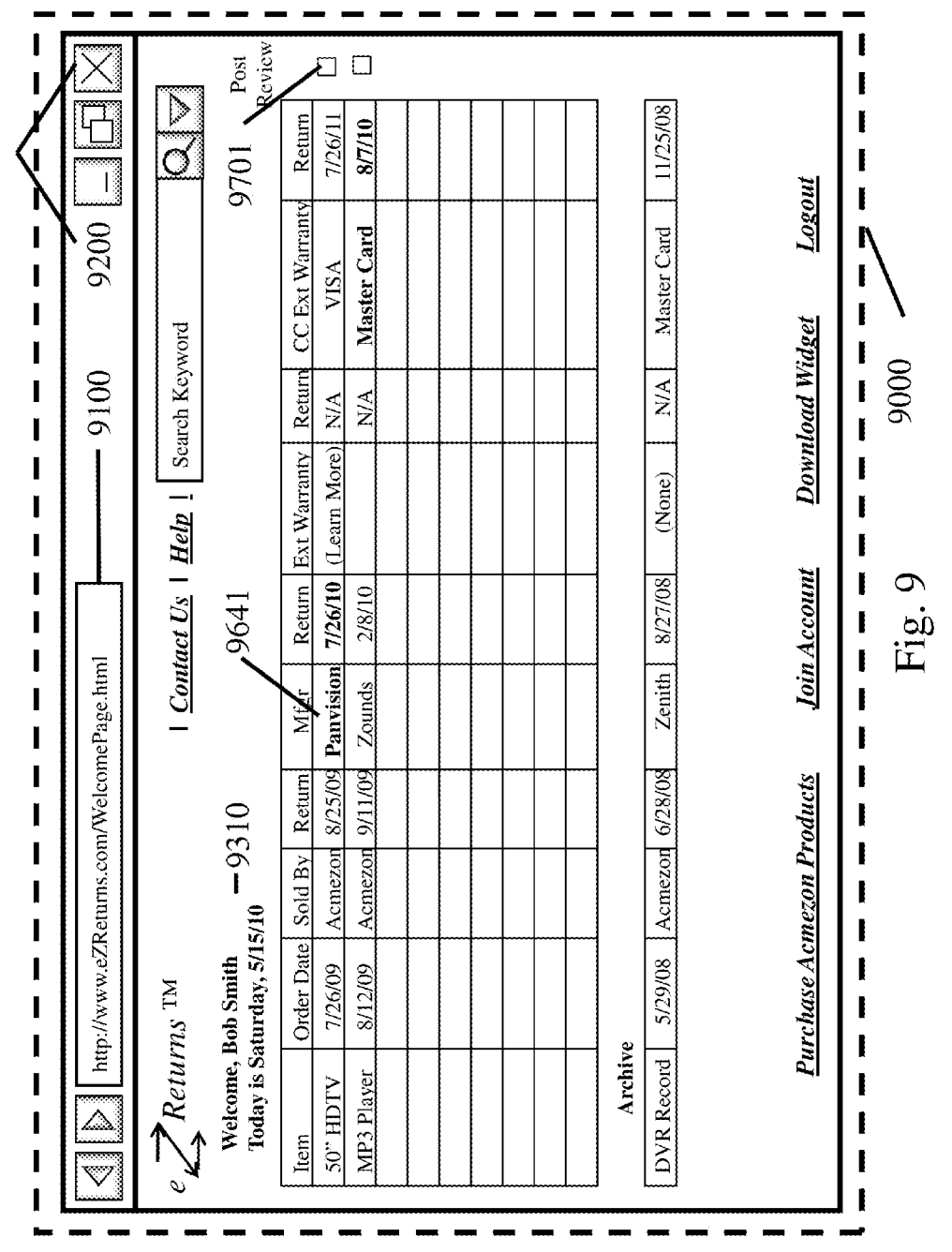

FIG. 9 depicts another example TPM system user interface 9000 like that shown in FIG. 7 but at a later date 9310.

Figure 10:
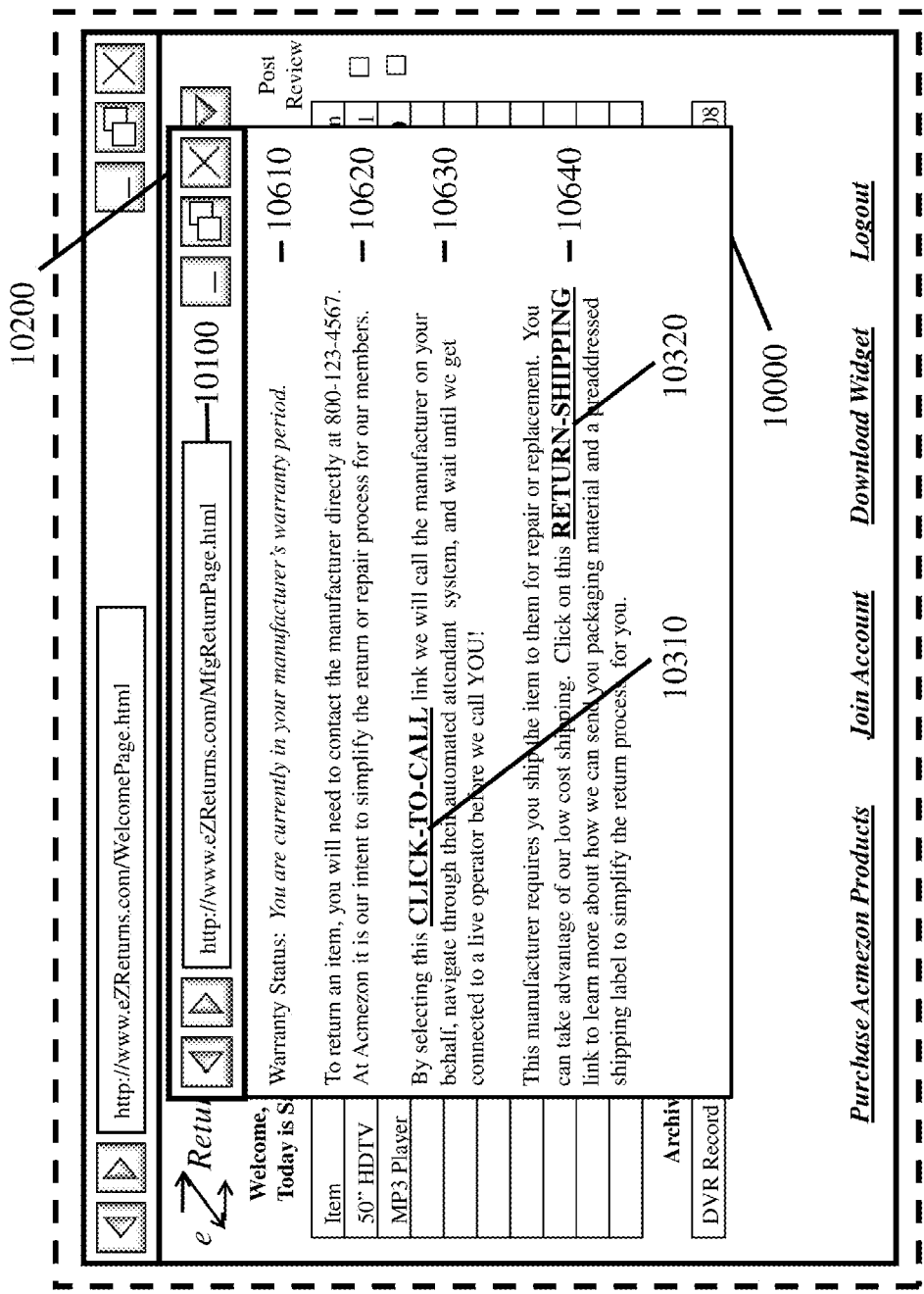
FIG. 10 illustrates an example TPM user interface used to display detailed warranty status for a selected purchased item.
Figure 11:
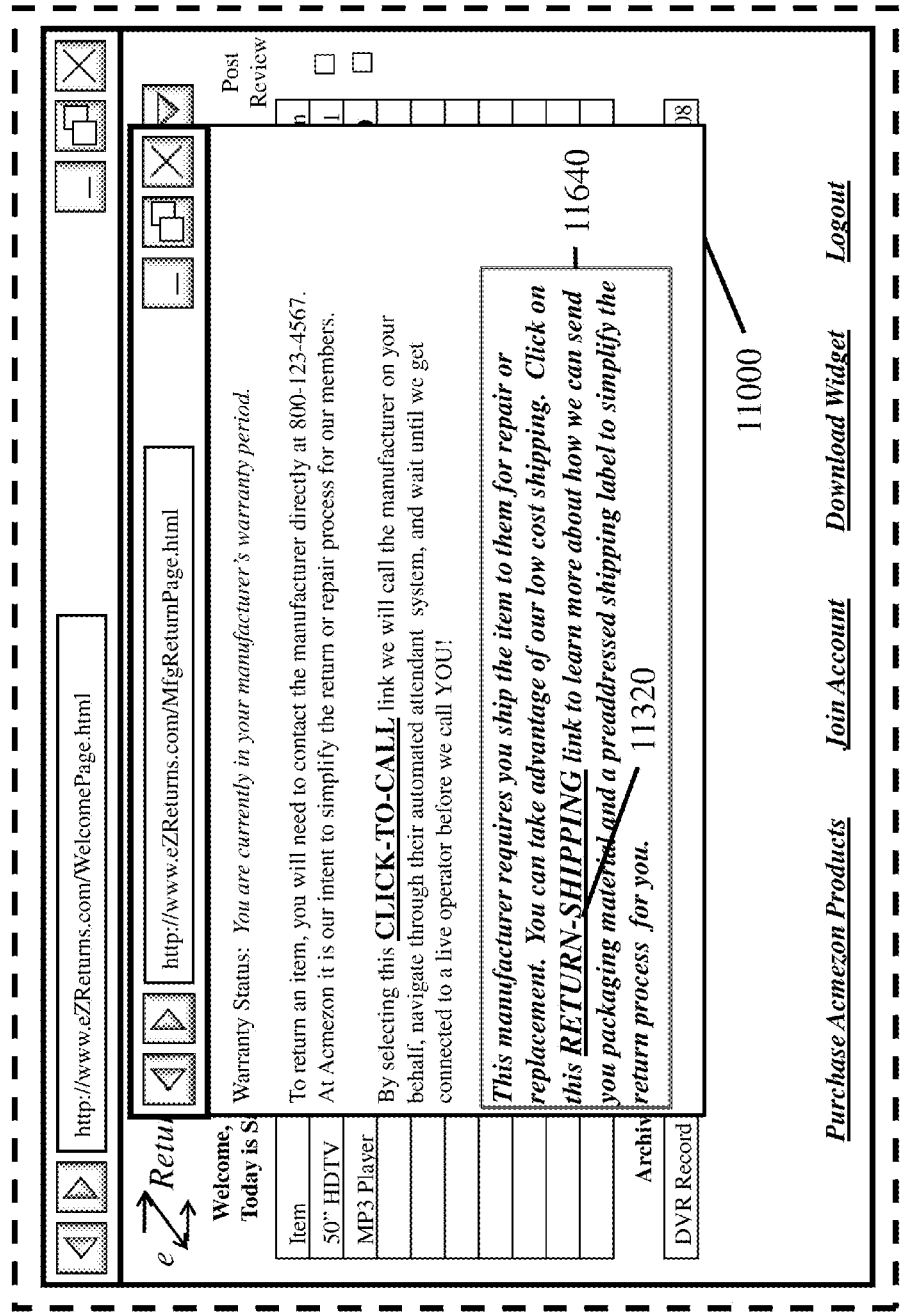
FIG. 11 illustrates an example TPM user interface update based on user completion of a TPM facilitated phone call.

FIG. 10 illustrates an example TPM system user interface 10000 presented via a browser (or other interface application) to a user who selected the warranty control 9641 during a time period inside the warranty period, see FIG. 9. Optionally, the new web page display provides:

a confirmation message 10610 that the user is in the product warranty period;

a phone number/address 10620 that the user can call to receive warranty repair and/or return instructions;

a more user friendly way to contact the manufacturer 10630 using a CLICK-TO-CALL link 10310 which if selected by the user causes the TPM system to place a call to the product manufacturer on behalf of the user, then call the user, and then bridge the two call legs together.

shipping return instructions 10640 and/or a link 10320 to another web page where a user can obtain additional information on purchasing pre-addressed shipping label and return packaging material. This is displayed only if the product manufacturer requires the return of the product for repair and/or replacement, FIG. 11 illustrates an example TPM system user interface 11000 presented via a browser (or other interface application) to a user who has just completed a call through the TPM system, either directly or using the CLICK-TO-CALL link with the product manufacturer. The return shipping instructions 11640 are optionally highlighted to the user (e.g., by changing the color of the text, by bolding the text, by flashing the text color from black to red to black).

Figure 12:
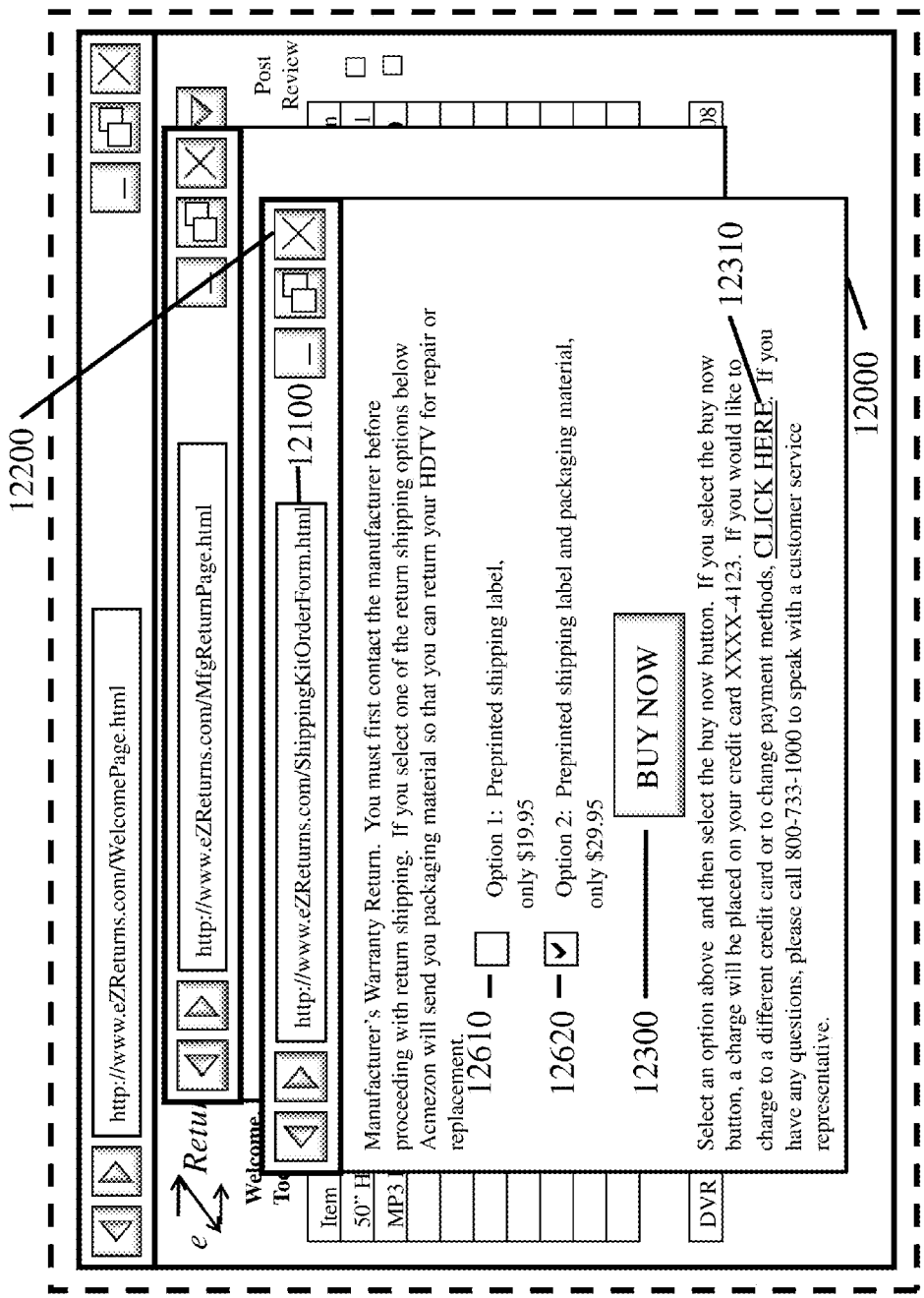
FIG. 12 illustrates an example TPM user interface used to display an example shipping kit purchase order form.

FIG. 12 illustrates an example TPM system user interface 12000 presented via a browser (or other interface application) to a user who has just selected the return shipping web control 11320, see FIG. 11. The new web page displays return shipping options to the user. Optionally, the web page displays a first user return shipping option 12610 to purchase a pre-printed shipping label. This option provides advantages to the user in that the user doesn't need to determine where to ship the item. This option may also provide the user with lower cost shipping due to the merchant's shipping economies of scale (contracted rates). Optionally, a second user return shipping option 12620 is presented to the user. This option provides the user the first option advantages and additionally provides appropriately sized shipping material that can be used to ship the item back to the manufacturer (e.g., if the user did not keep the original packaging material). The web page includes a buy now control 12300 which, if clicked after the user has made a selection between the two shipping options, places a charge on the user's credit card. Optionally, the user can select a different payment method or charge card by selecting the web link/control 12310.

Figure 13:
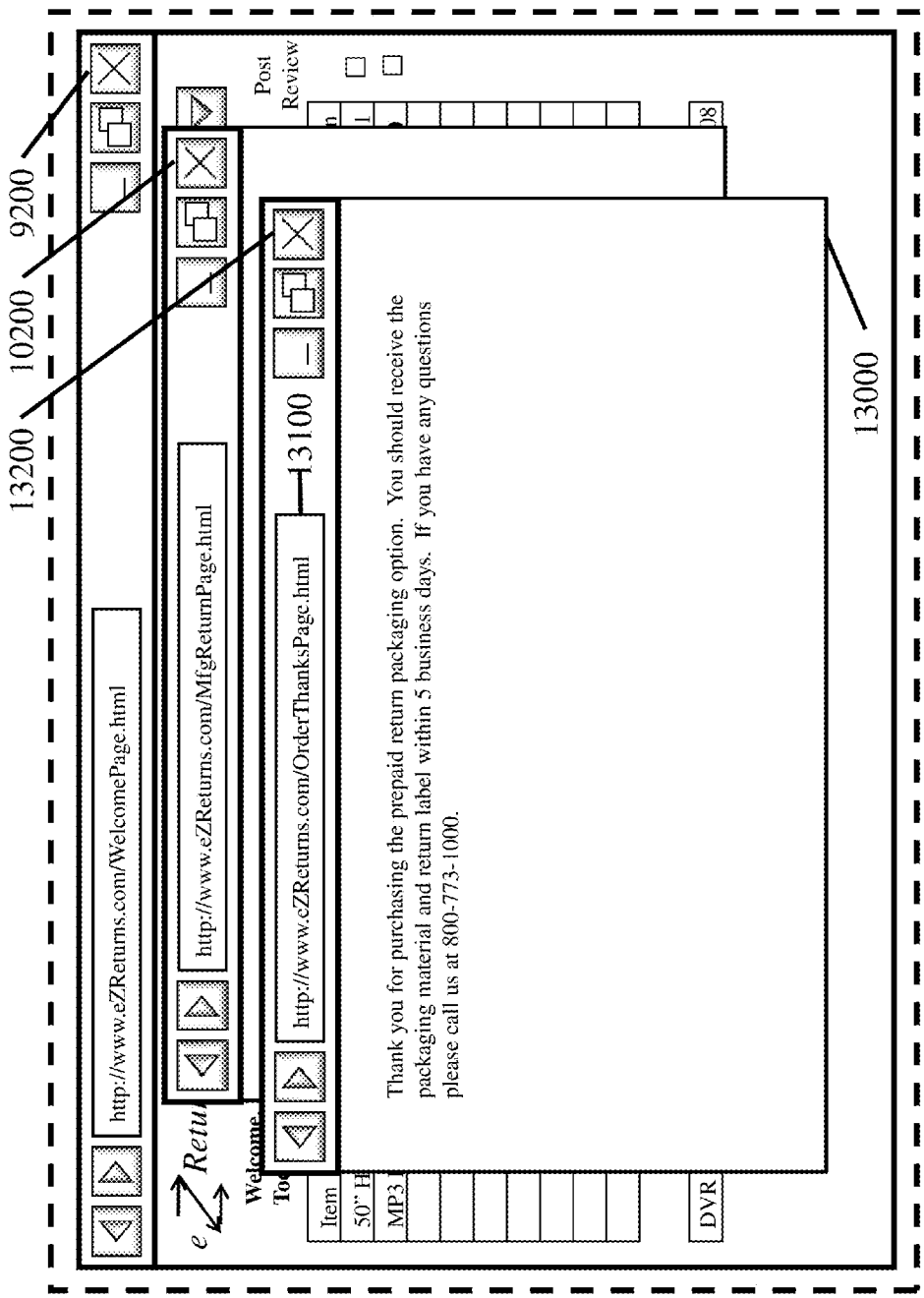
FIG. 13 illustrates an example TPM user interface display of an example purchase order confirmation message.

FIG. 13 illustrates an example TPM system user interface 13000 presented via a browser (or other interface application) to a user who has just selected the BUY NOW control 12300, see FIG. 12. The web page confirms the purchase transaction to the user.

Figure 14:
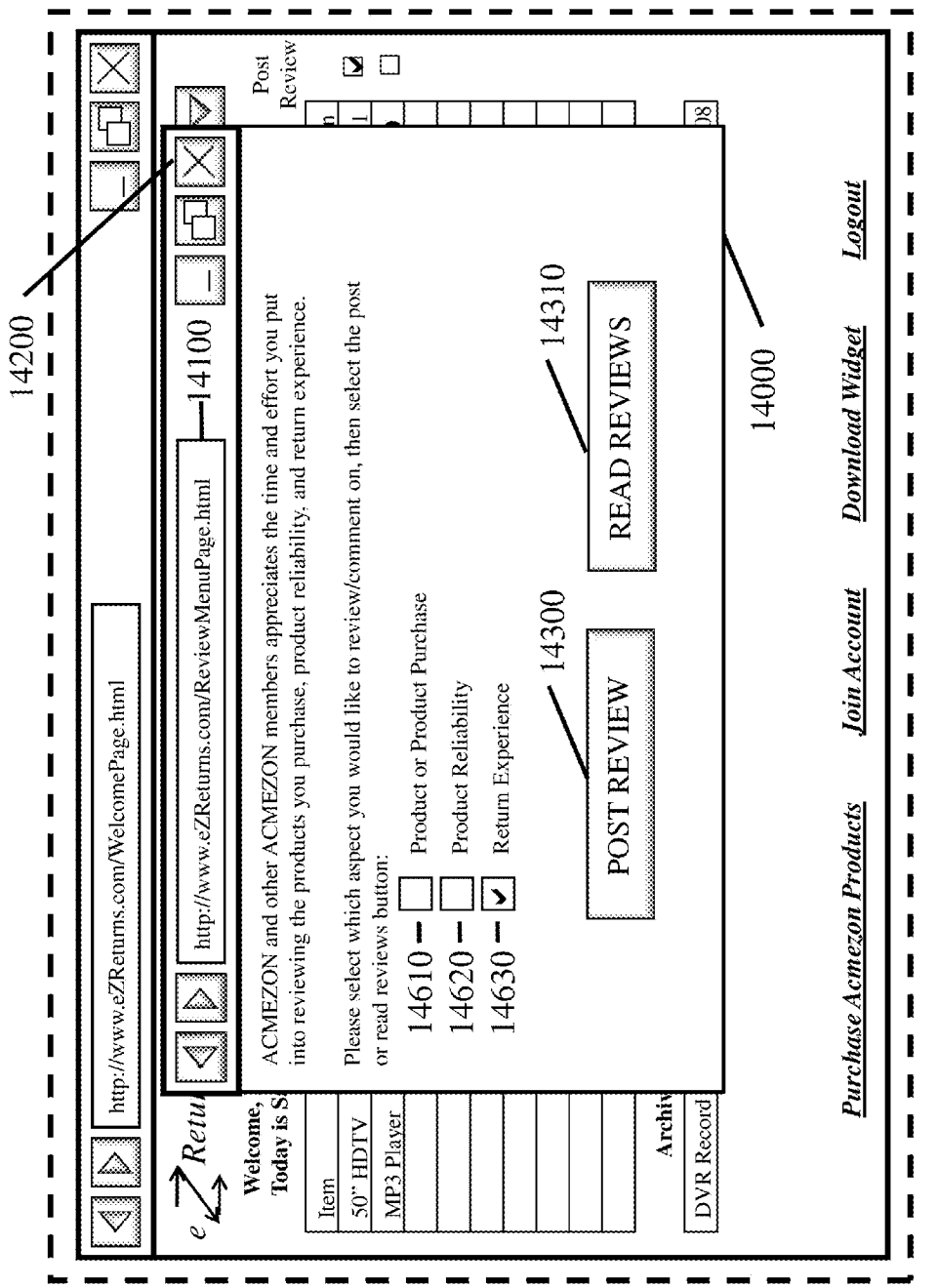
FIG. 14 illustrates an example TPM user interface used to display/post a member's warranty return experience.

FIG. 14 illustrates an example TPM system user interface 14000 presented via a browser (or other interface application) to a user who has just selected the post review control 9701, see FIG. 9. Optionally, the web page allows the user to provide feedback to other users and the merchant regarding their experience with the product, product reliability, and/or return experience. Optionally, the web page includes a first user control which categorizes the user review as a product or product purchase review 14610, a product reliability review 14620, or a return experience review 14630. Optionally, the web page includes controls to post a review 14300, and to read reviews 14310 posted by others. The type of review to be read or posted is determined by the web selection controls 14610-14630.

Figure 15:
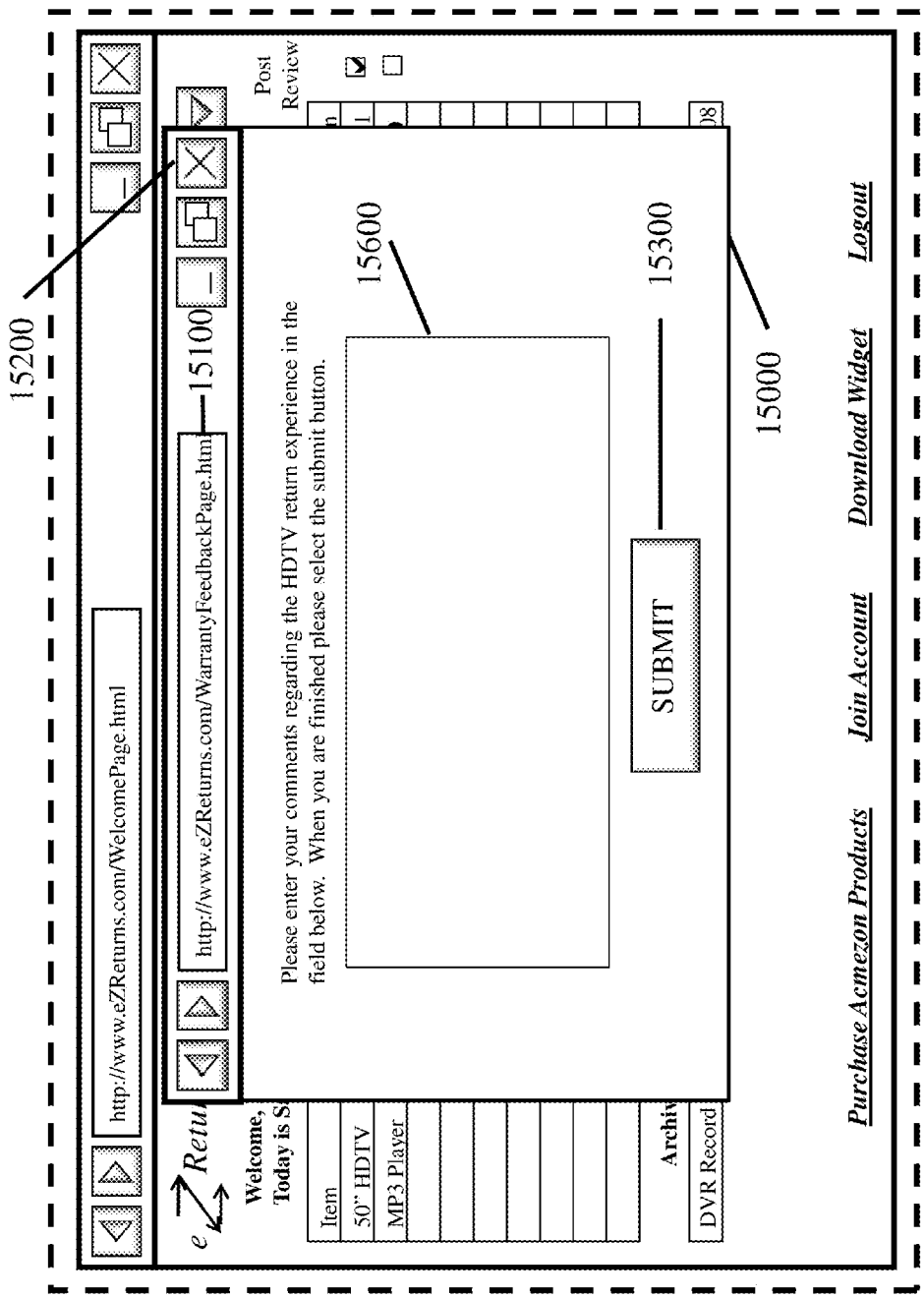
FIG. 15 illustrates an example TPM user interface used to display an example member review form.

FIG. 15 illustrates an example TPM system user interface 15000 presented via a browser (or other interface application) to a user who has just selected the post review control 14300, see FIG. 14. The web form allows a user to provide feedback relating to the purchased product on the merchant's web site. The web form provides the user with instructions and presents a free-format field 15600 where the user can type in their comments. (Optionally, the format can be structured with specific questions the user can respond to or select items from pull down menus. Optionally, the form allows the user to upload pictures, videos, and/or sound.) After the user has entered their comments in the web form, the user selects the submit control 15300 to post their review (send the comments over the data network 400 to the TPM system for posting).

Figure 16:
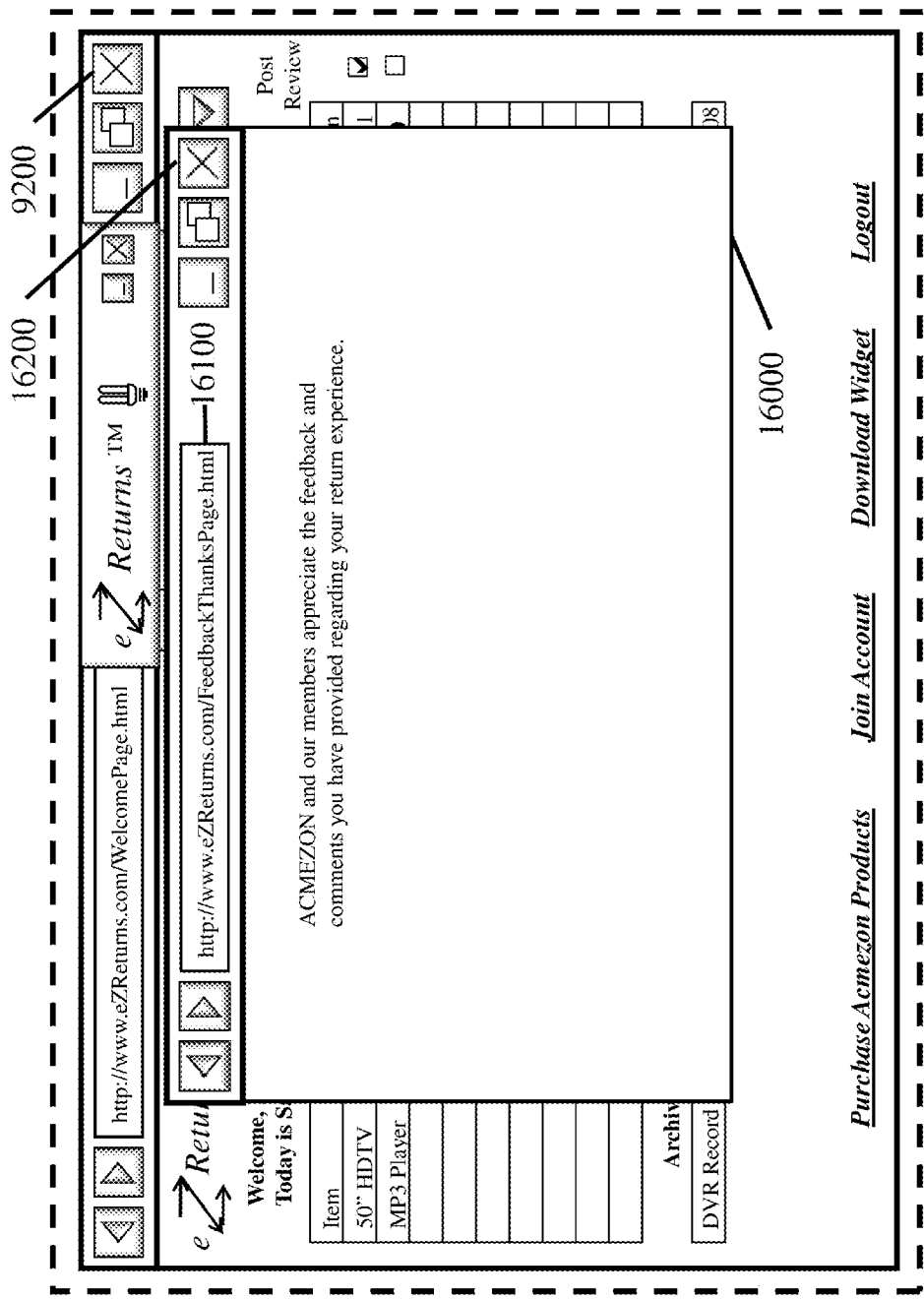
FIG. 16 illustrates an example TPM user interface display of an example member review confirmation message.

FIG. 16 illustrates an example TPM system user interface 16000 presented via a browser (or other interface application) to a user who has just entered comments into a web form and selected the submit control 15300, see FIG. 15. The web page confirms the receipt of the user comments.

FIG. 17 illustrates an example TPM system user interface 17000 presented via a browser (or other interface application) to a user which provides a top-level or home page display of all purchased items that are in an active warranty state. The display and web controls are described in detail in the FIG. 2 description above. In this example display, the user's product purchase is in the credit card warranty state (as signified by the bold font, in this example, in the credit card warranty fields 17681 and 17691).

Figure 18:
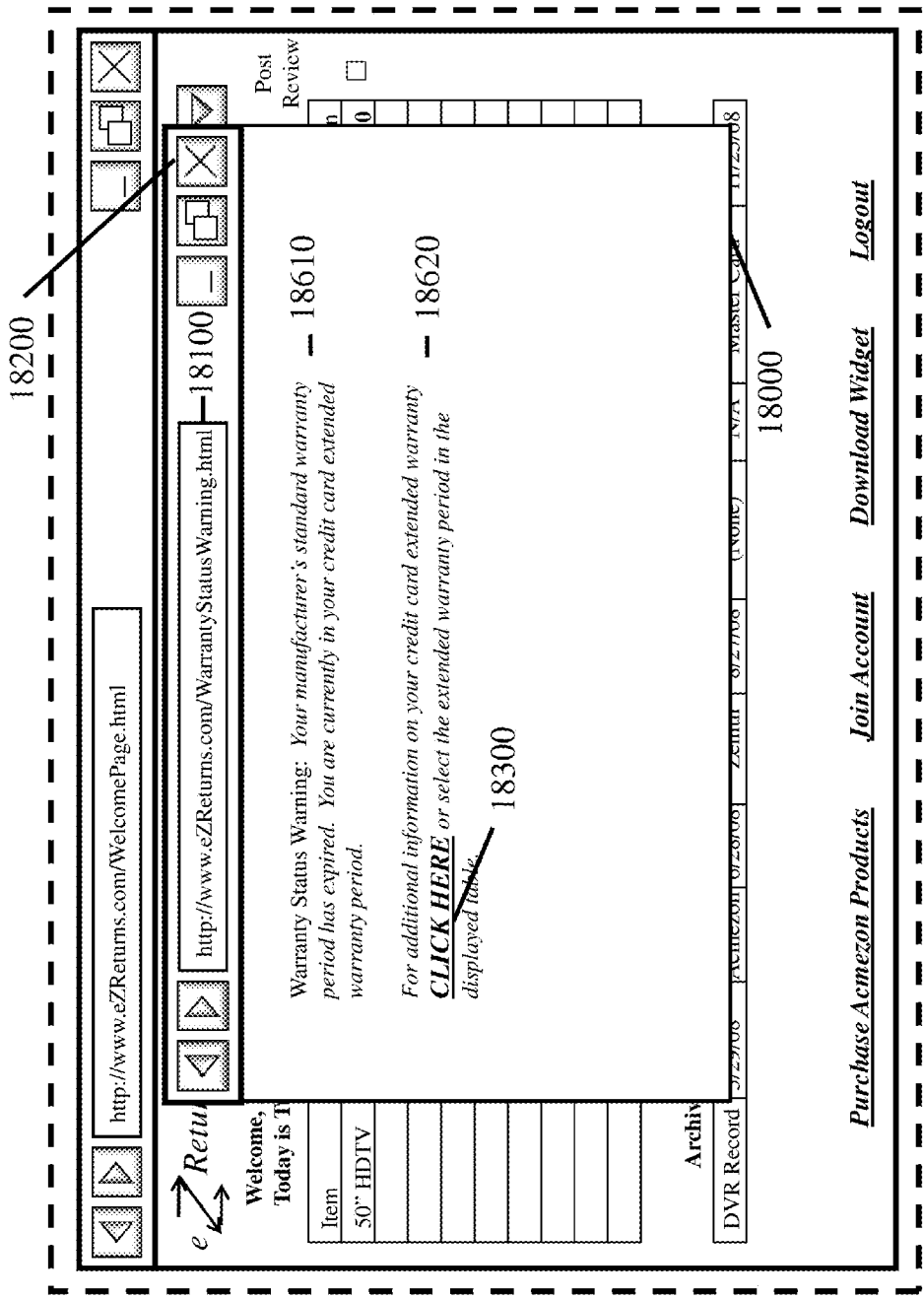
FIG. 18 illustrates an example TPM user interface used to display a warning message for a selected warranty period of a purchased item.

FIG. 18 illustrates an example TPM system user interface 18000 presented via a browser (or other interface application) to a user who selected the warranty control 17641 during a time period outside the manufacturer's warranty period, see FIG. 17. Optionally, the new web page display provides a warning message 18610 that the user is in the credit card extended warranty period. Optionally, the new web page also displays some information 18620 regarding the current warranty period (credit card extended warranty in this example) and a link 18300 to learn more about the credit card extended warranties.

Figure 19:
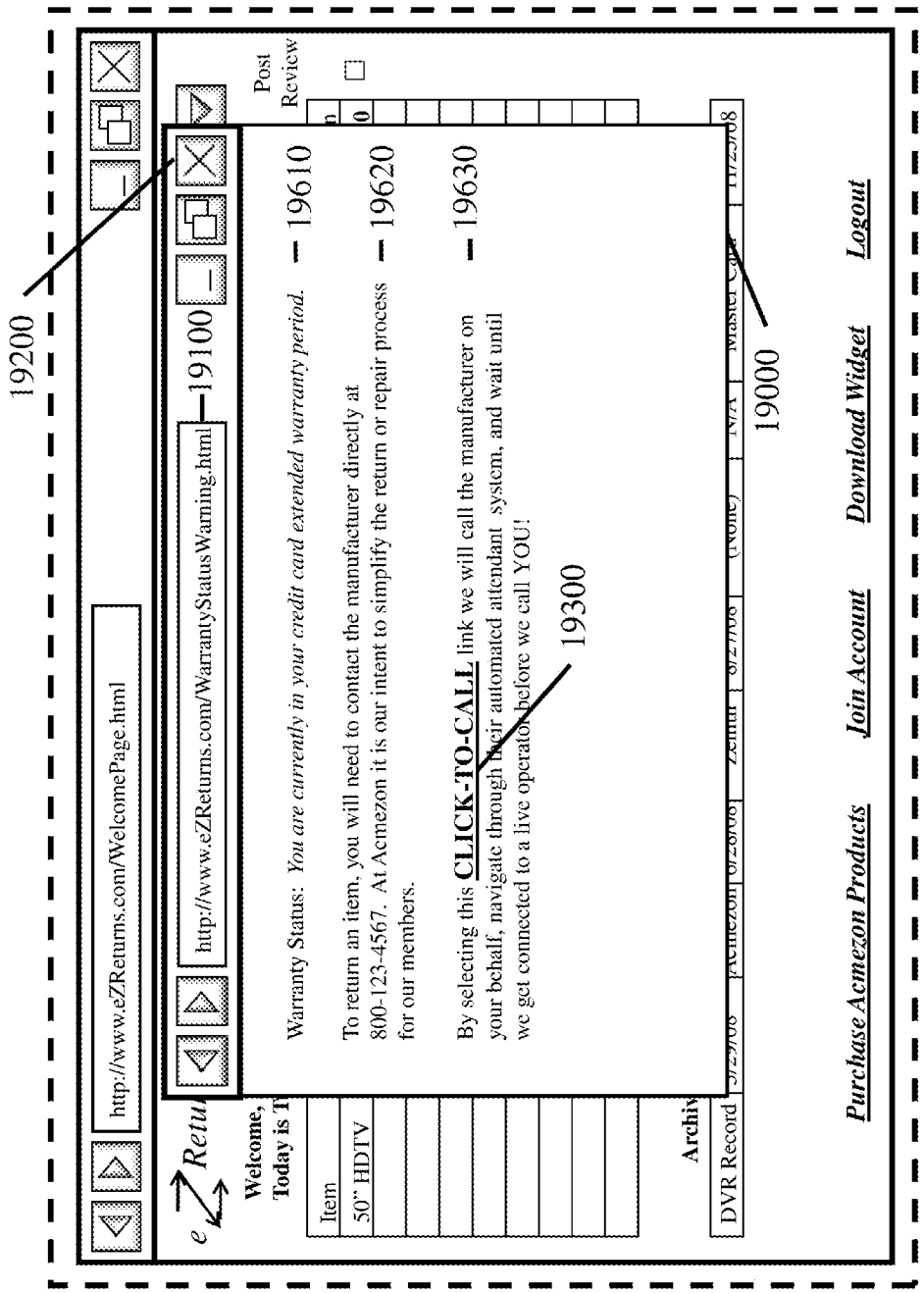
FIG. 19 illustrate an example TPM user interfaces used to display detailed warranty status for a selected purchased item.

FIG. 19 illustrates an example TPM system user interface 19000 presented via a browser (or other interface application) to a user who selected one of the credit card extended warranty controls 17681 or 17691 during a time period inside the credit card warranty period, see FIG. 17. Optionally, the new web page display provides a confirmation message 19610 that the user is in the credit card product warranty period. Optionally, the new web page also displays a phone number/address 19620 that the user can call to receive warranty repair and/or return instructions. Optionally, the new web page displays a more user friendly way to contact the manufacturer 19630 using a CLICK-TO-CALL link 19300 which, when selected by the user, causes the TPM system to optionally first place a call to the product manufacturer on behalf of the user; optionally second, call the user; and then bridge the two call legs together. Optionally, if the merchant is associated with the credit card provider (or is the credit card provider), the TPM system presents one or more web pages in which the user files an extended warranty claim online. For example, the system optionally queries the user for the following information:

Date of product failure—fill in data field.

Reason for failure—menu pull down and select from a list of reasons (e.g., cracked screen).

Brief explanation of the failure event. The user optionally includes any additional information related to the claim which they would like the repair service to know.

How the user wants to be contacted regarding their claim: email, postal mail, or phone. Optionally, the selected method will then popup a fill-in field to specify the associated address (e.g. the member's email address, home mailing address, or phone number). The TPM system will optionally pre-populate the field with the member's default values where known.

Optionally, the TPM system will provide in an electronic exchange to the credit card provider (or underlying insurance service) the user information along with the following optional purchase information: Product Category (e.g., home electronics); Product Manufacturer (e.g., Panavision); Product Model; Serial Number (if known); Date of product purchase; Purchase Price without tax; etc.

Figure 20:
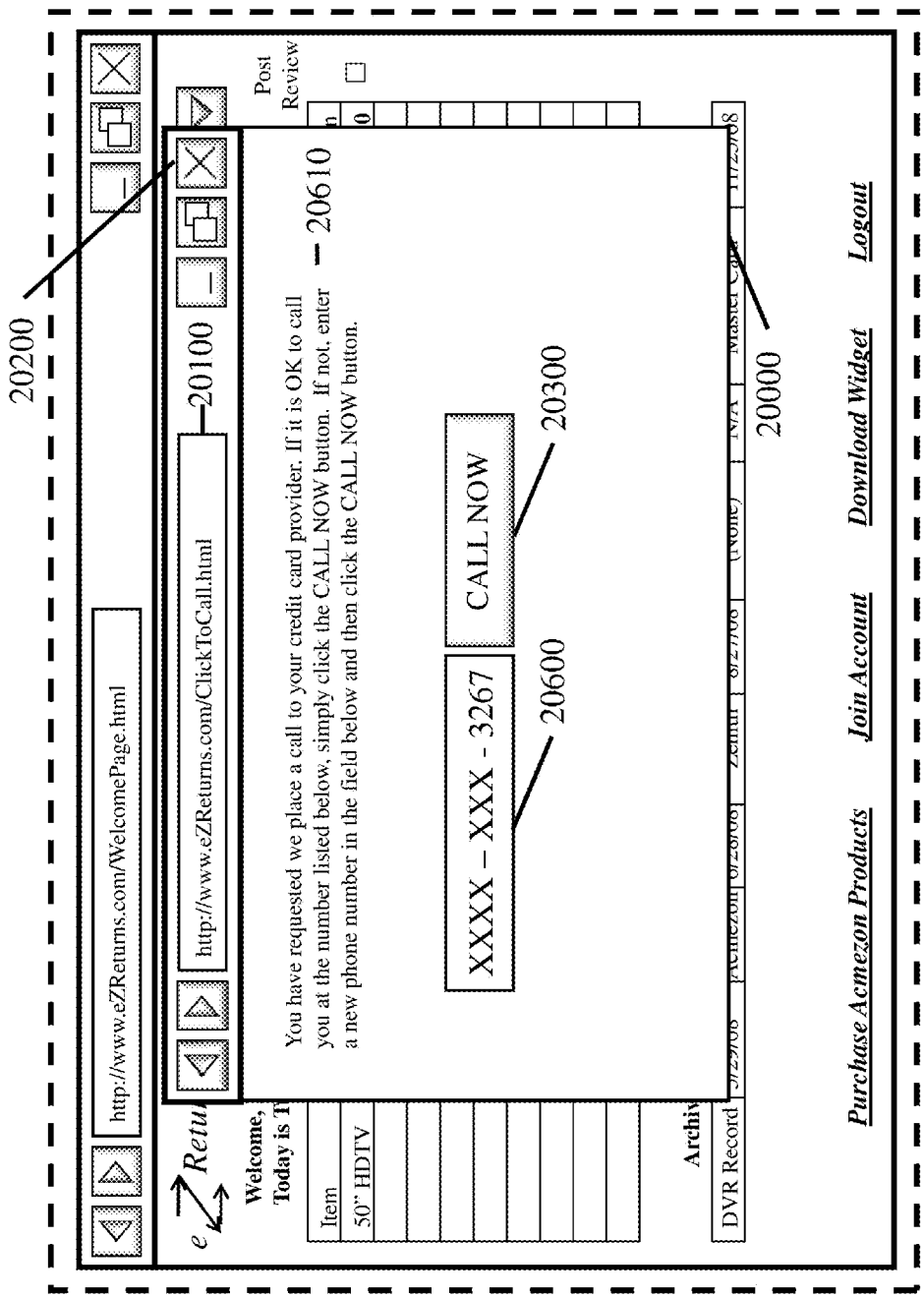
FIG. 20 illustrates an example TPM user interface used to display a pre-call, click-to-call confirmation message.

FIG. 20 illustrates an example TPM system user interface 20000 presented via a browser (or other interface application) to a user who selected the CLICK-TO-CALL web control 19300, see FIG. 19. Optionally, the new web page displays information about the calling process 20610. In addition, the TPM system optionally populates a field 20600 with the last 4 digits of the phone number/address of the user from the account database 900. Optionally, the user can enter a new phone number/address in the field 20600. Optionally, the user selects the CALL NOW web control 20300 to confirm the displayed or entered phone number/address. The submit control sends the user confirmation and call request to the TPM system 1000 over the data network 400.

Figure 21:
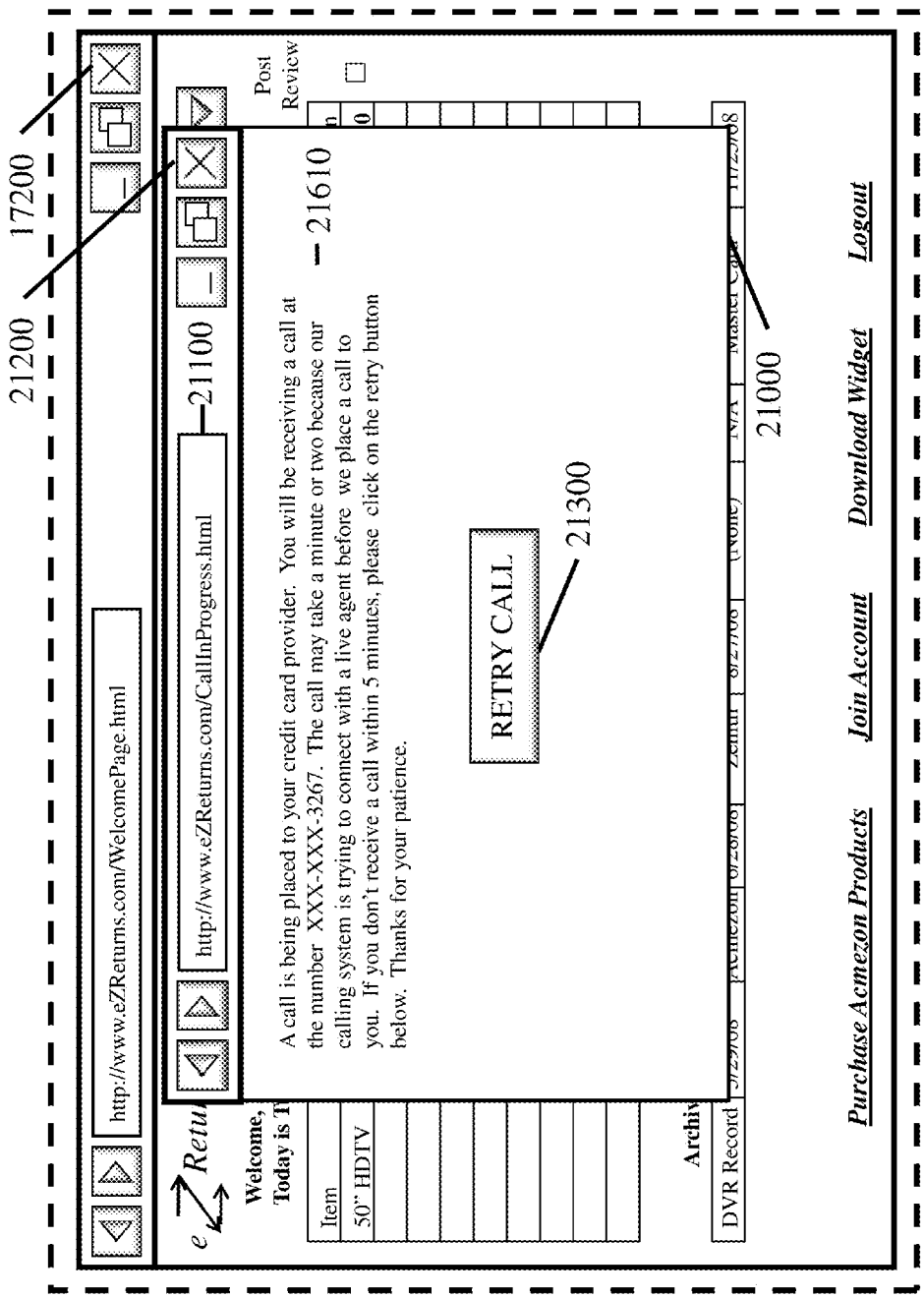
FIG. 21 illustrates an example TPM user interface used to display an example call confirmation message.

FIG. 21 illustrates an example TPM system user interface 21000 presented via a browser (or other interface application) to a user who selected the CALL NOW web control 20300, see FIG. 20. Optionally, the new web page displays a confirmation message and additional information about the calling process 21610. Optionally, the web page includes a RETRY CALL web control 21300. Optionally, if the user selects the RETRY CALL web control 21300, the TPM system will check the status of the outbound call to the credit card provider. If the call has not failed, the call continues. Optionally, if the call failed, the outbound call from the TPM system is retried. Optionally, if the user selects the RETRY CALL web control 21300 and the TPM system has not completed the call to a live operator, the TPM system can provide call status to the user on the web page 21000. For example, the TPM system might provide the following status messages to the user: placed outbound call; traversed initial interactive voice response menu; traversed secondary interactive voice response menu; waiting on hold for next available agent.

FIG. 22 illustrates an example TPM system user interface 22000 presented via a browser (or other interface application) to a user whose account includes a gift purchase (for example a gift purchase for a family member). The web page displayed to the user of the gift purchase is similar to that described in FIG. 2. The primary difference between FIG. 22 and FIG. 2 is that the FIG. 22 display includes the gift purchase(s) within a separate area of the display. In this example, the field definitions within the gift table/display are the same as those described in FIG. 2, 2600-2700.

Figure 23:
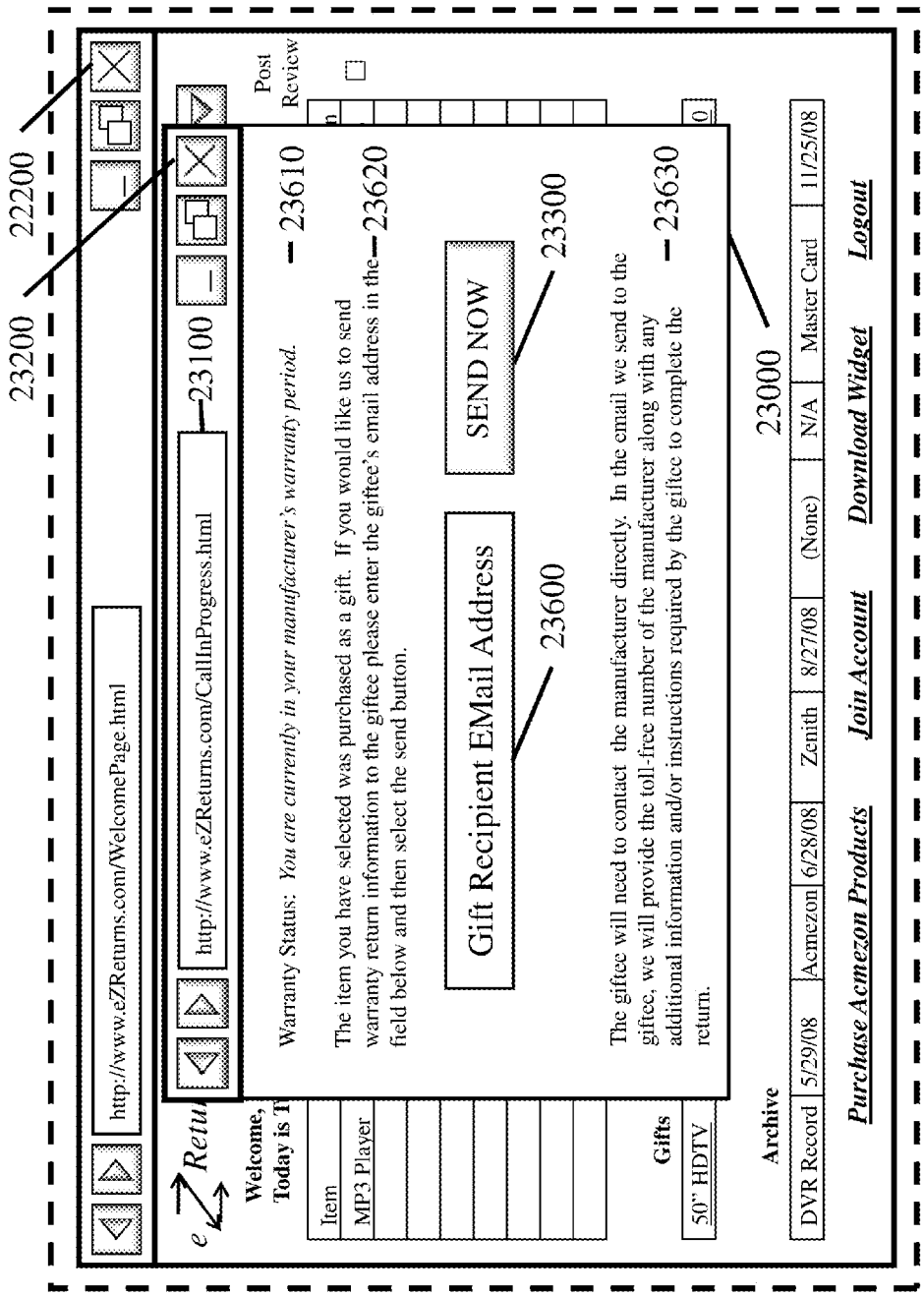
FIG. 23 illustrates another example TPM user interfaces to display detailed warranty status for a selected purchased item, in this case for a gift item.

FIG. 23 illustrates an example TPM system user interface 23000 presented via a browser (or other interface application) to a user who selected the warranty control 22642 during a time period inside the warranty period, see FIG. 22. Optionally, the new web page display provides a confirmation message 23610 that the user is in the product warranty period. Optionally, the new web page displays gift warranty claim instructions 23620. In this example, the user is requested to enter the email address of the giftee in field 23600. After the user has entered the giftee's email address, the user then clicks the SEND NOW web control 23300 which causes the email address to be sent to the TPM system 1000. Optionally, the web page includes some additional instructions 23630 which the user might optionally relay to the giftee regarding the TPM system sending of the email and the giftee steps necessary to proceed with the warranty claims process.

Figure 24:
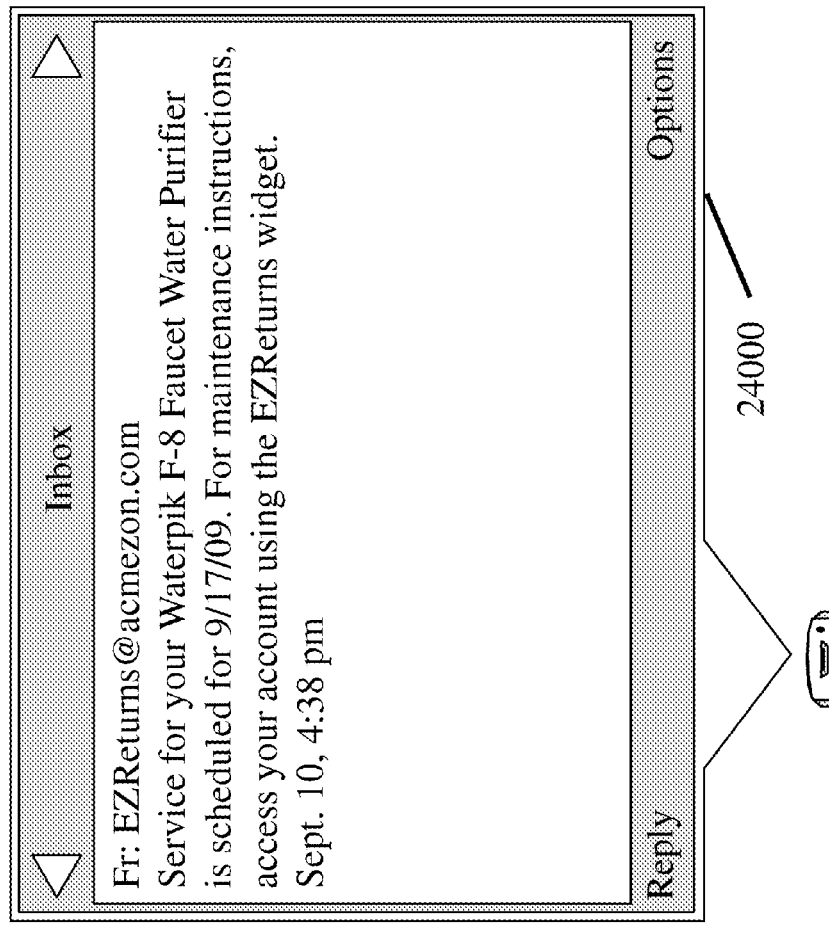
FIG. 24 illustrates an example TPM system notification for a product that requires periodic service.

FIG. 24 illustrates an example TPM system service alert message 24000 presented via a text message on the user's mobile phone 120, see FIG. 24. Optionally, the service notification could be sent via an Email, or via a status indicator 8500 on the user's desktop widget 100, see FIG. 8. The service Alert message includes the product description and the scheduled service date along with a recommendation to access the TPM web site to view additional service instructions.

Figure 8:
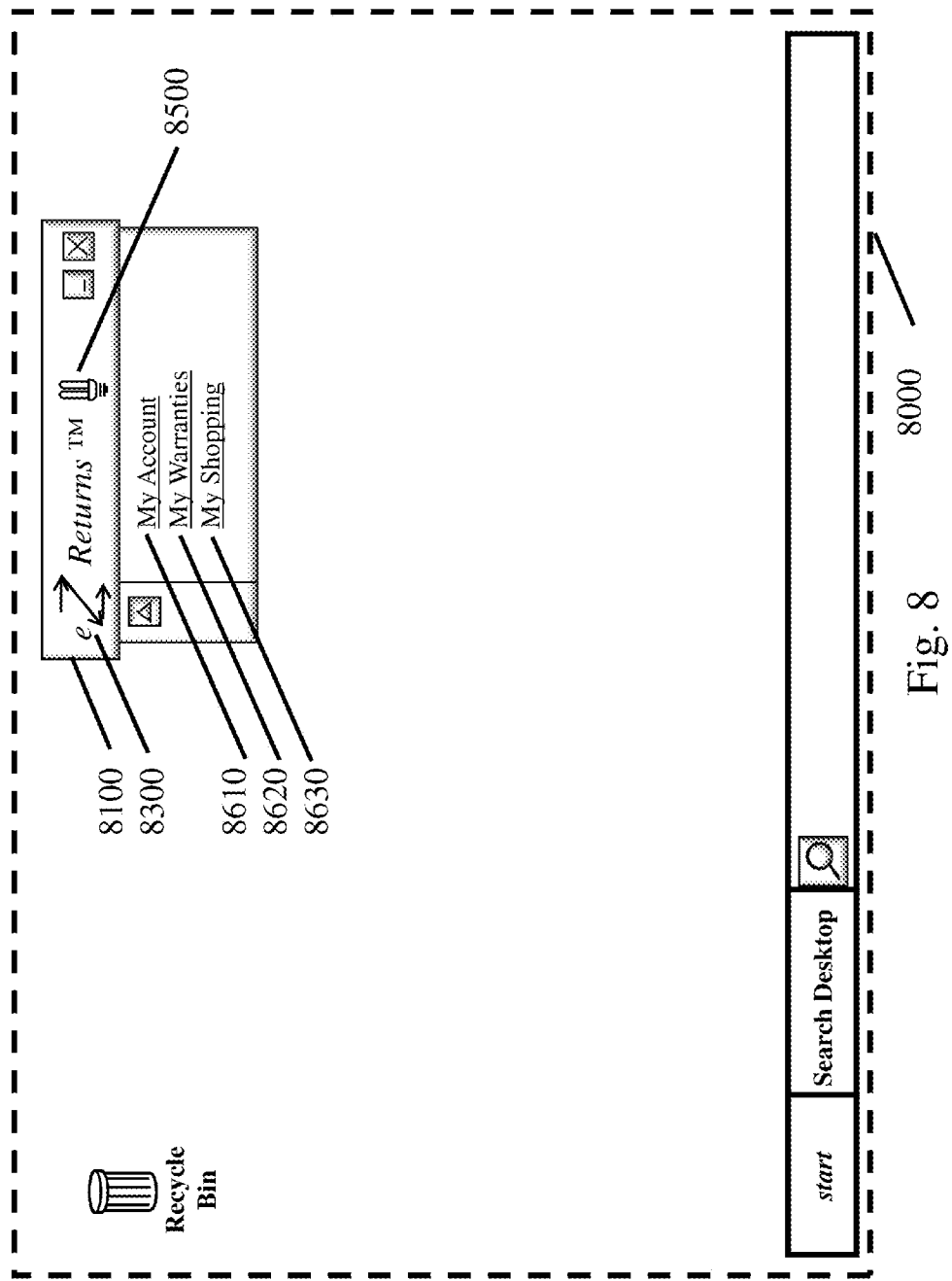
FIG. 8 illustrates a desktop widget used to facilitate navigation/selection of TPM services.
Figure 25:
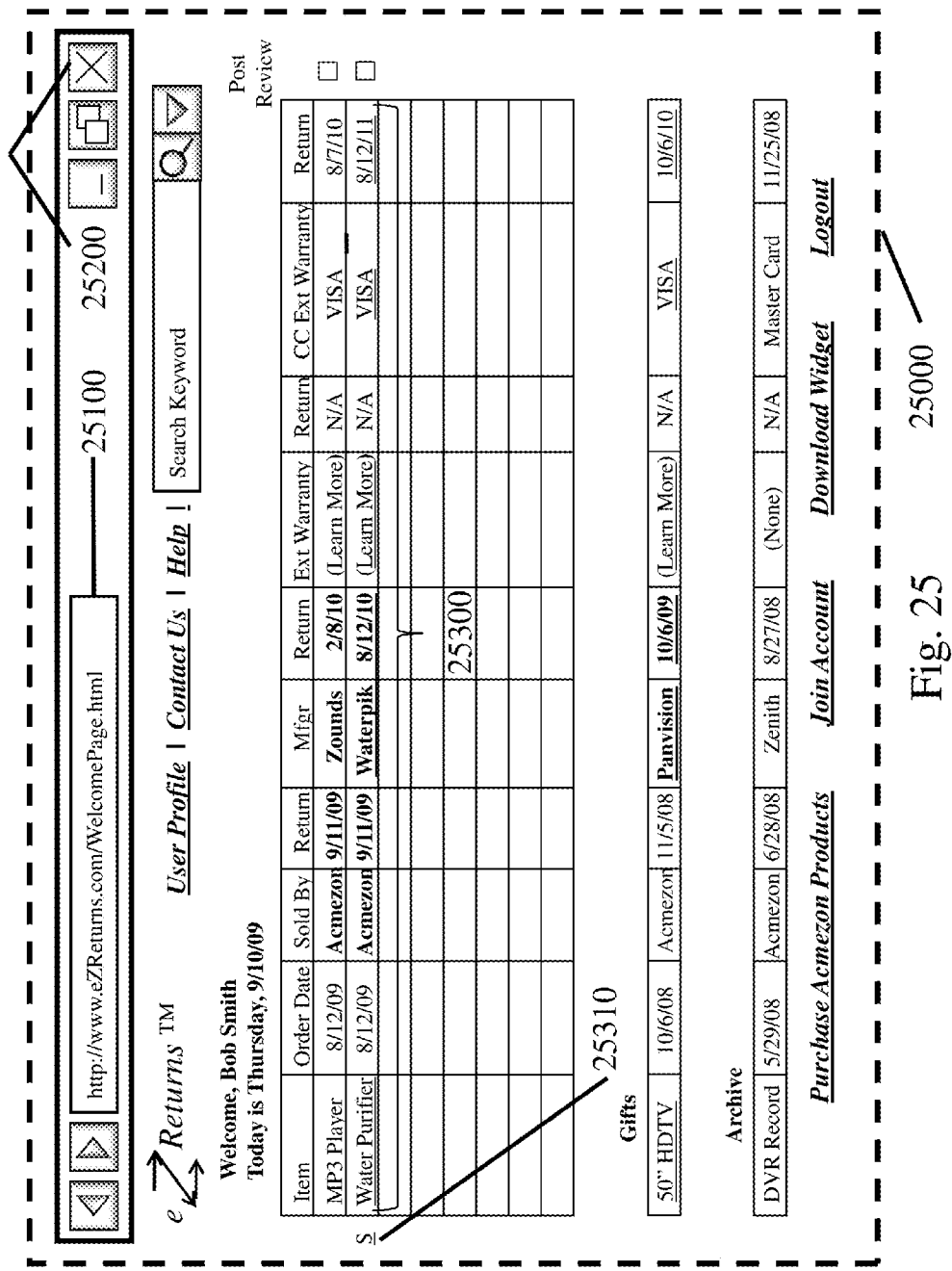
FIG. 25 illustrates another example TPM user interfaces to display detailed warranty status including an indicator link denoting items that require period maintenance.

FIG. 25 illustrates another example TPM system user interface 25000 presented via a browser (or other interface application) to a user who selected the My Warranties control 8620 on the desktop widget, see FIG. 8. In this example, a new display line item has been added in which status is shown for a previously purchased water purifier 25300 along with an indicator link 25310 denoting the fact that this item requires scheduled service.

Figure 26:
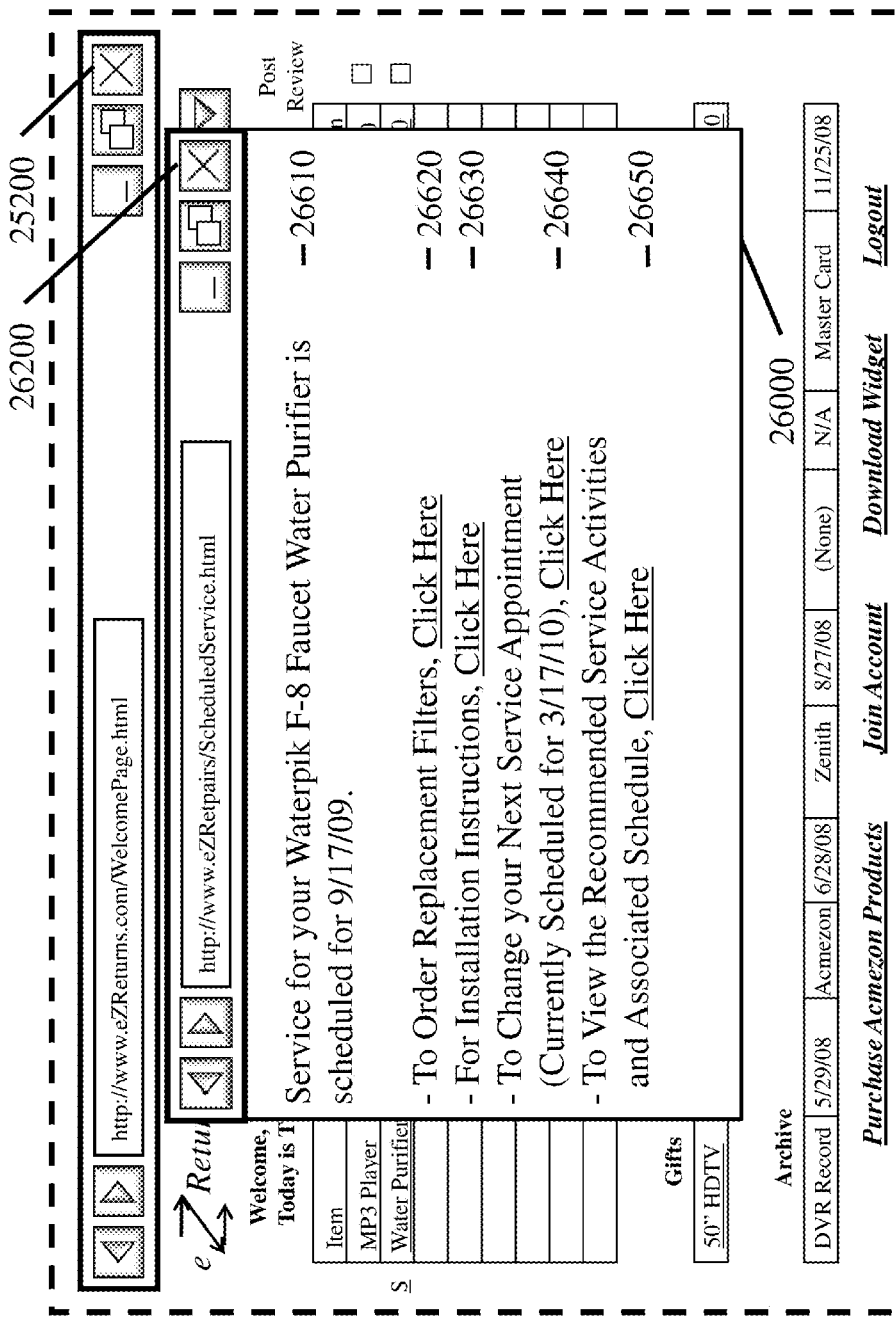
FIG. 26 illustrates an example TPM user interfaces to display detailed scheduled service status for a selected purchased item.

FIG. 26 illustrates an example TPM system user interface 26000 presented via a browser (or other interface application) to a user who selected the web control 25310, see FIG. 25. Optionally, the new web page display lists the product description and the date of the pending scheduled service appointment 26610. Additionally control links are provided to allow the user to order replacement parts 26620, to view installation instructions from the Owner's Manual 26630, to change the date of the next scheduled service appointment 26640, and to examine/modify the entire recommended service schedule 26650. Optionally, the user can dismiss or close the browser by selecting the web control 26200.

Figure 27:
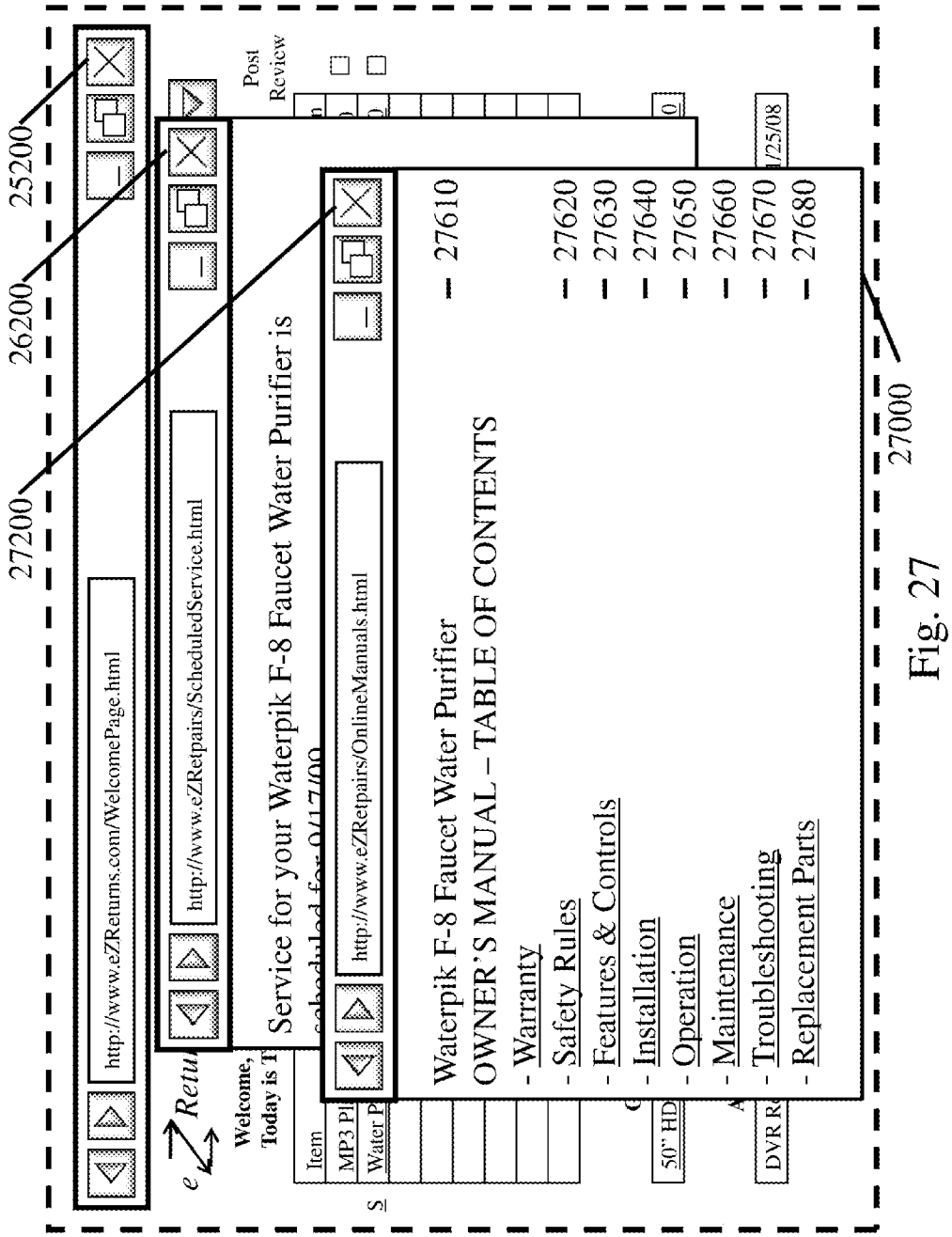
FIG. 27 illustrates an example TPM user interfaces to display product literature for a selected purchased item.

FIG. 27 illustrates an example TPM system user interface 27000 presented via a presented via a browser (or other interface application) to a user who selected the web control 26630, see FIG. 26. Optionally, the new web page display provides owner's manual information for a product previously purchased by the user. The web page optionally is a static display of the owner's manual (e.g., a pdf of the user's owner's manual) or a dynamic display, for example, listing the table of contents of the user's owner manual, 27610-27680, see FIG. 27. Each section or chapter in the table of contents optionally is a link to another web page displaying the contents of the section or chapter. Optionally, the user can dismiss or close the browser by selecting the web control 27200.

Figure 28:
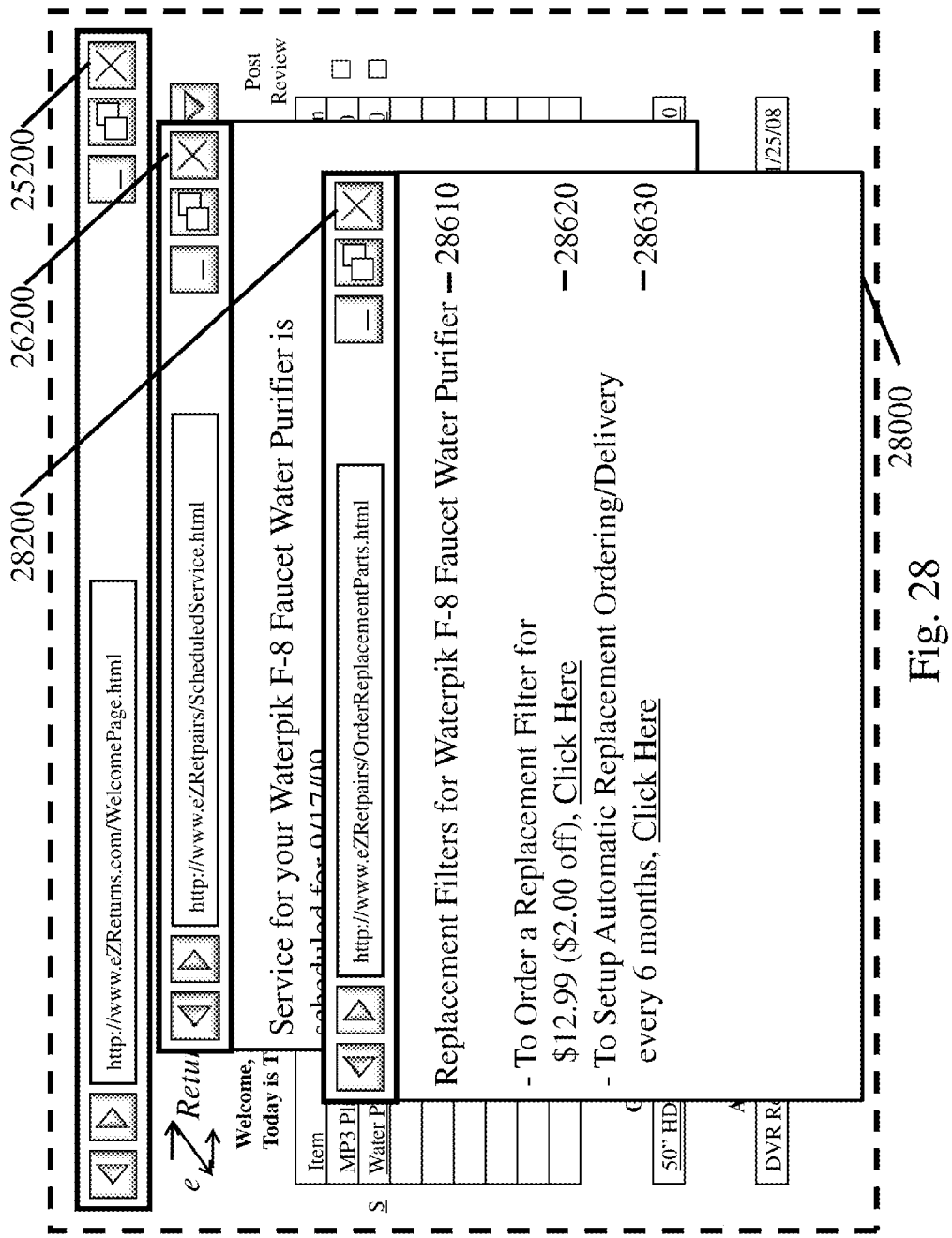
FIG. 28 illustrates an example TPM user interfaces to display product literature for a selected purchased item.

FIG. 28 illustrates an example TPM system user interface 28000 presented via a browser (or other interface application) to a user who selected the web control 26620, see FIG. 26. Optionally, the new web page display provides one or more options to purchase maintenance replacement parts. Optionally, the TPM system determines for the scheduled maintenance task for the user purchased product, the collection of parts required for the user to successfully complete the task. For example, the user optionally can conveniently order a replacement water filter with a single click by selecting the web control 28620, see FIG. 28 (assuming the TPM system provider has the necessary billing information for the user and optionally whether the user has previously agreed to one click purchase options). Optionally, the user can conveniently have the TPM system automatically purchase and ship to the user maintenance replacement parts on the manufacturer recommended maintenance intervals (a zero click option for future maintenance) by selecting the web control 28630, see FIG. 28. Optionally, the user can dismiss or close the browser if the user is not interested in purchasing maintenance replacement parts by selecting the web control 27200.

EXAMPLE EMBODIMENTS

See FIGS. 24-33

FIGS. 24 through 33 illustrate example workflows of operation of a TPM system described in detail above in this document. Process states are listed on the left and major elements of the operating environment of FIG. 1 are listed across the top. Using solid lines with arrows to signify the direction of information flow, the diagram pictorially represents process flow and interactions between the elements in each example embodiment. Dashed lines are used to highlight nonstandard delivery mechanisms.

The workflows depict alternative example embodiments where a user purchases an item, a 50" HD Television, from an online retail merchant, ACMEZON. The user is a member of the retail merchant's service. A member benefit is the automatic calendaring and tracking of items purchased at ACMEZON. The TPM system determines all of the purchased item's associated warranty and return periods and makes them available for access and display to the user.

In the first example, the user's TV fails during the manufacturer's warranty period. The user utilizes the TPM system to determine the active warranty period and return the TV to the manufacturer for repair or replacement.

In the second example, the user's TV fails during the extended warranty period. The user utilizes the TPM system to determine the active warranty period and manage the warranty claim and repair.

In the third example, the user has purchased the TV as a gift for another. When the TV fails, the user accesses the TPM system to assist the gift recipient in processing a warranty claim.

In the fourth example, the user has previously purchased a water purification system which requires periodic servicing to replace the used filters. The TPM system tracks the service schedule and assists the user purchase and installation of replacement parts.

First Example Embodiment

See FIGS. 29-34

In this example, the user purchases a 50" High Definition TV through an online merchant, ACMEZON. The user browses to the ACMEZON web site using a PC 100 connected to a data network 400. Optionally, any data networking capable device can be used by the user including for example, a mobile phone with data networking capabilities. The user enters a search request, finds a 50" High Definition TV they are interested in and purchases the TV using an ACMEZON branded credit card. ACMEZON ships the purchased TV to the user.

Figure 29:
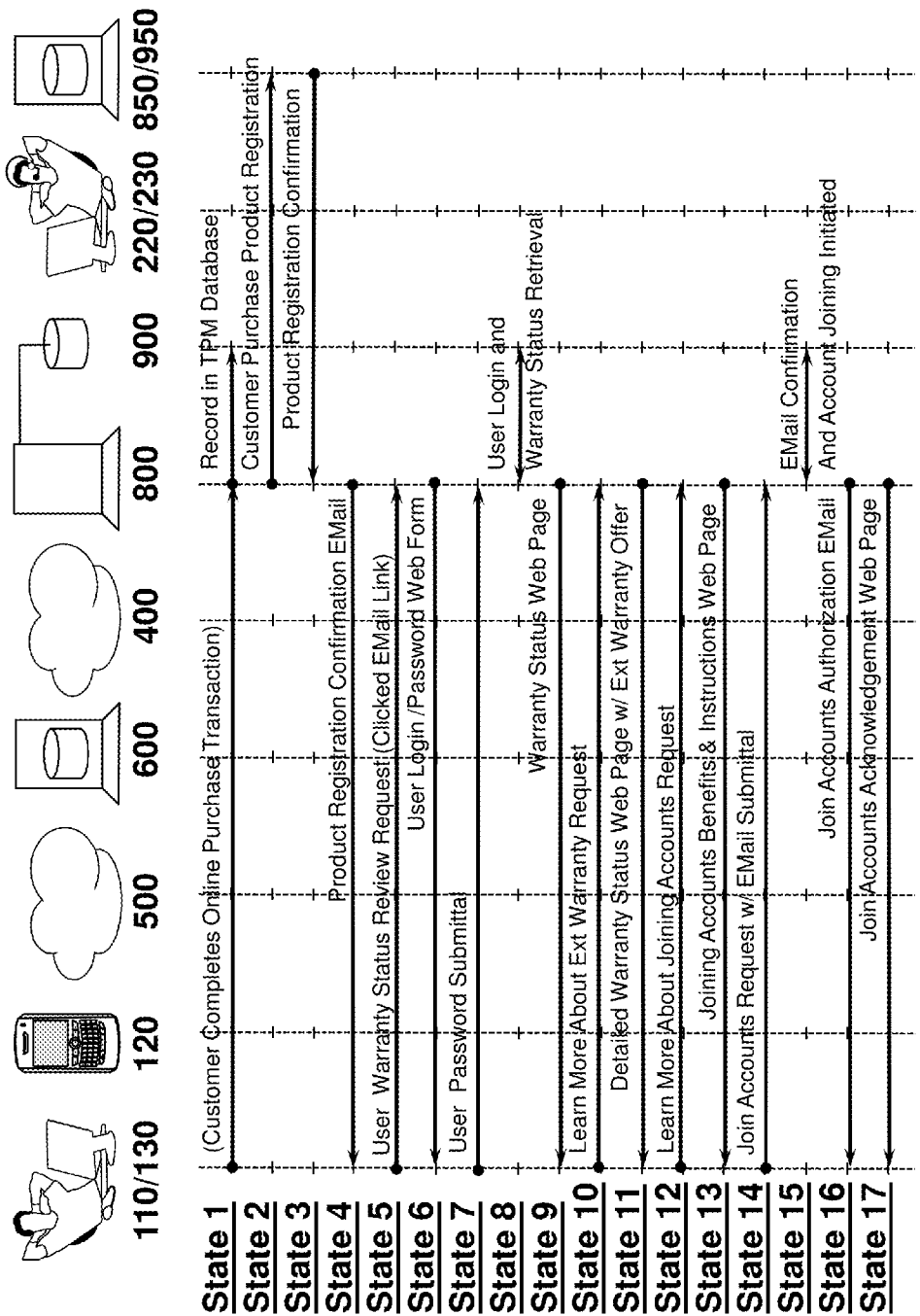
FIGS. 29-34 illustrate the operating environment/process workflow of a first example user scenario.

State 1 of FIG. 29. In this example, the Online Purchasing and Warranty Management (TPM) system 1000 stores in the TPM system database 900 the purchase transaction data including, for example, the purchased item make and model number, product serial number, purchase price, warranty and return periods, the purchaser's (user's) shipping and billing address, if the purchase is designated as a gift, user's home phone number, user's cell phone number, credit card number, credit card expiration date, and credit card security code. The TPM system also recognizes from the credit card number that the purchase was made using an ACMEZON credit card.

State 2. The TPM system 1000 checks to see if the purchased item manufacturer has an electronic registration interface with ACMEZON. In this example there is a product registration interface between ACMEZON and the manufacturer. The TPM system downloads product registration data using a secure network connection over the data network 400 to the external database 950 (manufacturer's database). The product registration data includes for example, the model number and serial number, date of purchase, etc.

State 3. The TPM system 1000 receives a confirmation back from the manufacturer over the data network 400 that the product has been registered for the user.

State 4. The TPM system 1000 sends a confirmation email to the user informing them that their purchase has successfully been registered and they can access their warranty status by web browsing to the ACMEZON member zone or by clicking on the link in the email.

State 5. In this example, the user has never checked warranty status on a product purchased at ACMEZON. The curious user selects the link in the email while reviewing the email message. A new browser opens on the user's PC 130 with a web address associated with the ACMEZON members' zone. The web page address (URL) is sent to the web server 800, along with an identifier uniquely assigned to the user.

State 6. Upon receipt of the user request, the TPM web server 800 responds by displaying the ACMEZON member login screen with the user's login ID pre-populated. In this example, since the user selected a link in an email with a unique identifier, the user is only required to enter their password.

State 7. From the user's PC 100, the user enters their password in the password field and clicks the submit control.

State 8. The TPM server 800 receives the user's credentials over the data network 400. The user's credentials are then authenticated against the credentials stored in the database 900 and the user is logged into their ACMEZON member account.

State 9. The user's warranty status of purchased items is displayed, see FIG. 2.

State 10. The user examines the display and notices a reference to extended warranties. The user selects the field 2661 on extended warranties associated with their recently purchased HDTV.

State 11. The TPM server 800 receives the user's request. As can be seen in FIG. 2, the user is not in the extended warranty period. The TPM system in this example opens a new browser window 3000 on the user's PC 130 and displays a web page warning the user that they are currently not in the extended warranty period and have not purchased an extended warranty but have the option to purchase one from ACMEZON, see FIG. 3. The user is not currently interested in purchasing an extended warranty at this time and closes the open browser by selecting the close browser control 3200, see FIG. 3.

State 12. The user notices a web control labeled join accounts. The user selects the join accounts control 2370, see FIG. 2.

State 13. The TPM server 800 receives the user's request for information. The TPM system in this example displays a new web page 4000 (see FIG. 4) on the user's PC 130 describing the advantages of joining one or more household accounts. With account joining, any user in the household can view all of the ACMEZON purchased items tracked in a single display and from each account.

State 14. The user would like to join his/her spouse's account to her/his account. There are numerous ways account joining can be accomplished. In this example, the user must enter the spouse's email address used to access their Acmezon account.

In this example, the email address must match the email address stored in the TPM system for the spouse's account or else an error will be displayed to the user. The user enters the spouses email address in field 4600 and clicks the submit control 4610, see FIG. 4.

State 15. The TPM server 800 receives the user's join account request and the entered spouse's email address. The TPM server 800 compares the spouse's email address with the email addresses in the account database 900. A match is found and the server 800 records a pending linkage of the two records in the database 900, awaiting spouse authorization to complete the transaction.

State 16. The server 800 sends a join account authorization email to the spouse.

State 17. The server 800 then displays an instructional web page 5000 to the user (see FIG. 5) informing them that an authorization email has just been sent to the user's spouse. The spouse must login to the ACMEZON server and confirm the join request, either by clicking on a link in the email or by browsing to the site and directly logging in.

Figure 30:
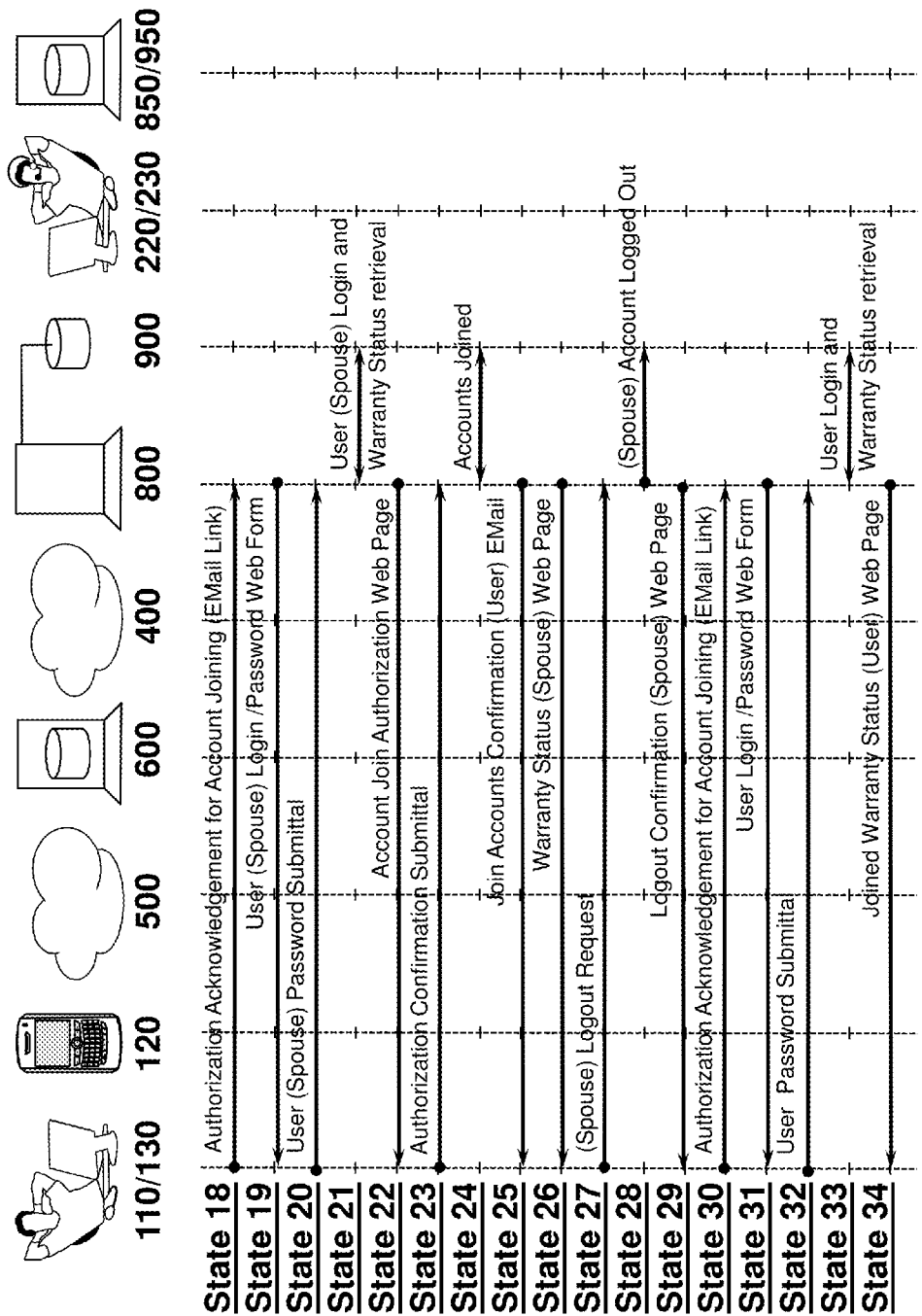

State 18 of FIG. 30. The spouse checks his/her email account. The email from the server 800 is in their inbox. The spouse reads the email and selects the authorize join control. This causes a web page request to be sent to the server 800. This request includes parameters that uniquely identify the user's spouse and the join accounts authorization.

State 19. The server 800 receives the spouse's authorization request. A new browser opens on the spouse's PC 130 with a login web address associated with the ACMEZON members' zone. The spouse's login ID field is pre-populated using the account information passed to the server in the request.

States 20-22. The States 20-22 mirror the login steps described above in States 7-9. After the spouse is authenticated, the server 800 displays the account join request confirmation web page 6000, see FIG. 6.

State 23. The user's spouse authorizes the join account request by selecting the yes control 6310.

State 24. The Server 800 receives the join account authorization request, stores the request in the account database 900, and joins the user and spouse accounts.

State 25. Server 800 sends a notification email to the user, informing him/her that the account has been joined.

State 26. The server 800 then displays the spouse's user warranty status.

State 27. The spouse reviews the warranty status and then selects the logout control 2390, see FIG. 2.

State 28. The TPM server 800 receives the user's request over the data network 400 and logs the spouse out of his/her account.

State 29. The server 800 then displays a logout web page to the spouse.

States 30-33. At some time in the future, the user checks their EMail and accesses their account to review the warranty status of online purchases made by both his/her spouse and him/her by clicking the embedded link in the confirmation EMail sent in state 25. The server 800 processes the request and the ensuing password submittal by logging the user into their account.

State 34. The server 800 retrieves the warranty status for both accounts, merges the information, and displays the warranty status home page 7000, see FIG. 7.

Figure 31:
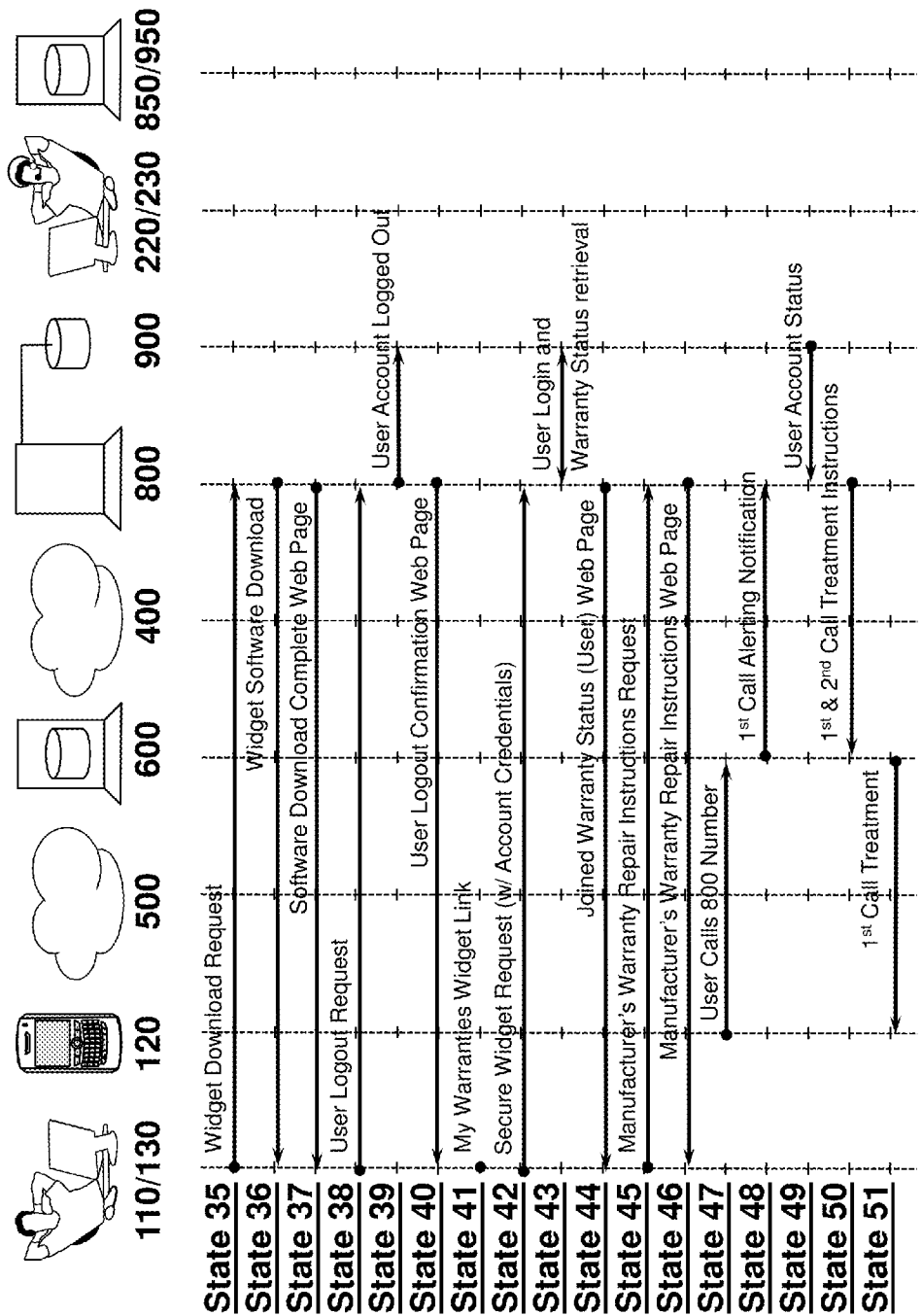

State 35 of FIG. 31. The user reviews the joint account display which now contains items that the user and the user's spouse have purchased.

The user next notices a download desktop widget control displayed on the web page. The user requests to download/install widget software by clicking the control 7380, see FIG. 7.

State 36. The server 800 receives the user's download request. In this example, one or more software programs 110 are next downloaded from the server 800 over the data network 400 and installed on the user's desktop PC 130. When the widget download is complete, the Widget display 8100 is launched on the user's desktop 8000, see FIG. 8.

State 37. The server 800 updates the user's web page display with a message to the user that the widget software download is complete.

State 38. The user has finished reviewing their warranty status and accessing their account information so s/he logs out of the member account by selecting the logout control 7390, see FIG. 7.

State 39. The TPM server 800 receives the user's logout request over the data network 400 and logs the user out of their account.

State 40. The server 800 then displays a logout web page to the user to acknowledge completion of their request.

State 41. Several months later the user's purchased HDTV fails. The user thinks s/he may be in the warranty period and remembers the ACMEZON members warranty service.

The user accesses the ACMEZON web site by selecting the My Warranties link 8620 in the desktop widget 8100, see FIG. 8.

State 42. The desktop widget receives the user request to access their ACMEZON warranty status and sends a secure message (which includes the user's account ID and specified web page request) over the data network 400 to the server 800.

State 43. The ACMEZON hosting web server 800 receives the widget request and login credentials, validates the login credentials against the account database 900 and retrieves the joined accounts' warranty status.

State 44. The server 800 causes a web browser 9000 to launch on the user's PC 130 and displays the user's warranty status, see FIG. 9.

State 45. The user notices that the item is still within the manufacturer's warranty period (e.g., by the highlighted bold type 9641, see FIG. 9) but is unsure what steps to take and whom to call. The user selects the manufacturer warranty field 9641 for the HDTV item, see FIG. 9.

State 46. The hosting web server 800 receives the user selection request. The TPM system in this example opens a new browser window on the user's PC 130 and displays a web page 10000 informing the user they are currently in the warranty period 10610, the phone number to call for return/repair information 10620, an option to select a CLICK-TO-CALL the user 10630, and an option for product return shipping instructions 10640, see FIG. 10.

State 47. The user calls the toll-free phone number presented in the web page instruction 10620, see FIG. 10. The call routes through the PSTN 500 and terminates at the TPM phone server 600.

State 48. The phone server 600 receives the inbound call and associated call signaling information (e.g., calling and called number, privacy indicator, etc.). The phone server 600 informs the server 800 regarding the call presented event including the call signaling information.

The State 49. The web server 800 determines if there is an active web session with a member with a matching calling party phone address. In this example, the user is online in the ACMEZON member zone or section.

State 50. In this example, based on the phone number dialed and/or the information selected by the user on the web page, the web server 800 requests that the phone server 600 answer the incoming call (after delaying for a few 6-second ring cycles) and play a prompt to the caller asking them to wait for the next available agent. The web server 800 also instructs the phone server 600 to originate an outbound call to the product manufacturer of the HDTV and play out a sequence of dtmf tones to traverse the manufacturer's IVR front-end system.

State 51. The phone server 600 receives the request from the web server and provides the specified call treatment to the caller.

Figure 32:
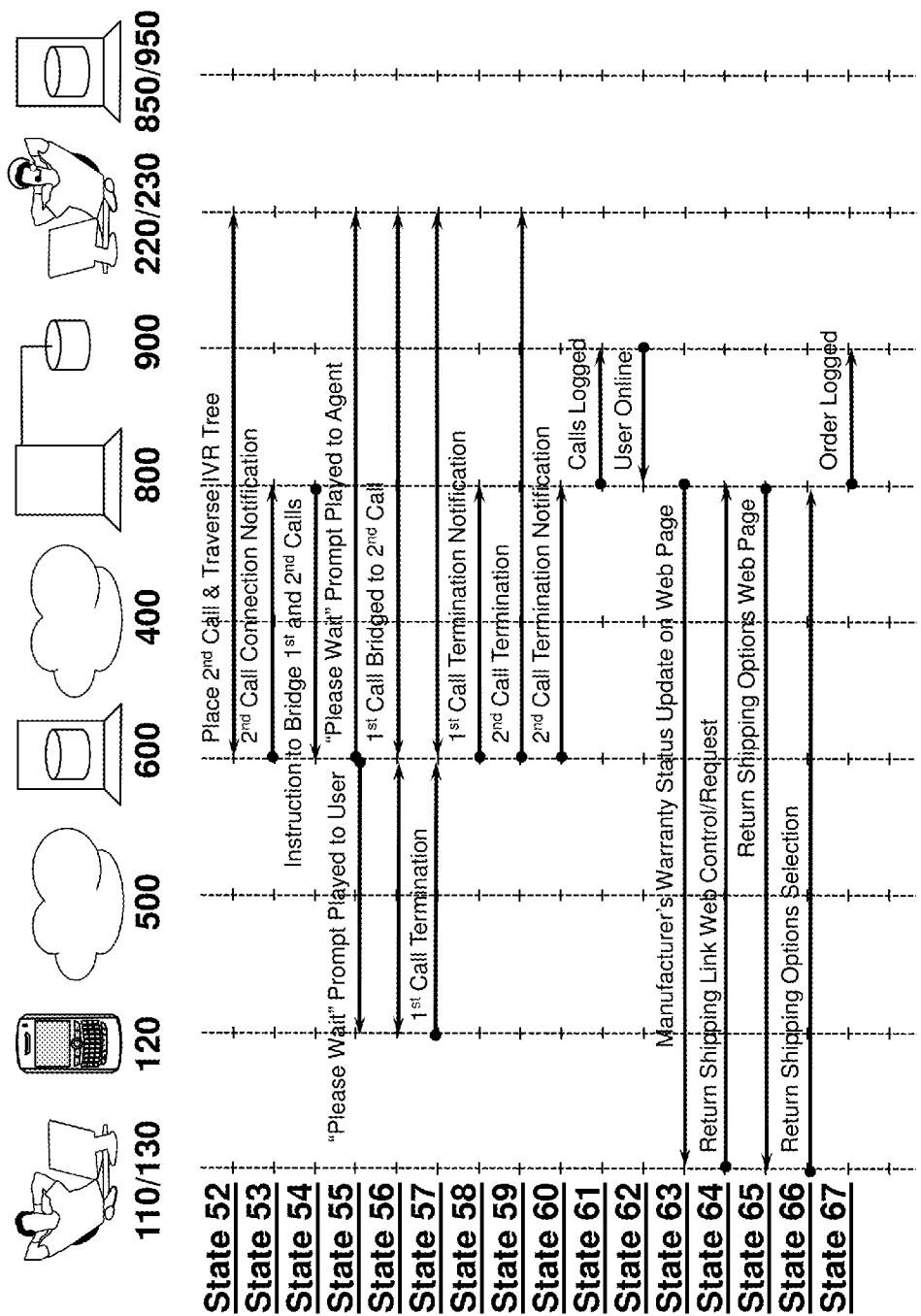

State 52 of FIG. 32. The phone server 600 originates an outbound call to the HDTV manufacturer, and after answer, outputs a series of dtmf key-presses (optionally including short and long wait timers between dtmfs in order to traverse uninterruptible voice prompts, to reduce the load on IVR system, to allow for high quality dtmf reception, etc.). Optionally, the phone server 600 can also be configured to deliver transaction parameters (audio and/or dtmf) to the manufacturer's agent about the details of the pending warranty return call with the user.

State 53. After live answer response or after the IVR system has been traversed, the phone server 600 notifies the web server 800 of the call status.

State 54. The web server 800 instructs the phone server 600 to play connecting call voice prompts to the caller and to the manufacturer's call center agent and then bridge the inbound $1^{st}$ call from the caller to the outbound $2^{nd}$ call to the manufacturer call center agent.

State 55. The phone server 600 plays a prompt to the agent (e.g., please hold, this call is being connected to a caller) and if not already completed, answers the first call and plays a prompt to the caller (e.g., please hold, your call is being connected immediately to an operator) announcing the impending connection.

State 56. The phone server 600 then bridges the agent call leg to the user call leg. Optionally the TPM system monitors the ensuing call.

State 57. The user interacts with the call agent and confirms that the HDTV is currently covered under the manufacturer's warranty, that the HDTV was properly registered at the time of purchase, and that the type of failure described by the user requires that the user return the HDTV to the manufacturer for repair or replacement (as determined by the manufacturer). The user further discovers during the call that s/he is responsible for shipping charges to the manufacturer. The user also receives an RMA number for their HDTV. The user hangs up the phone.

State 58. The phone server 600 detects the caller call disconnect and terminates the call leg to the user. The phone server 600 reports the $1^{st}$ call termination event to the web server 800.

State 59. The phone server 600 monitors the $2^{nd}$ call leg for disconnect supervision for a few seconds (to allow the other party to hang up). If the agent doesn't hang up, the phone server 600 plays a "goodbye" prompt and terminates the call to the agent.

State 60. The phone server 800 reports the $2^{nd}$ call termination event to the web server 800.

State 61. The TPM system receives the call termination events and logs the call events and associated call information (e.g., call duration, calling number, called number, etc.) to the database 900.

State 62. In this example, the TPM system knows that the user called the manufacturer warranty call center during the warranty period, that the user is still logged in to the ACMEZON web site, and that this product/manufacturer combination requires the user ship the defective product to the manufacturer as the first step in the warranty repair/replacement process.

State 63. The web server 800 optionally highlights or changes the state of the return shipping instructions 11640 or associated link control 11320, see FIG. 11 (e.g., changes the link status to blinking, opens a new browser window, etc.).

State 64. The user notices the return shipping link and selects the web control 11320, see FIG. 11.

State 65. The web server 800 receives the user's request and opens a new browser 12000 and displays details regarding two return shipping options and associated costs to the user, see FIG. 12. Optionally, the user has the choice to order a prepaid shipping label (Option 1, 12610) or to order a prepaid shipping label and associated return packaging (Option 2, 12620), see FIG. 12.

State 66. The user reviews the return shipping options and decides to take advantage of ACMEZON's shipping rates and the convenience of receiving packaging material for shipping (since the user did not save their original HDTV packaging). The user selects the option 2 control 12620 and then presses the BUY NOW control 12300, see FIG. 12.

State 67. The web server 800 receives the user's selection and stores the selection in the account database 900. The web server 800 then retrieves the user's credit card information from a secure database 900.

Figure 33:
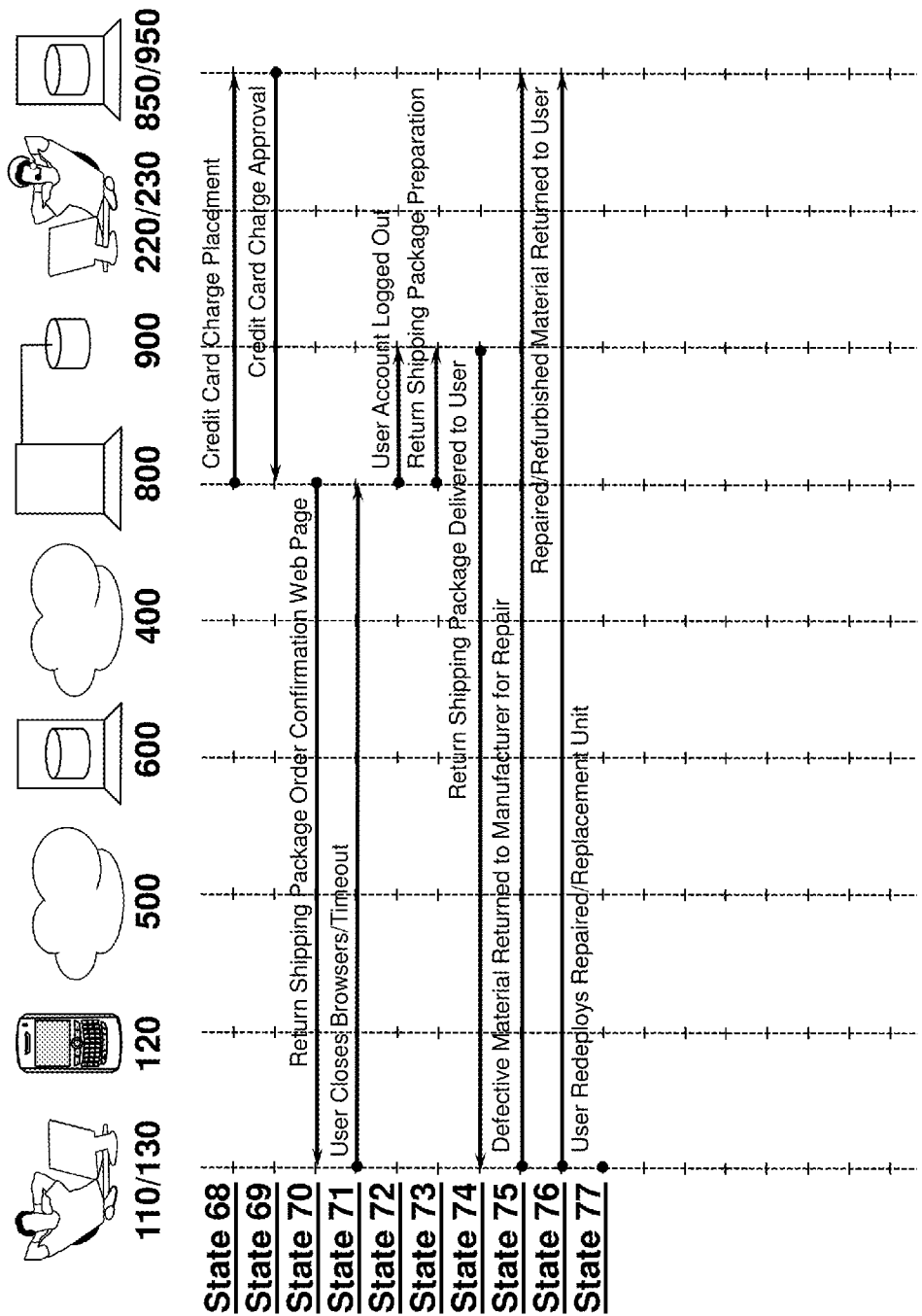

State 68 of FIG. 33. The web server 800 places a charge of $29.95 on the user's credit card by sending a message to an external merchant/credit card provider's server 850.

State 69 The web server 800 receives an approved credit card transaction from the external merchant/credit card provider 850.

State 70. The web server 800 displays a confirmation web page in the open browser 13000, see FIG. 13.

State 71. The user closes the three open browsers by selecting the close control 13200 (see FIG. 13), 10200 (see FIG. 10), and 9200 (see FIG. 9).

State 72. In response to the reception of the close requests and/or a timeout, the web server 800 logs the user out of their TPM account.

State 73. The web server 800 assures that the appropriate packaging material is available from inventory, creates the return documentation records including a shipping label for the user, and notifies the ACMEZON shipping department.

State 74. The ACMEZON shipping department pulls the identified packaging material from inventory, prints the personalized documentation and shipping labels, assembles the material for shipment to the customer, and ships the packing material and return shipping label to the user.

State 75. The user receives the packaging material, places the HDTV into the shipping carton, completes any updates and/or corrections to the return documentation, encloses the documentation in the carton, affixes the enclosed shipping label to the outside of the carton and takes the package to the nearest shipper for return to the manufacturer.

State 76. The manufacturer receives the HDTV and, in this example, ships the user a remanufactured HDTV along with an upgraded remote control for the inconvenience of the product failure.

State 77. The user receives the HDTV and upgraded remote. The user was impressed with the overall return experience and recalled there was an option to provide user feedback of their warranty return experience.

Figure 34:
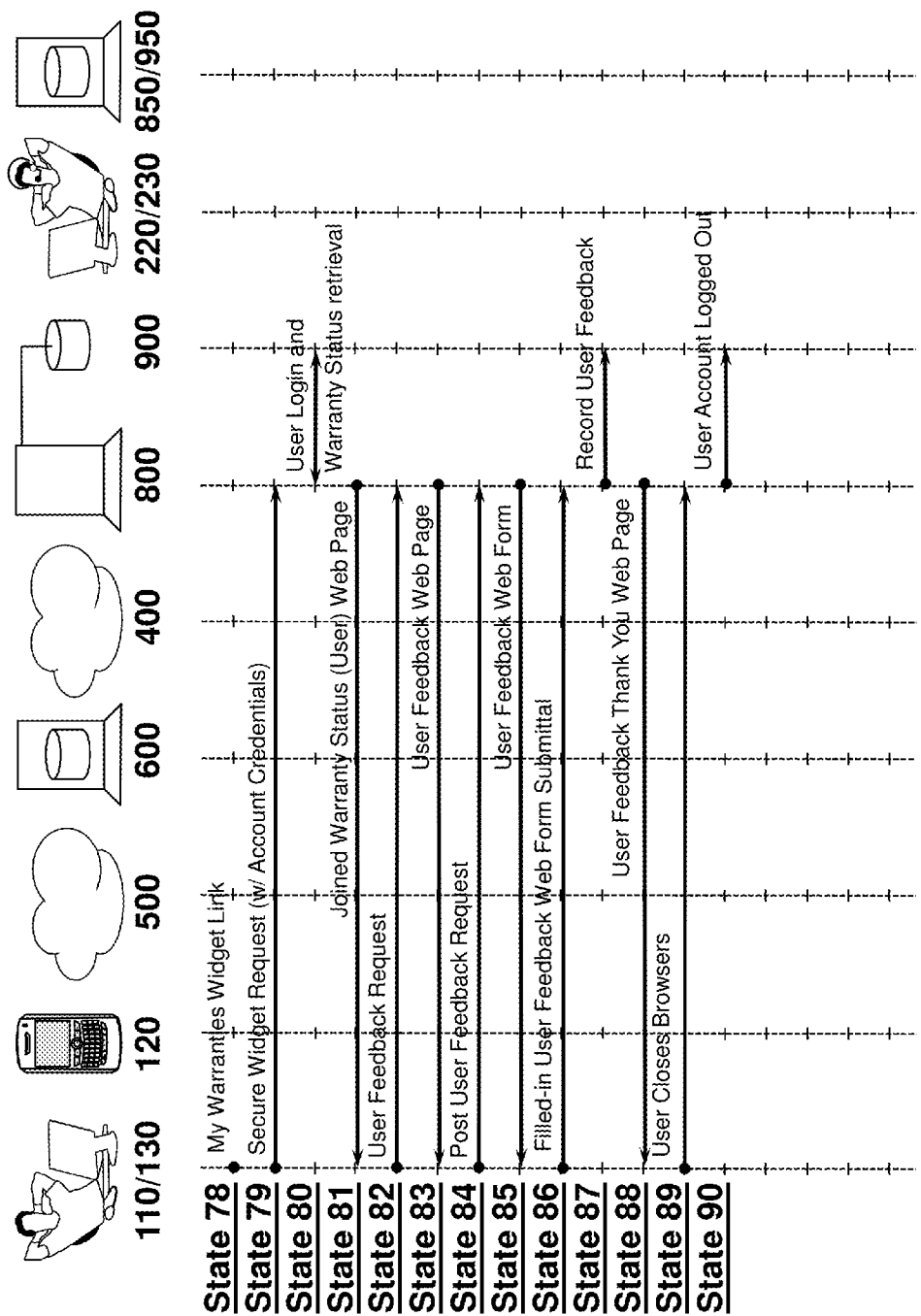

State 78 of FIG. 34. The user accesses the ACMEZON web site by selecting the My Warranties link 8620 in the desktop widget, see FIG. 8.

State 79. The desktop widget receives the user request to access the ACMEZON warranty status page and sends a secure message (which includes the user's account ID and specified web page request) over the data network 400 to the server 800.

State 80. The ACMEZON hosting web server 800 receives the widget request and login credentials, validates the login credentials against the account database 900 and retrieves the joined accounts' warranty status.

State 81. The server 800 causes a web browser 9000 to launch on the user's PC 130 and displays the user's joined accounts' warranty status, see FIG. 9.

State 82. The user selects the user feedback link control 9701 associated with the HDTV, see FIG. 9.

State 83. The web server 800 receives the user request to review/post feedback. The web server 800 displays a web page 14000 with controls to review other user feedback 14310 or to submit their own feedback 14300 on the product 14610, on the product reliability 14620, or on the return experience 14630, see FIG. 14.

State 84. The user selects the option to post a review of the warranty return experience 14630 and then clicks the POST REVIEW control 14300, see FIG. 14.

State 85. The web server 800 receives the user request to post a review and displays a new web page 15000 with a field for user comments/reviews 15600, see FIG. 15.

State 86. The user enters their return experience in the open format field 15600 and clicks the SUBMIT button 15300, see FIG. 15.

State 87. The web server 800 receives the completed user review web form, stores the manufacturer return review in the database 900, and makes it accessible for review by other ACMEZON members.

State 88. The web server 800 displays a confirmation message to the user 16000, see FIG. 16.

State 89. The user closes the two open browsers by selecting the close control 16200 (see FIG. 16), and 9200, (see FIG. 9).

State 90. The web server 800 receives the close requests over the data network 400 and/or times the user out due to prolonged inactivity and then logs the user out of their TPM account.

Second Example Embodiment

Figure 35:
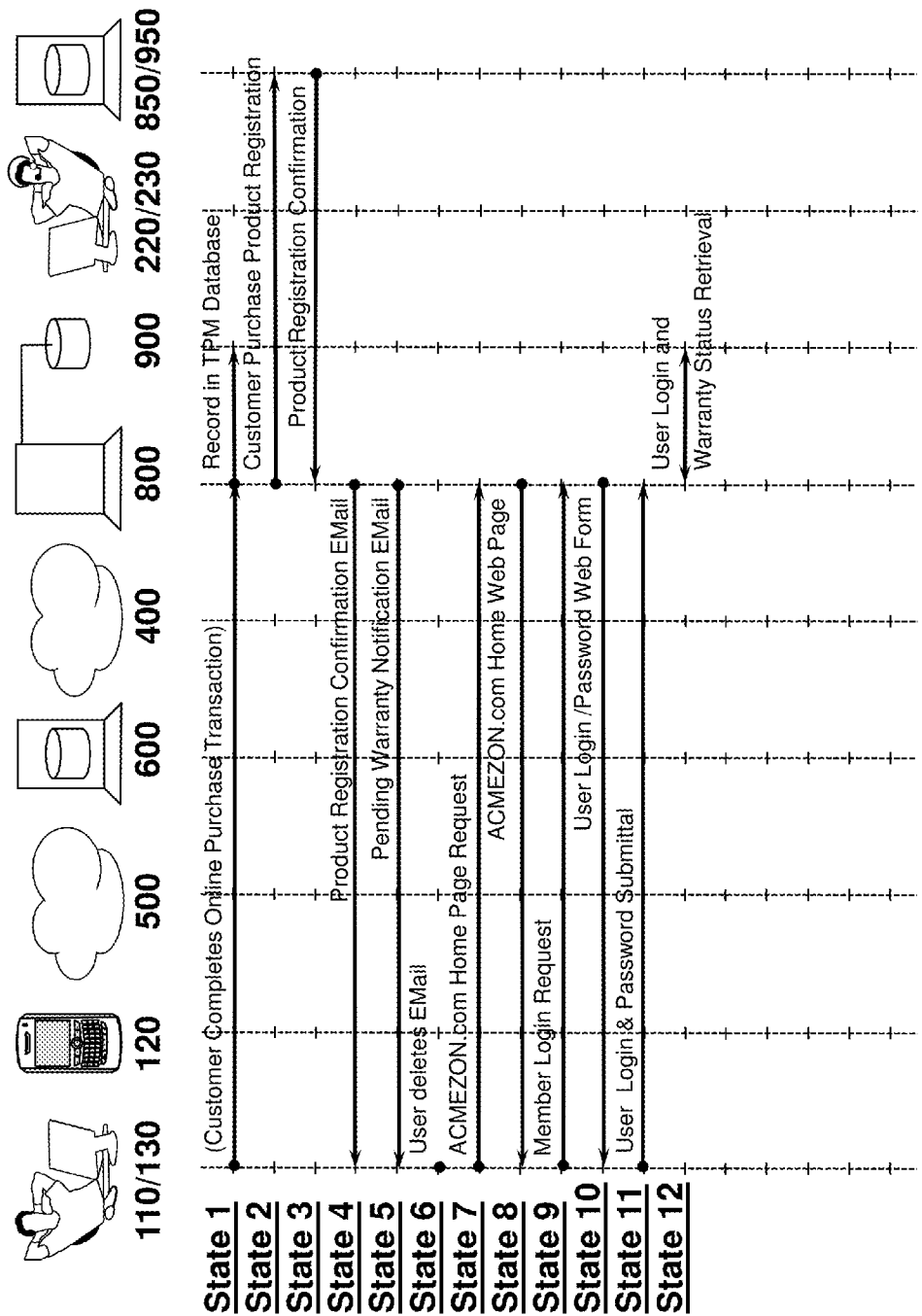
FIGS. 35-37 illustrate the operating environment/process workflow of a second example user scenario.
Figure 36:
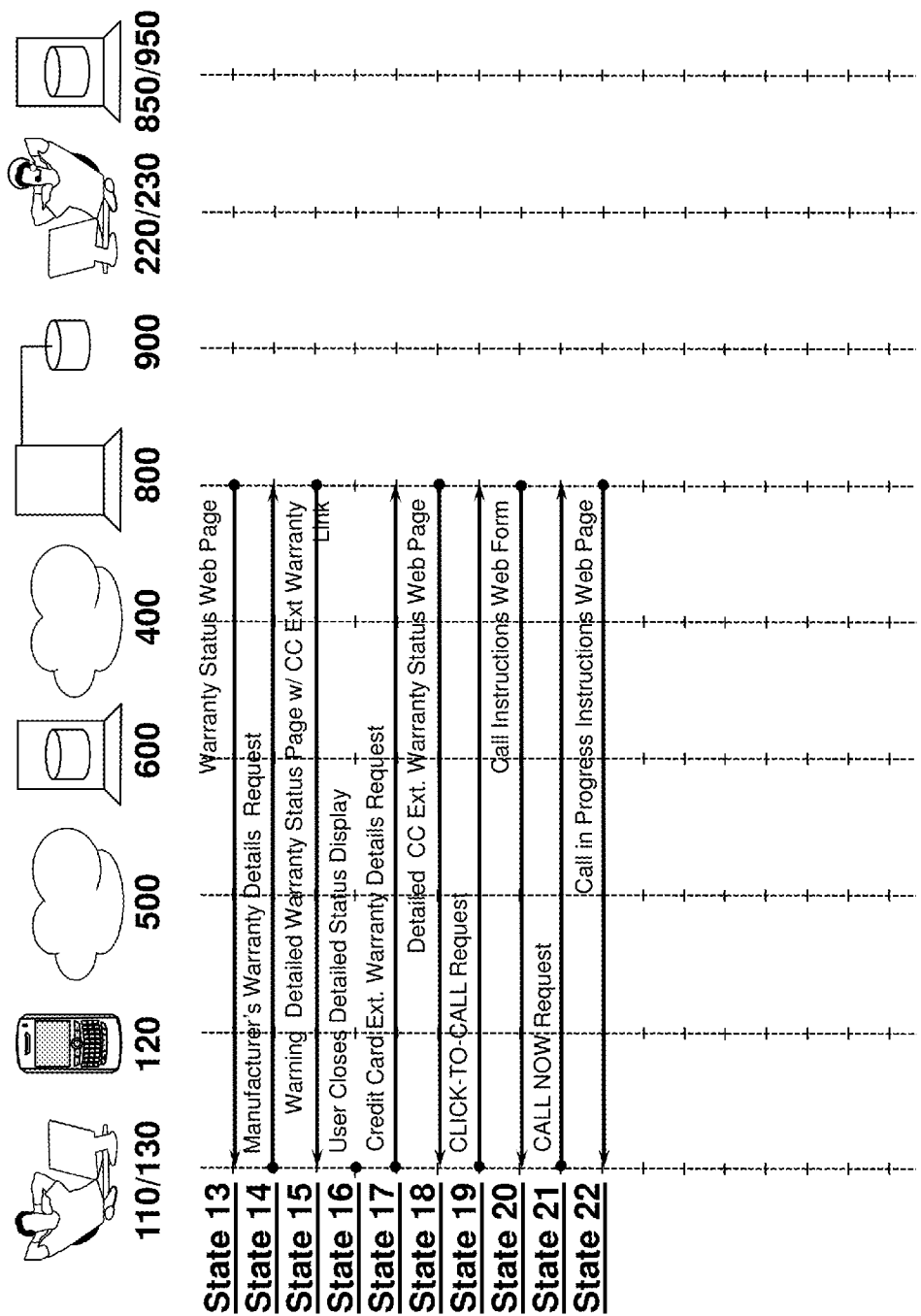
Figure 37:
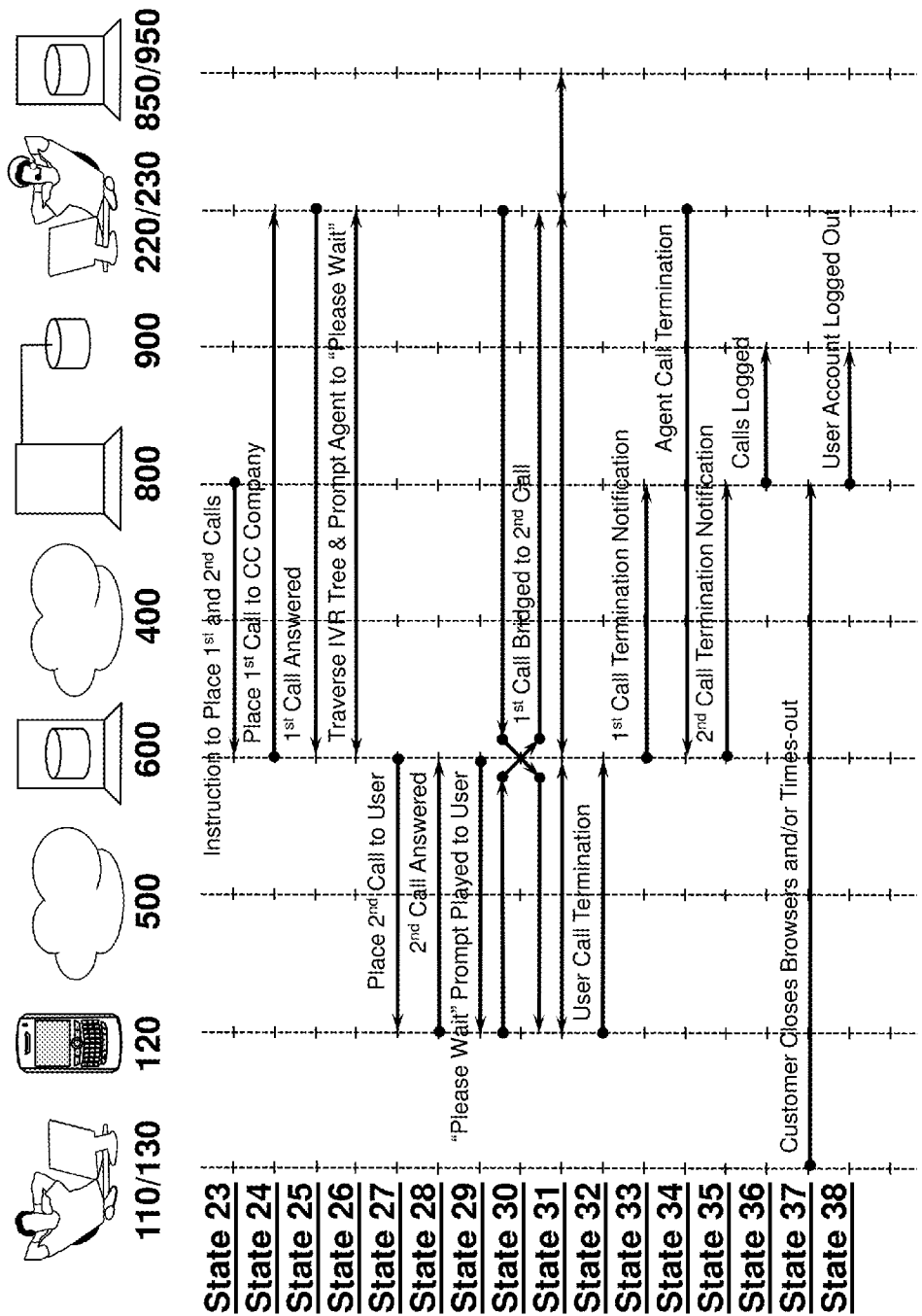

See FIGS. 35-37

In this example, the user purchases a 50" High Definition TV through an online merchant, ACMEZON. The user browses to the ACMEZON web site using a PC 100 connected to a data network 400. Optionally, any data networking capable device can be used by the user including for example, a mobile phone with data networking capabilities. The user enters a search request, finds a 50" High Definition TV they are interested in and purchases the TV using an ACMEZON branded credit card. ACMEZON ships the purchased TV to the user.

State 1 of FIG. 35. In this example, the Online Purchasing and Warranty Management (TPM) system 1000 records in the TPM system database 900 the purchase transaction data including, for example, the purchased item make and model number, product serial number, purchase price, warranty and return periods, the purchaser's (user's) shipping and billing addresses, user's home phone number, user's cell phone number, credit card number, credit card expiration date, and credit card security code. The TPM system also recognizes from the credit card number that the purchase was made using an ACMEZON credit card.

States 2-4. These states are repeated from example 1 above. The user's purchase is automatically registered for the user and a confirming email is sent to the user at the end of the process.

State 5. In this example, the TPM system 1000 is configured to notify users via email two weeks prior to the expiration of their manufacturer's warranty if the product purchased is greater than $500. Nearly a year later, an event triggers in the TPM system two weeks prior to the expiration of the user's HDTV manufacturer's warranty. The event causes the web server 800 to send a notification email to the user.

State 6. The user receives and reads the email. The email includes an offer to purchase an extended warranty which the user is not interested in purchasing. The user deletes the email.

State 7. A couple of months later, the HDTV fails. The user is concerned because the user remembers receiving the email from ACMEZON regarding manufacturer warranty expiration. However, the user decides to double check by accessing the ACMEZON members warranty service.

The user accesses the service provider web site. In this example, the user browses to the ACMEZON web site using a PC 130 connected to data network 400. Optionally, any data networking capable device can be used by the user including for example, a mobile phone with data networking capabilities. The user's browser sends the www.ACMEZON.com URL to the TPM service provider's web hosting server 800.

State 8. The TPM web server 800 receives the web page URL and presents the company's home web page on the user's PC 130.

State 9. The user 100 clicks a button on the ACMEZON home web page to indicate that they are a member and would like to login to their account.

State 10. The TPM service provider's web hosting server 800 receives the login request and presents a login/registration web page to the user.

State 11. The user fills in their user ID (e.g., email address) and password fields in the web form and clicks a login button.

State 12. The hosting web server 800 authenticates the user by confirming a match of the login/password with the recorded entries in the TPM database 900, logs the user into their account, and retrieves their warranty status.

State 13 of FIG. 36. The web server 800 then displays the user's warranty status in a web page 17000 on the user's data terminal, see FIG. 17.

State 14. Upon viewing the display, the happy user discovers that, while the manufacturer's warranty period has expired, there appears to be an active extended warranty period on the HDTV purchase, though the user doesn't remember purchasing an extended warranty. The user selects the manufacturer's warranty field 17641 for the HDTV, see FIG. 17.

State 15. The hosting web server 800 receives the user's selection request. The TPM system in this example opens a new browser window on the user's PC 130 and displays a web page 18000 (see FIG. 18) informing the user that they are currently in the extended warranty period. In this case, the ACMEZON credit card was originally used to purchase the HDTV. A benefit of the ACMEZON credit card (and some other credit cards) is an extended warranty on purchases made with the credit card. The user's credit card is still active (typically required to invoke the warranty benefit) and the manufacturer's warranty has expired, therefore the user is eligible for an extended warranty. Optionally, ACMEZON or the credit card provider can service the warranty claim. In this example, the credit card provider services the claim.

State 16. The user closes the open browser 18000 by selecting the close browser control 18200.

State 17. The user selects the credit card extended warranty period field 17681 associated with the HDTV purchase, see FIG. 17.

State 18. The hosting web server 800 receives the user's selection request, queries the account database 900, and opens a new browser window on the user's PC 130 and displays a new web page 19000, see FIG. 19. The new web page informs the user that they are currently in the credit card extended warranty period 19610, provides a toll-free number for return/repair information 19620, and instructions for receiving assistance placing the phone call 19630.

State 19. The user reads the warranty claims procedure and then selects the CLICK-TO-CALL link 19300, See FIG. 19.

State 20. The hosting web server 800 receives the user's selection request. In this example, the TPM system queries the account database 900 for the user's phone number and opens a new browser window on the user's PC 130 to display a new web page 20000. The new web page provides call instructions, a field to enter the user's preferred phone number (pre-populated with the entry from the account database 900) 20600, and a CALL NOW control 20300, see FIG. 20.

State 21. In this example the user can take the call on the displayed phone number so they simply select the CALL NOW control 20300.

State 22. The hosting web server 800 receives the user's selection request and changes the web page display 21000 to notify the user that a call is being placed to the credit card provider, see FIG. 21.

State 23 of FIG. 37. In this example the TPM server 800 requests that the phone server 600 call the credit card warranty claims department and the user.

State 24. The phone server 600 receives the web server 800 request and first places a call to the credit card warranty claims department.

State 25. The credit card company answers the call from the phone server 600.

State 26. After detecting answer, the phone server 600 outpulses a series of dtmf tones which traverse the credit card companies IVR system and connect to a live operator 200. (Optionally even the user's credit card number originally used to purchase the item is outpulsed to the IVR system and/or other information required by the call center 650.) The phone server 600 optionally plays an announcement connection prompt to the operator "Please hold while we connect this call to a caller".

State 27. The phone server 600 places a call to the user. To improve call efficiency, the call to the user can be initiated at the point that the phone server 600 connects to the credit card company IVR, after the phone server 600 connects to a live operator, or another specified time (e.g., before calling the credit card company).

State 28. The user answers the call from the phone server 600.

State 29. The phone server 600 detects the call answer and plays an announcement connection prompt to the called party (user) "Thank you for using ACMEZON, I will now connect you to an operator".

State 30. The phone server 600 bridges the call to the credit card company call agent and the call to the user.

State 31. The call agent collects information about the user. The call agent confirms that the HDTV purchase was in fact registered. The call agent then collects information about the product failure. In this example, the user must take the HDTV to a local repair facility for repair. Optionally, the user agrees to place any charges for the repair on their credit card and then to place a follow up call to the call agent in order to have the charge reimbursed or removed from the user's bill.

State 32 The user terminates the call by hanging up.

State 33. The phone server 600 detects the caller call disconnect and terminates the call leg to the user. The phone server 800 reports the call termination event to the web server 800.

State 34. The call agent terminates the call by hanging up.

State 35. The phone server 600 detects the agent call disconnect and terminates the call leg to the agent. The phone server 600 then reports the call termination event to the web server 800.

State 36. The web server 800 creates call detail records which are stored in the database 900.

State 37. The user closes the two open browsers by selecting the close control 21200 (see FIG. 21) and 17200 (see FIG. 17).

State 38. The web server 800 receives the close requests over the data network 400 and/or times out the user due to prolonged inactivity and then logs the user out of their account.

Third Example Embodiment

Figure 38:
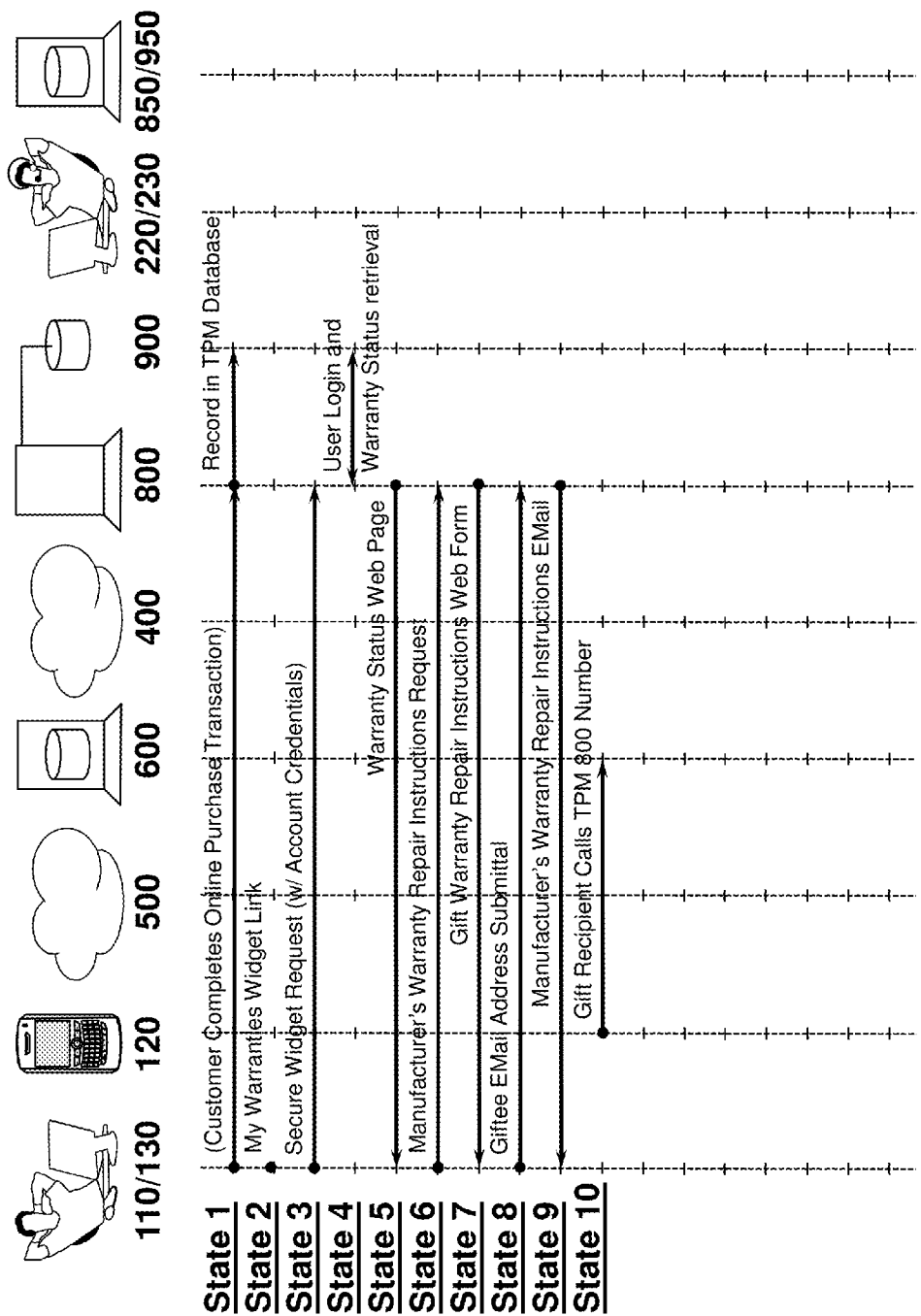
FIG. 38 illustrates the operating environment/process workflow of a third example user scenario.

See FIG. 38

In this example, the user had purchases a 50" High Definition TV as a gift for a family member (not living with the user) through an online merchant, ACMEZON. The user browses to the ACMEZON web site using a PC 130 connected to a data network 400. Optionally, any data networking capable device can be used by the user including for example, a mobile phone with data networking capabilities. The user enters a search request, finds a 50" High Definition TV they are interested in and purchases the TV using an ACMEZON branded credit card. ACMEZON ships the purchased TV to the family member.

State 1 of FIG. 38. In this example, the TPM system 1000 stores in the TPM system database 900 the purchase transaction data including, for example, the purchased item make and model number, product serial number, purchase price, warranty and return periods, the purchaser's (user's) shipping and billing addresses, user's home phone number, user's cell phone number, credit card number, credit card expiration date, and credit card security code. The TPM system also recognizes from the credit card number that the purchase was made using an ACMEZON credit card. In addition, the TPM identifies the item as a gift purchase based upon a web control selected by the user during the purchase, by an enclosed gift card, or some other means, including for example, a delivery shipping address that is not the purchaser's home address.

State 2. Several months later the family member notifies the user that the 50" HDTV has failed. The user accesses the ACMEZON web site by selecting the My Warranties link 8620 in the desktop widget, see FIG. 8.

State 3. The desktop widget receives the user request to access the ACMEZON warranty status page and sends a secure message (which includes the user's account ID and specified web page request) over the data network 400 to the server 800.

State 4. The ACMEZON hosting web server 800 receives the widget request and login credentials, validates the login credentials against the account database 900 and retrieves the account's warranty status.

State 5. The server 800 causes a web browser 22000 to launch on the user's PC 130 and displays the user's warranty status, see FIG. 22.

State 6. The user selects the manufacturer return period field 22642, see FIG. 22.

State 7. The ACMEZON hosting web server 800 receives the user request. The hosting web server 800 opens a new browser and displays a new web page 23000 with gift warranty return instructions for the user to follow, see FIG. 23.

State 8. The user enters the giftee (family members in this example) email address in the email address field 23600 and then clicks the SEND NOW control 23300, see FIG. 23.

State 9. The ACMEZON hosting web server 800 receives the giftee email address entered by the user and sends an email to the giftee with personalized product warranty instructions.

State 10. The giftee (family member in this example) receives the ACMEZON product warranty email and places a call to the manufacturer as similarly described above in states 47-61 of Example 1. In this example, the giftee is requested to return the 50" HDTV to a local repair center for repair. The giftee is provided with a Return/Repair Authorization Number in order for the local repair facility to bill the manufacturer for any parts and labor required to repair the HDTV.

Fourth Example Embodiment

Figure 39:
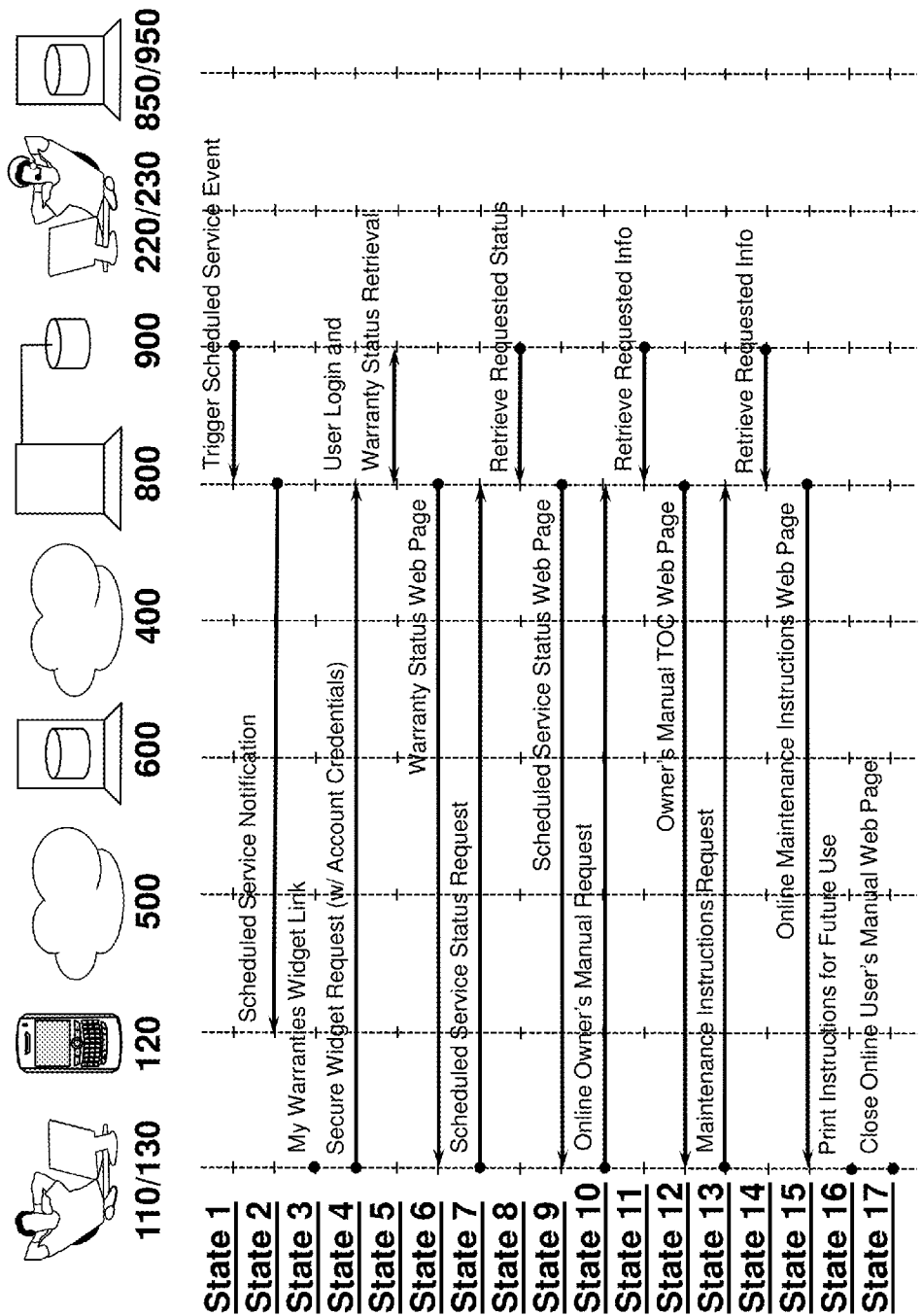
FIGS. 39-40 illustrate the operating environment/process workflow of a fourth example user scenario.
Figure 40:
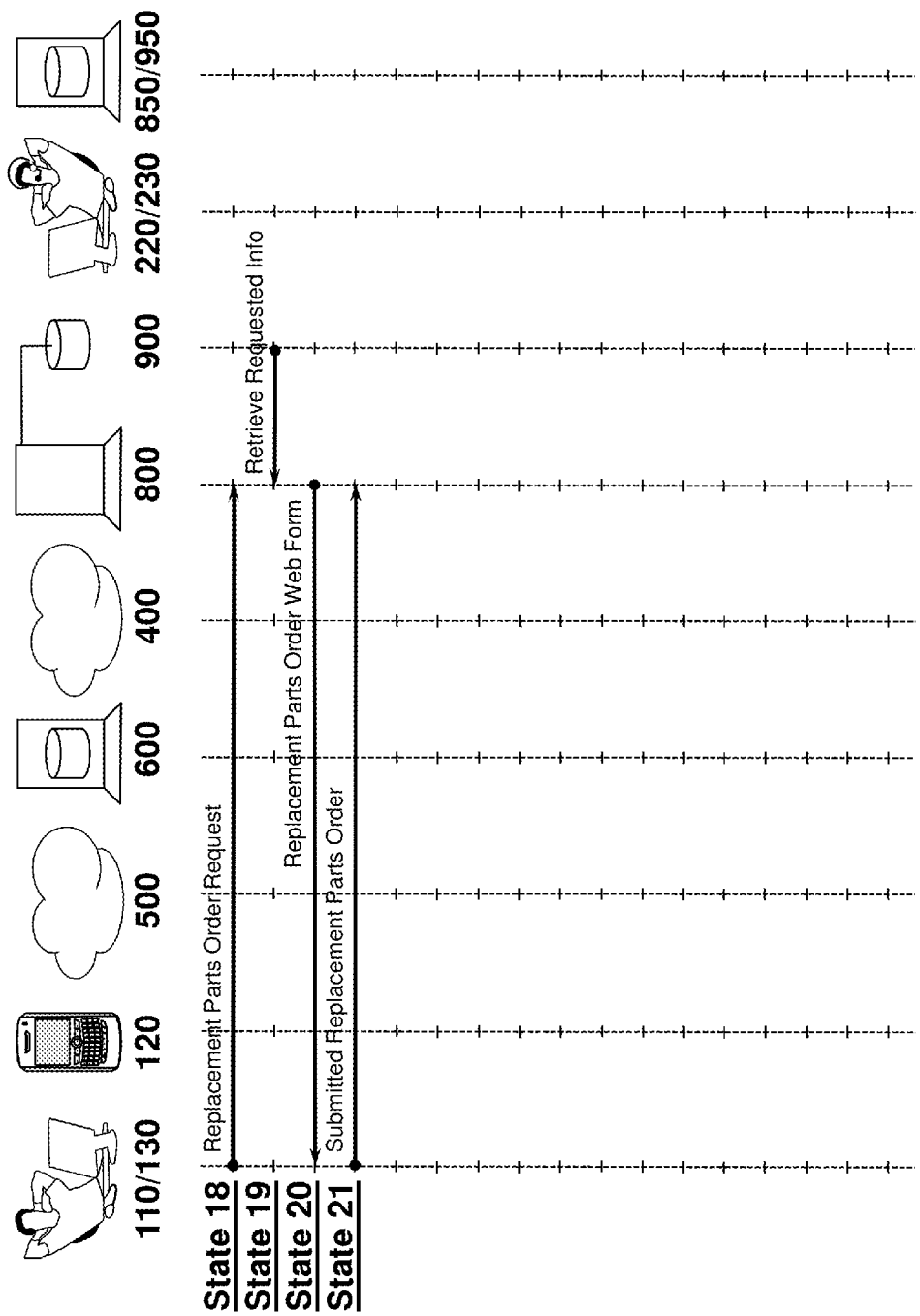

See FIGS. 39-40

In this example, the user has previously purchased a water purification system which requires periodic servicing to replace the used filters. The TPM system notifies the user that it is time to replace the filters via a text message on their mobile phone. The user then logs into their TPM account, displays and prints maintenance instructions, and purchases new filters, facilitated by the TPM system.

State 1 of FIG. 39. In this example, the TPM system 1000 detects that it is time to service one of the user's previously purchased items.

State 2. The Web server 800 sends a text message 24000 to the user's phone 120 to notify him/her of the pending need for scheduled service, see FIG. 24.

State 3. Later that day, the user 100 accesses the ACMEZON web site by selecting the My Warranties link 8620 in the desktop widget 8000, see FIG. 8.

State 4. The desktop widget receives the user request to access the ACMEZON warranty status page and sends a secure message (which includes the user's account ID and specified web page request) over the data network 400 to the server 800.

State 5. The ACMEZON hosting web server 800 receives the widget request and login credentials, validates the login credentials against the account database 900 and retrieves the account's warranty status.

State 6. The server 800 causes a web browser 25000 to launch on the user's PC 130 and displays the user's warranty status, see FIG. 25. The display lists the status of each purchased item being tracked by the TPM system including line item 25300 which depicts the status of a water purification system. The status line also includes an indicator 25310 to alert the user to the need for regular scheduled service.

State 7. The user requests a review of the scheduled service status by clicking indicator 25310, see FIG. 25.

State 8. The ACMEZON hosting web server 800 receives the user request and retrieves the requested status from the database 900.

State 9. The web server 800 then displays a new web page 26000 with the service status of the selected item, see FIG. 26.

State 10. The user requests a display of maintenance instructions by clicking link 26630, see FIG. 26. State 11. Web server 800 receives the user request and retrieves the requested Owner's Manual from the database 900.

State 12. The web server 800 then opens a new web page 27000 and displays the Owner's Manual Table of Contents for the selected item, see FIG. 27.

State 13. The user requests a display of maintenance instructions by clicking link 27660, see FIG. 27.

State 14. Web server 800 receives the user request and retrieves the requested status from the database 900.

State 15. The web server 800 then updates the web page with a new display of the maintenance instructions from the Owner's Manual for the selected item (not shown in Figures).

State 16. The user prints out a hard copy of this web page for later use (not shown in Figures).

State 17. The user then closes browser displaying the Owner's Manual.

State 18 of FIG. 40. The user now requests ordering information for a replacement filter by selecting link 26620, see FIG. 26.

State 19. Web server 800 receives the user request and retrieves the requested ordering information from the database 900.

State 20. The web server 800 then opens a new web page 28000 and displays ordering instructions for replacement filters for the purchased item, see FIG. 28.

State 21. The user purchases a replacement filter by submitting his/her order by clicking link 28620 on web form 28000, see FIG. 28. The ordering process now proceeds in a standard fashion following normal ecommerce methods.

These example embodiments have illustrated methods and systems for facilitating the management of communications and product information pertaining to ongoing operations and maintenance of purchased products.

In addition, it should be understood that certain variations and modifications of the systems and processes described herein would suggest themselves to one of ordinary skill in the art. The scope of the present invention is not to be limited by the illustrations or the foregoing descriptions thereof.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the filed claims.

What is claimed is:

1. A method of facilitating maintenance comprising:
registering a user over a data network by a Telecom and Product Management system wherein the registration includes a first user account and a one or more addresses to contact the user;
storing the created first user account including the one or more contact addresses in computer readable memory;
storing by the Telecom and Product Management system, at least a portion of information associated with a purchase of an item by the user wherein the stored purchase information includes a purchase date and a product identifier of the purchased item;
determining by the Telecom and Product Management system accessing a one or more first data stores, manufacturer recommended maintenance tasks and corresponding maintenance task intervals for the purchased item based at least in part on the purchased item product identifier;
generating by the Telecom and Product Management system, a calendarized schedule of a one or more maintenance tasks for the purchased item based at least in part: on the determined manufacturer recommended maintenance tasks, on the determined maintenance task intervals, and on the purchased item purchase date;
providing by the Telecom and Product Management system, a first user interface for the user to view, edit, or view and edit, over a network, the calendar of scheduled maintenance tasks for the purchased item wherein the first user interface includes an option to reschedule a one or more of the scheduled maintenance tasks;
comparing by the Telecom and Product Management system, a current date with the calendar of scheduled maintenance tasks for the purchased item, and if a one or more of the scheduled maintenance tasks is now required then storing a status indicator that the corresponding one or more tasks are due;

querying by the Telecom and Product Management system, a one or more second data stores, using at least in part, the purchased item product identifier for a one or more scheduled maintenance tasks, to ascertain if any maintenance parts are required to perform said one or more scheduled maintenance tasks;

storing any ascertained maintenance parts required to perform said one or more scheduled maintenance tasks in computer readable memory;

transmitting by the Telecom and Product Management system, a notification to the user at one or more of the user's registered contact addresses, regarding the one or more scheduled maintenance tasks that are due; and providing by the Telecom and Product Management system, a second user interface whereby the user can view any ascertained maintenance parts that are required to perform said one or more scheduled maintenance tasks.

2. The method as defined in claim 1, further comprising: providing by the Telecom and Product Management system via the second user interface, an option to purchase a one or more of the ascertained maintenance parts that are required to perform said one or more scheduled maintenance tasks.

3. The method as defined in claim 1, wherein the second user interface is the first user interface.

4. The method as defined in claim 1, wherein the second user interface is provided via a mobile phone of the user.

5. The method as defined in claim 1, further comprising: automatically shipping to the user a one or more of the ascertained maintenance parts that are required to perform the one or more scheduled maintenance tasks that are due wherein the address that the maintenance parts are automatically shipped to is one of the user's stored contact addresses.

6. The method as defined in claim 1, further comprising: providing by the Telecom and Product Management system via the second user interface, an option to view installation instructions for a one or more of the one or more scheduled maintenance tasks.

7. The method as defined in claim 1, further comprising: providing an electronic interface by the Telecom and Product Management system, whereby a product manufacturer downloads over the electronic interface product information including (a) one or more manufacturer recommended maintenance tasks, (b) manufacturer recommended maintenance task intervals, (c) manufacturer installation instructions, or any combination of (a), (b), and (c);

storing by the Telecom and Product Management system, (a) (b) (c) or any combination of (a), (b), and (c);

providing a manufacturer's user interface by the Telecom and Product Management system, whereby a product manufacturer can view, edit, or view and edit stored (a), (b), (c), or any combination of (a), (b), and (c).

8. The method as defined in claim 1, wherein the product identifier of the purchased item is a make, a model, or a make and a model.

9. The method as defined in claim 8, wherein the make is a manufacturer's name.

10. The method as defined in claim 8, wherein the model is a name or a number corresponding to one or more products sold by the manufacturer.

11. The method as defined in claim 1, wherein the first data store and the second data store are the same data store.

12. The method as defined in claim 1, wherein the user notification is an SMS/MMS message or an email message.

13. The method as defined in claim 1, wherein the user notification is a widget software application state change.

14. A method of facilitating maintenance comprising:
registering a user over a first data network by a Telecom and Product Management system wherein the registration includes a first user account and a one or more shipping addresses of the user;

storing the created first user account including the one or more contact addresses in computer readable memory;

storing by the Telecom and Product Management system, at least a portion of information associated with a purchase of an item by the user wherein the stored purchase information includes a purchase date and a product identifier of the purchased item;

determining by the Telecom and Product Management system accessing a one or more first data stores, manufacturer recommended maintenance tasks and corresponding maintenance task intervals for the purchased item based at least in part on the purchased item product identifier;

generating by the Telecom and Product Management system, a calendarized schedule of a one or more maintenance tasks for the purchased item based at least in part: on the determined manufacturer recommended maintenance tasks, on the determined maintenance task intervals, and on the purchased item purchase date;

providing by the Telecom and Product Management system, a first user interface for the user to view, edit, or view and edit, over a network, the calendar of scheduled maintenance tasks for the purchased item wherein the first user interface includes an option to reschedule a one or more of the scheduled maintenance tasks;

comparing by the Telecom and Product Management system, a current date with the calendar of scheduled maintenance tasks for the purchased item, and if a one or more of the scheduled maintenance tasks is now required then storing a status indicator that the corresponding one or more tasks are due;

querying by the Telecom and Product Management system, a one or more second data stores, using at least in part, the purchased item product identifier for a one or more scheduled maintenance tasks, to ascertain if any maintenance parts are required to perform said one or more scheduled maintenance tasks;

storing any ascertained maintenance parts required to perform said one or more scheduled maintenance tasks in computer readable memory;

automatically shipping to the user at one of the registered user's shipping addresses, a one or more of the ascertained maintenance parts that are required to perform the scheduled maintenance tasks that are due; and providing by the Telecom and Product Management system, a second user interface whereby the user can view any ascertained maintenance parts that are required to perform said one or more scheduled maintenance tasks.

15. The method as defined in claim 14, wherein the second user interface is the first user interface.

16. The method as defined in claim 14, further comprising: providing via the second user interface an option to view installation instructions for a one or more of the one or more scheduled maintenance tasks.

17. The method as defined in claim 14, further comprising: providing an electronic interface by the Telecom and Product Management system, whereby a product manufacturer downloads over the electronic interface product information including (a) one or more manufacturer recommended maintenance tasks, (b) manufacturer recommended maintenance task intervals, (c) manufacturer installation instructions, or any combination of (a), (b), and (c);

storing by the Telecom and Product Management system, (a) (b) (c) or any combination of (a), (b), and (c);

providing a manufacturer's user interface by the Telecom and Product Management system, whereby a product manufacturer can view, edit, or view and edit stored (a), (b), (c), or any combination of (a), (b), and (c).

18. The method as defined in claim 14, wherein the first data store and the second data store are the same data store.

19. The method as defined in claim 14, further comprising: registering the user purchased item over a second data network with a manufacturer.

20. A system comprising:
at least one computing device;
program instructions stored in non-transitory memory, that when executed by the at least one computing device, are configured to cause the communication and claims processing system to perform operations comprising:
registering a user wherein the registration includes a first user account and a one or more shipping addresses of the user;
storing the created first user account including the one or more contact addresses;
storing at least a portion of information associated with a purchase of an item by the user wherein the stored purchase information includes a purchase date and a product identifier of the purchased item;
determining by accessing a one or more first data stores, manufacturer recommended maintenance tasks and corresponding maintenance task intervals for the purchased item based at least in part on the purchased item product identifier;
generating a calendarized schedule of a one or more maintenance tasks for the purchased item based at least in part: on the determined manufacturer recommended maintenance tasks, on the determined maintenance task intervals, and on the purchased item purchase date;
providing first user interface for the user to view, edit, or view and edit, over a network, the calendar of scheduled maintenance tasks for the purchased item wherein the first user interface includes an option to reschedule a one or more of the scheduled maintenance tasks;
comparing a current date with the calendar of scheduled maintenance tasks for the purchased item, and if a one or more of the scheduled maintenance tasks is now required then storing a status indicator that the corresponding one or more tasks are due;
querying a one or more second data stores, using at least in part, the purchased item product identifier for a one or more scheduled maintenance tasks, to ascertain if any maintenance parts are required to perform said one or more scheduled maintenance tasks;
storing any ascertained maintenance parts required to perform said one or more scheduled maintenance tasks;
automatically shipping to the user at one of the registered user's shipping addresses, a one or more of the ascertained maintenance parts that are required to perform the scheduled maintenance tasks that are due; and
providing a second user interface whereby the user can view any ascertained maintenance parts that are required to perform said one or more scheduled maintenance tasks.

\* \* \* \* \*